United States Patent [19]
Dinauer et al.

[11] Patent Number: 5,368,786
[45] Date of Patent: Nov. 29, 1994

[54] APPARATUS AND METHODS FOR HUMIDITY CONTROL

[75] Inventors: William R. Dinauer, Waunakee; David R. Otis; Mohamed M. El-Wakil, both of Madison; John C. Vignali, Waunakee; Philip D. Macaulay, Madison, all of Wis.

[73] Assignee: Wisconsin Alumni Research Foundation, Madison, Wis.

[21] Appl. No.: 954,121

[22] Filed: Sep. 30, 1992

[51] Int. Cl.$^5$ .............................. F02M 15/00
[52] U.S. Cl. .................... 261/130; 62/315; 165/140; 261/154
[58] Field of Search .............. 261/130, 95, 91, 154; 165/140, 19; 62/315

[56] References Cited

U.S. PATENT DOCUMENTS

| | | | |
|---|---|---|---|
| 1,727,099 | 9/1929 | Cochrane | |
| 1,900,504 | 3/1933 | Kirgan | 165/140 X |
| 1,983,753 | 12/1934 | Hagen | 237/1 |
| 2,182,788 | 12/1939 | Cornell, Jr. | |
| 2,784,571 | 3/1957 | Schelp | 62/138 |
| 3,092,179 | 6/1963 | Lauck | 165/60 |
| 3,303,634 | 2/1967 | Berrian | 55/35 |
| 3,309,843 | 3/1967 | Rigopulos et al. | 55/35 |
| 3,532,270 | 10/1970 | Schoen, Jr. | 236/44 R |
| 3,871,373 | 3/1975 | Jackson | 128/193 |
| 3,900,301 | 8/1975 | Constantinescu et al. | 55/257 |
| 3,912,795 | 10/1975 | Jackson | 261/36 R |
| 3,965,690 | 6/1975 | Berryhill | 62/121 |
| 4,007,601 | 2/1977 | Webbon | 62/100 |
| 4,098,852 | 7/1978 | Christen et al. | 261/154 X |
| 4,155,961 | 5/1979 | Benthin | 261/104 |
| 4,355,636 | 10/1982 | Oetjen et al. | 261/104 X |
| 4,381,267 | 4/1983 | Jackson | 261/104 |
| 4,466,202 | 8/1984 | Merten | 34/2 |
| 4,499,031 | 2/1985 | Sexton et al. | 261/66 |
| 4,512,161 | 4/1985 | Logan et al. | 62/176.6 |
| 4,649,710 | 3/1987 | Inoue et al. | 62/92 |
| 4,708,831 | 11/1987 | Elsworth et al. | 261/130 |
| 4,818,447 | 4/1989 | Iwasaki et al. | 261/99 X |
| 5,002,590 | 3/1991 | Friesen et al. | 55/16 |
| 5,108,464 | 4/1992 | Friesen et al. | 55/16 |

FOREIGN PATENT DOCUMENTS 55-33572 3/1980 Japan.
787075 12/1980 U.S.S.R..

OTHER PUBLICATIONS

"Astroculture: Growing Plants in the Micro-Gravity of Space", 21st Century Gardner, vol. 3, Issue 2, pp. 43–48, May 1989.
"Options for Transpiration Water Removal in a Crop Growth System Under Zero Gravity Conditions", Blackwell et al., SAE 21st Inter. Conf. on Environ. Systems, Jul. 1991.
"The Transpirator-Cooler-A Space-Cooling System", Ernst et al., SAE 22nd Inter. Conf. on Enriron. Systems, Jul. 1992.
"A Novel Membrane Device for the Removal of Water Vapor and Water Droplets from Air", Ray et al., SAE 22nd Inter. Conf. on Environ. Systems, Jul. 1992.

*Primary Examiner*—William E. Wayner
*Attorney, Agent, or Firm*—Olson & Hierl, Ltd.

[57] ABSTRACT

Apparatus is provided which controls humidity in a gas. The apparatus employs a porous interface that is preferably a manifolded array of stainless steel tubes through whose porous surface water vapor can pass. One side of the porous interface is in contact with water and the opposing side is in contact with gas whose humidity is being controlled. Water vapor is emitted from the porous surface of the tubing into the gas when the gas is being humidified, and water vapor is removed from the gas through the porous surfaces when the gas is being dehumidified. The temperature of the porous interface relative to the gas temperature determines whether humidification or dehumidification is being carried out. The humidity in the gas is sensed and compared to the set point humidity. The water temperature, and consequently the porous interface temperature, are automatically controlled in response to changes in the gas humidity level above or below the set point. Any deviation from the set point humidity is thus corrected.

30 Claims, 31 Drawing Sheets

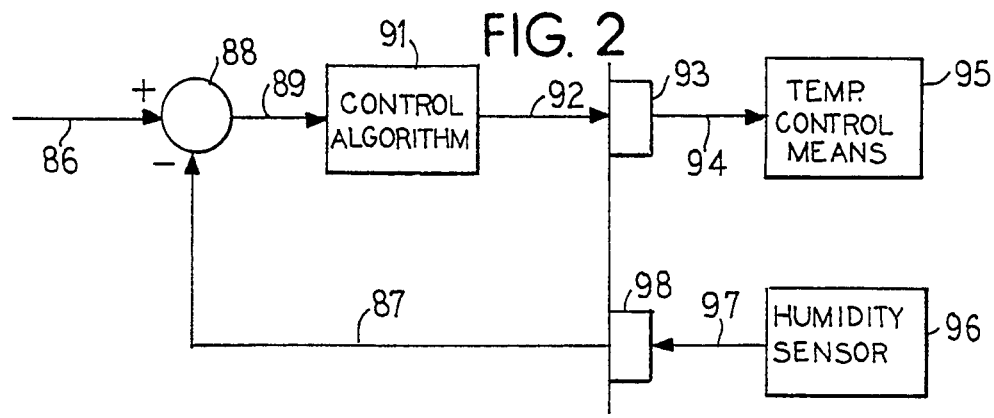
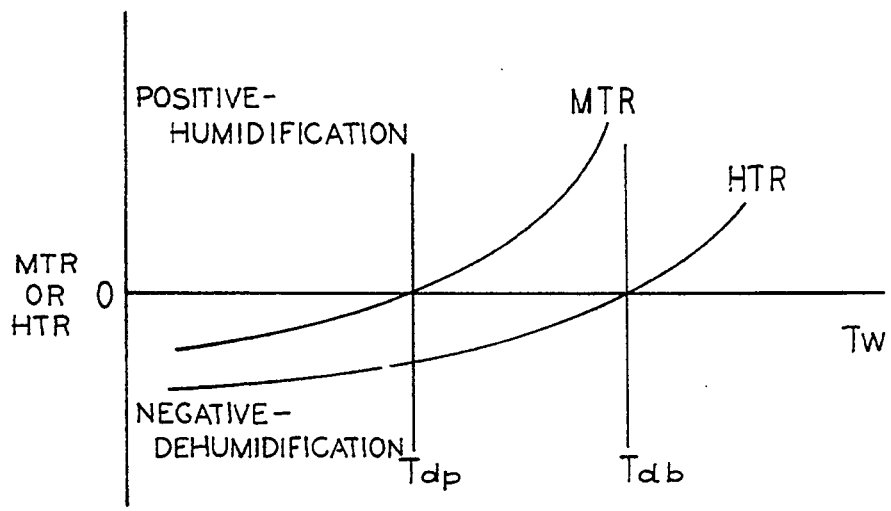
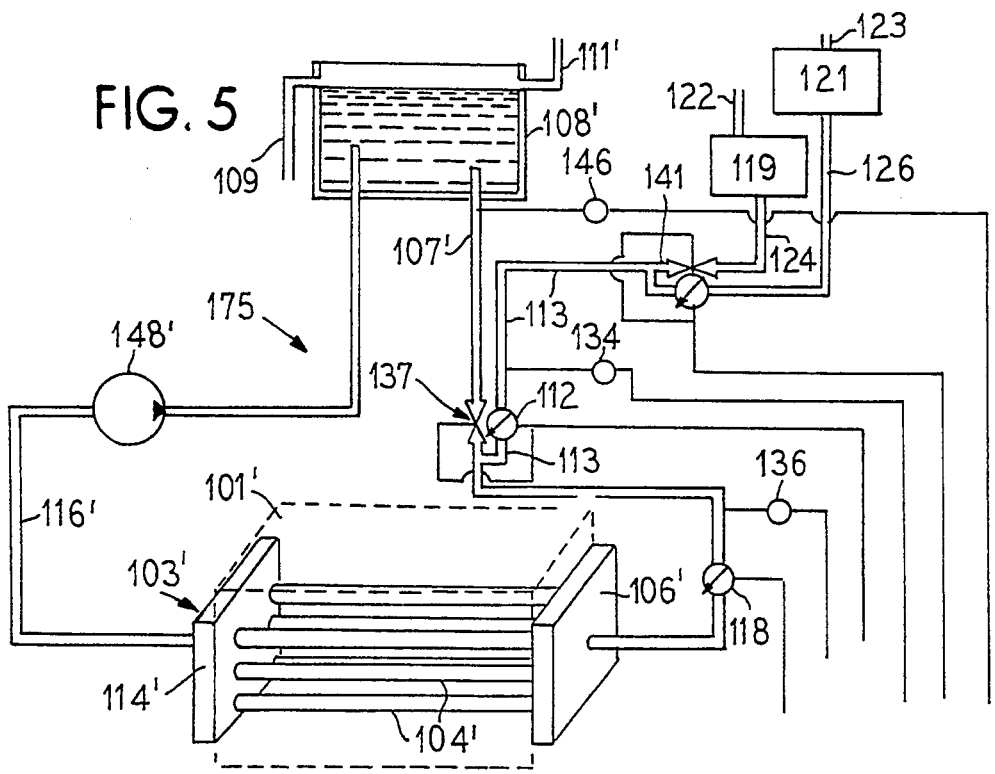

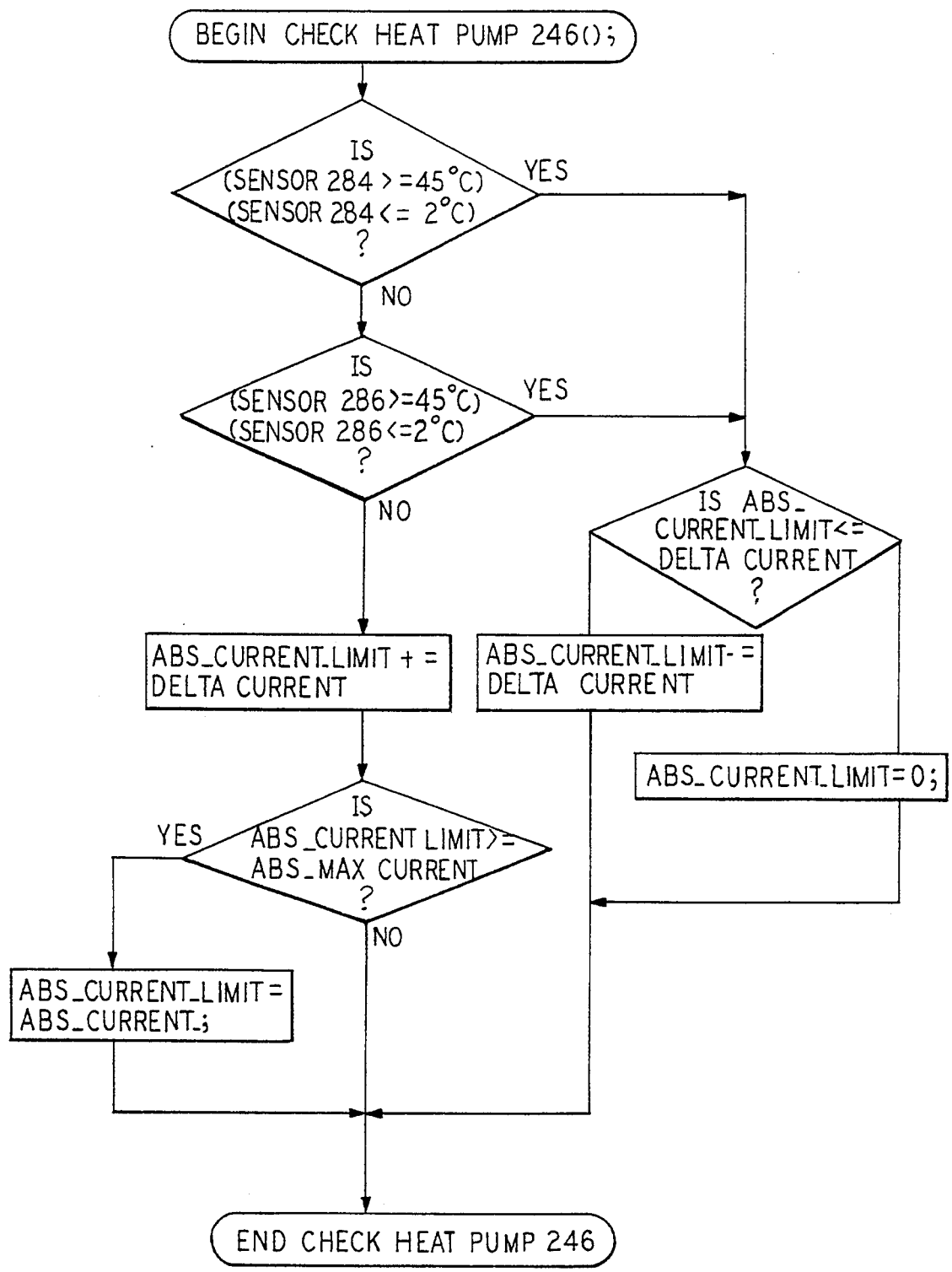

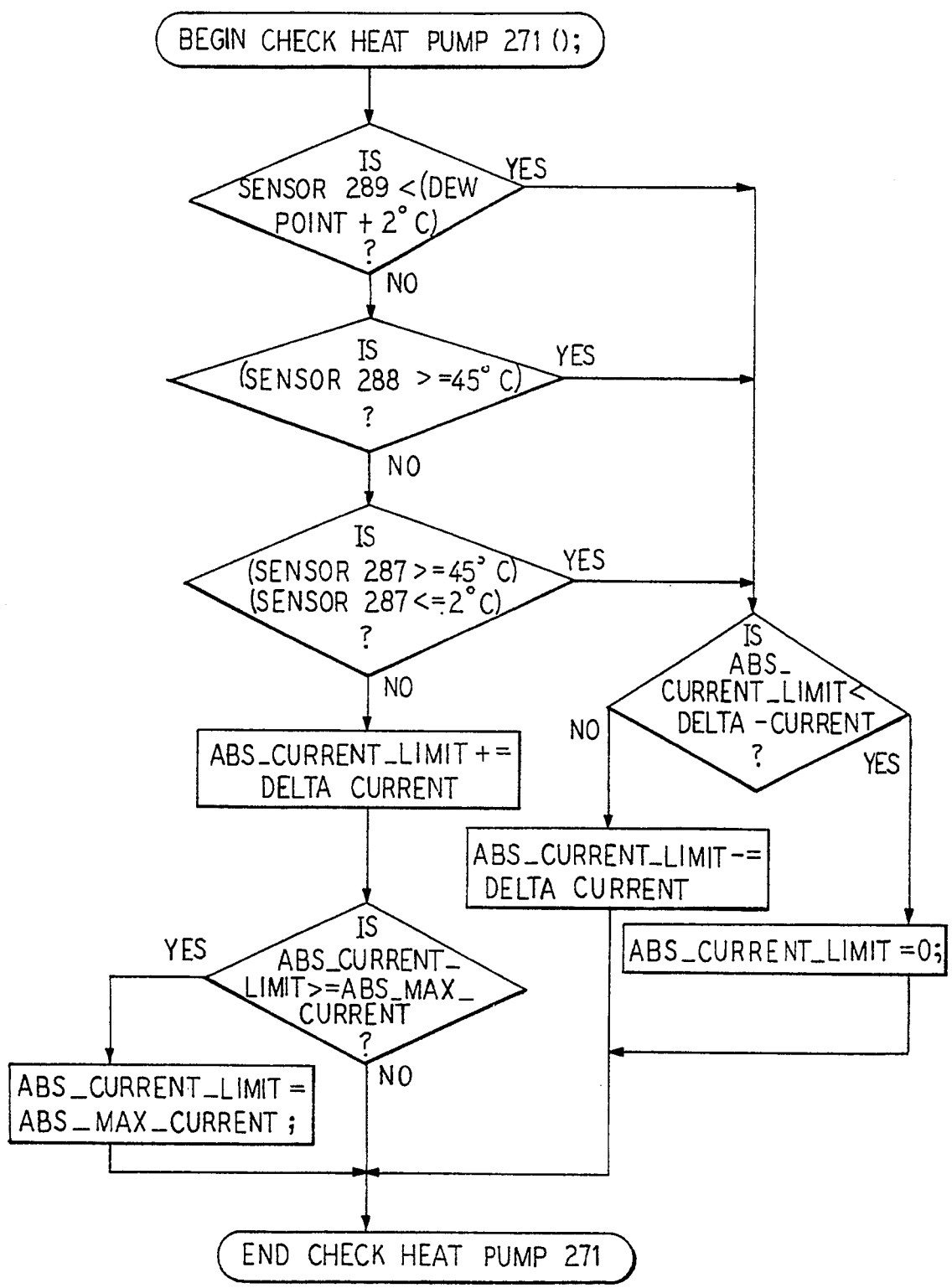

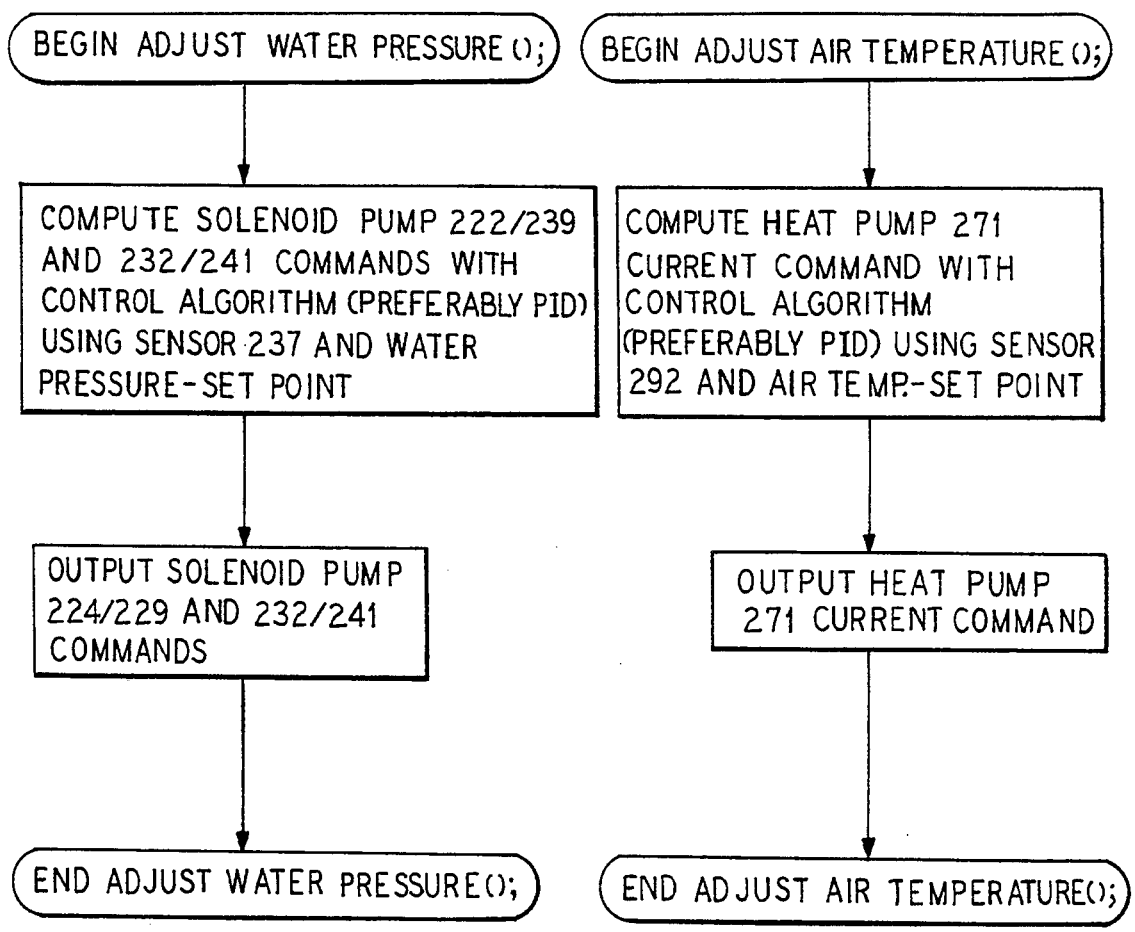

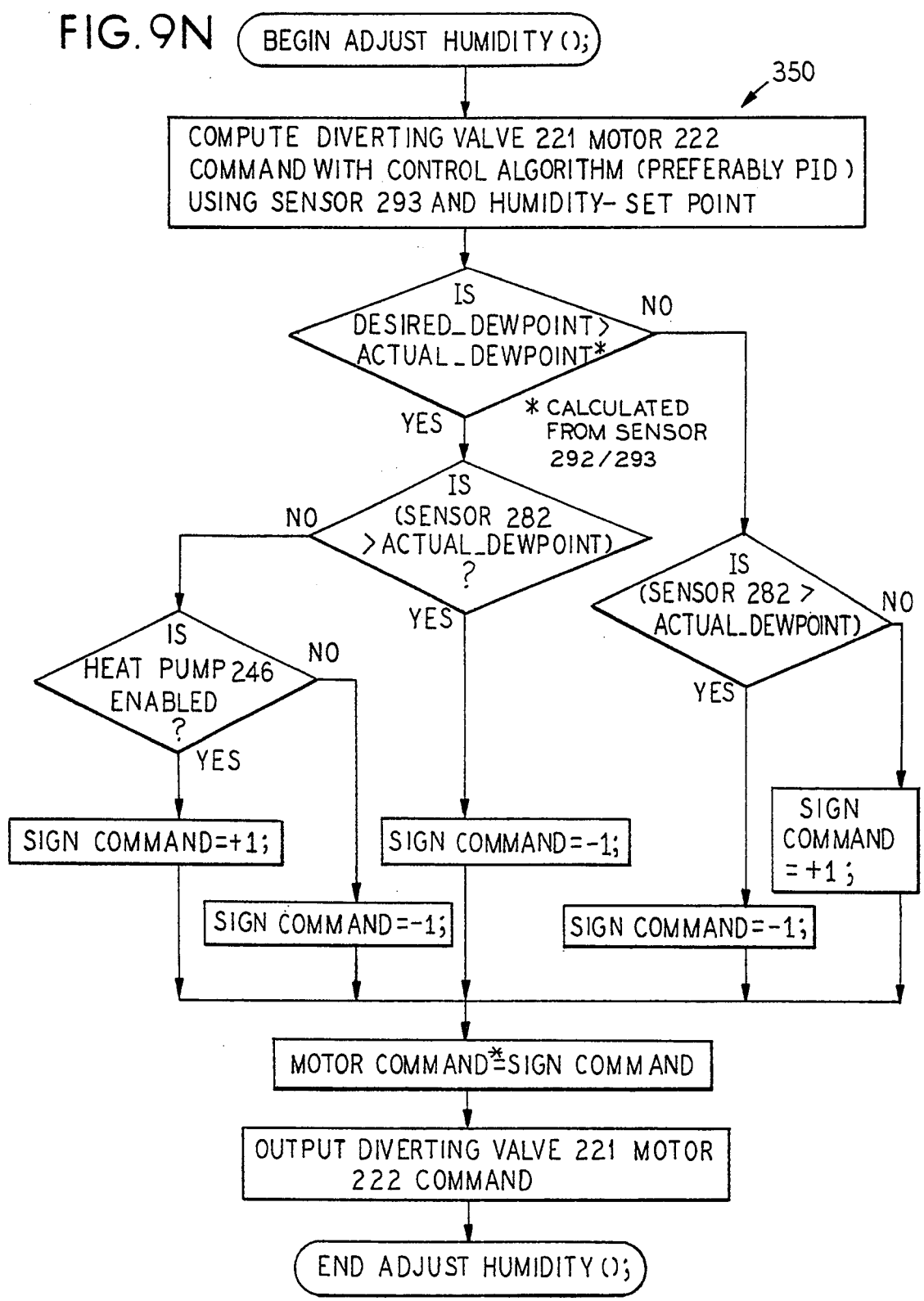

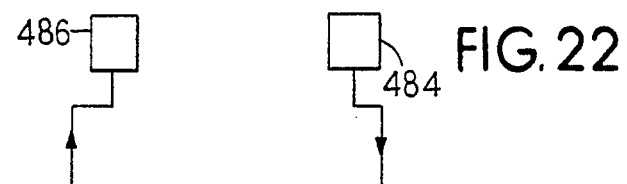
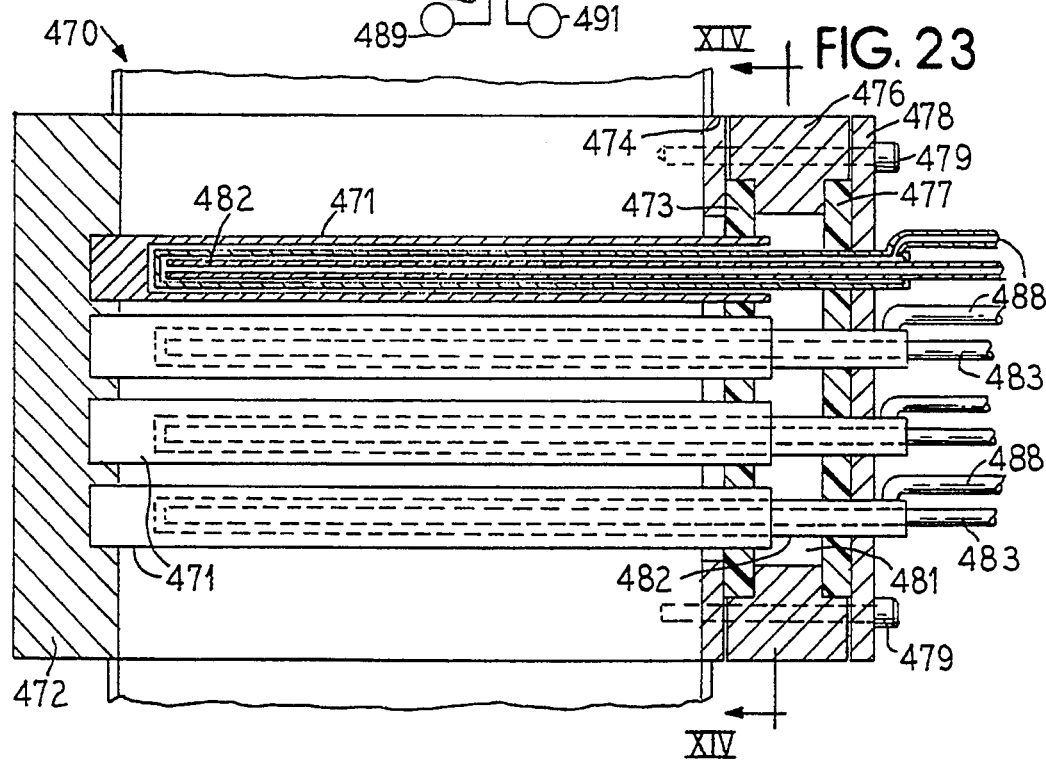
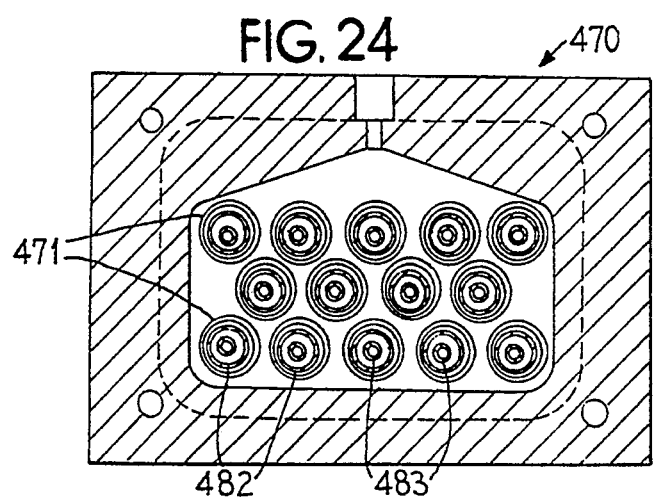
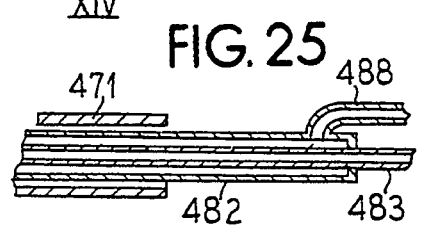
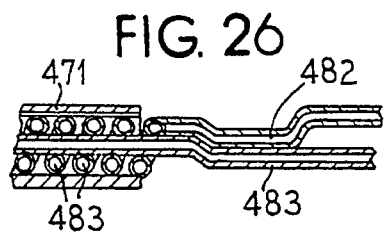

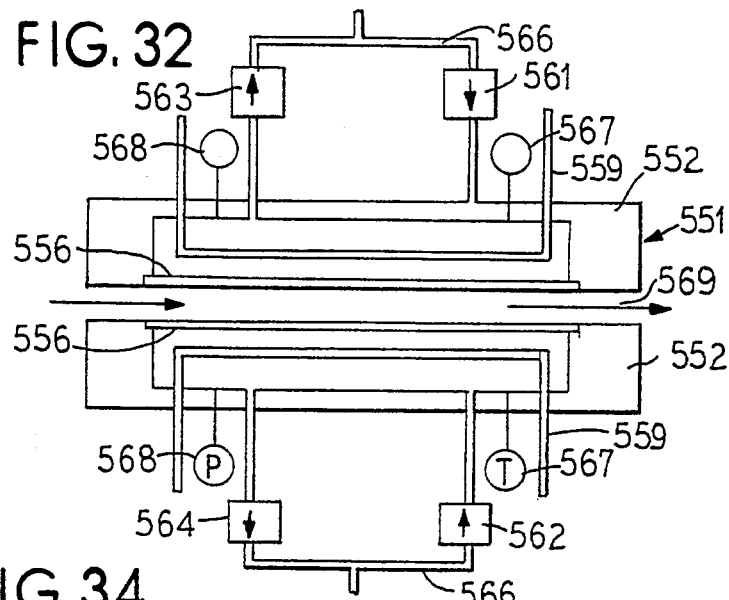
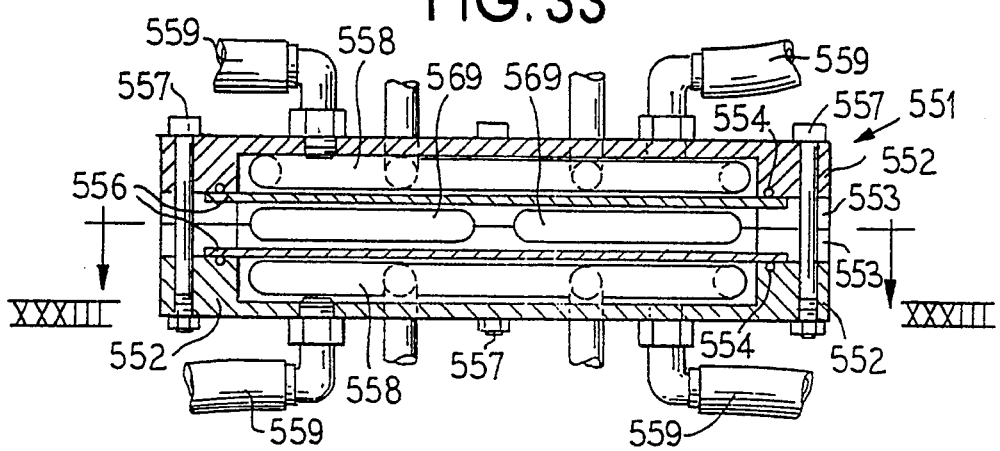
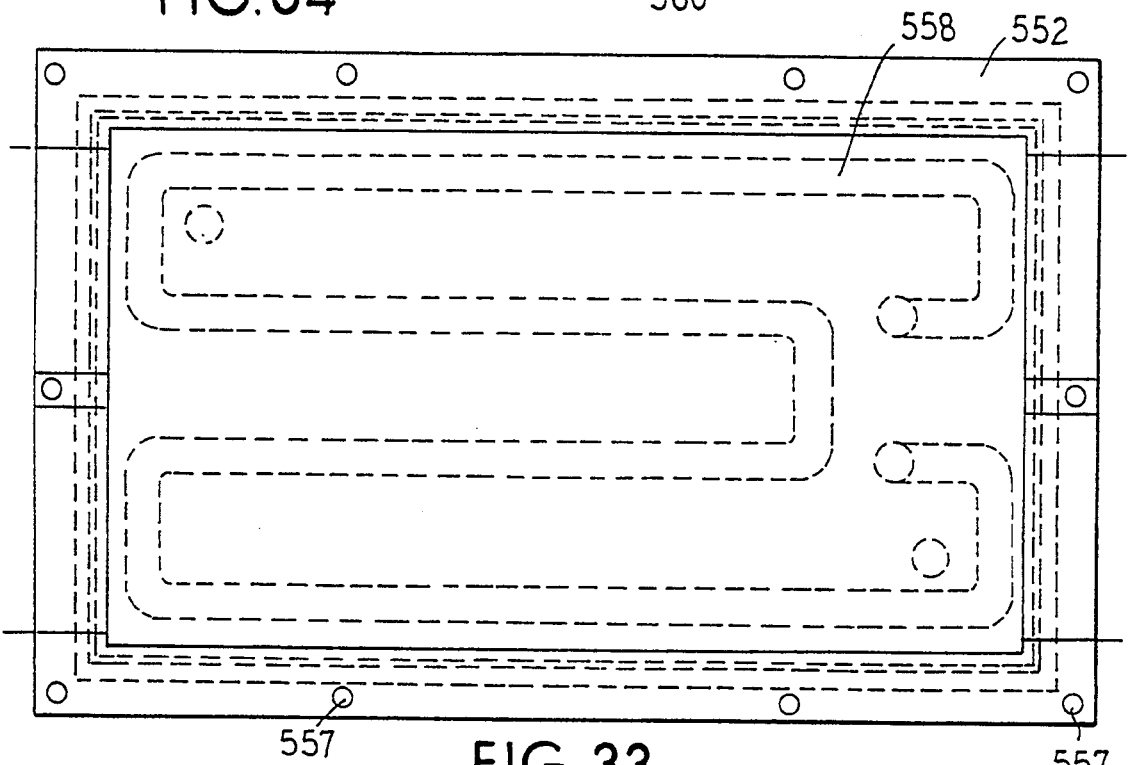

APPARATUS AND METHODS FOR HUMIDITY CONTROL

This invention was made with United States Government support awarded by the National Aeronautics and Space Administration (NASA), Grant NO. NAGW-975. The United States Government has certain rights in this invention.

FIELD OF THE INVENTION

This invention relates to apparatus and methods for the control of humidity in a gas using a single system for either humidification or dehumidification.

BACKGROUND OF THE INVENTION

In a project at the Wisconsin Center for Space Automation and Robotics (WCSAR), it was attempted to employ porous stainless steel tubes through which an aqueous nutrient solution was moved by capillary action into the larger pores of an artificial rooting medium. The tubes were buried in the artificial rooting medium and the larger pores of the medium remained substantially filled with air. Pressure sensors and flow meters monitored the controlled operation. The capillary movement of water into and out of the rooting medium was demonstrated. See "21st Century Gardener", Vol. 3, No. 2, pp. 43–48 (May 1989).

In a related project (same citation), the ability to humidify or dehumidify air in a temperature and pressure regulated chamber was evaluated using a single porous tube through which water was circulated. The temperature of the circulating water in the tube was manually regulated to adjust the temperature of the tube wall relative to the dew point temperature of the air in the chamber. Above the dew point, water evaporated through the tube walls while, below the dew point, moisture condensed from the chamber air on the exterior surfaces of the tube and moved into the tube through the tube walls. The capacity to change the humidity of the chamber air was demonstrated.

The apparatus and methods used in those projects were suitable only for showing the general feasibility of using a porous tube wall as a water or water vapor transport medium. Practical apparatus and methods are necessary to permit actual usage of a porous tube for humidification and dehumidification.

The present invention is directed to such practical apparatus and methods.

SUMMARY OF THE INVENTION

This invention relates to apparatus and methods for regulating gas humidity by humidification and dehumidification using a porous interface. Optionally, the gas temperature is also regulated using the same apparatus and methods. Preferably, the gas is flowing and is preferably air.

The apparatus and methods of this invention involve locating a porous interface structure in the gas environment which is to be humidity controlled and controlling the transport of water and water vapor through the interface structure. Water is contacted against one side of the porous interface, and the gas that is being humidity controlled is contacted with the opposing side of the interface structure.

Various interface structures can be utilized. Preferably, the porous interface structure is in the form of a manifolded array of porous tubes. A present preference is to utilize a porous metal, especially porous stainless steel, as the porous interface, but other various porous solids can be used.

For humidification, the porous interface (for example, porous tube walls) is maintained at or preferably above a temperature above the dew point temperature of the exterior (or environmental) gas being humidity regulated so that water evaporates from the interface. For dehumidification, the same interface is maintained at or preferably below the dew point temperature of the gas so that water condenses thereon and moves into the tubing.

The invention also relates to certain subassemblies and subsystems adapted for utilization in the apparatus and methods, and to methods for the fabrication and use thereof.

One class of novel subassemblies provided by the present invention comprises structures of porous interfaces and methods for fabricating the structures. For example, and preferably, the porous interface in such structures can comprise manifolded arrays of porous metal tubes.

Another class of novel subassemblies provided by the present invention comprises control systems for the regulation and operation of humidification and dehumidification regulating systems that incorporate porous interface structures such as manifolded arrays of porous tubing and the like. Both control apparatus and control methods are provided. For example, and preferably, such control subsystems operate to regulate gas humidity at a set point by maintaining the porous interface temperature at or above the gas dew point for gas humidification, and at or below the gas dew point for gas dehumidification, through water temperature regulation.

A gas humidity regulating system of the invention preferably operates automatically by means of an associated control subsystem. In a relatively simple system, a set point controller can be used. In a more complex system, a microcontroller (i.e., computer) is preferably used so that operation of the system can be continuous and automatic to control the humidification or dehumidification of a gas (preferably air).

The invention provides the only currently known and relatively simple class of devices which accomplish either humidification or dehumidification as needed to maintain a desired humidity level.

The invention provides economical and reliable means for accomplishing humidity regulation and control. Humidity regulation can be efficiently and effectively achieved.

Systems of the invention can provide humidity control as well as concurrent temperature control of a gas, if desired. Independent humidity or temperature control of the gas can be achieved, if desired.

Embodiments of the inventive apparatus and methods of use are provided that are adapted for the automatic control of humidity in a building, group of rooms, or even a single room or chamber, particularly a closed environment adapted for human, animal or plant occupation or habitation.

One illustrative embodiment of the inventive apparatus and methods of use that is provided herein is adapted for integrated humidity and temperature control of oxygenated gas (or air). The embodiment is useful, for example, in association with a self-contained plant habitat system, particularly a system which is functional for plant growth in a space vehicle or the like, or in association with an oxygen mask to which oxygenated air of controlled temperature and humidity is being charged for use by a hospital patient or the like.

Embodiments of the present apparatus and methods can be used for humidity control of clean room environments, microorganism culture environments, domestic and commercial buildings, and the like. Embodiments of such apparatus and methods can also be employed in the chemical or electronic (electrical) processing industries to achieve controlled humidity environments for manufacturing or testing operations.

The invention makes possible the avoidance of the so-called "sick building syndrome" by the elimination of standing pools of water which promote undesirable biological growth that can cause sickness and disease (such as Legionnaire's disease and the like).

Various apparatus and modes of application and use will be apparent to those skilled in the art from the description and suggestions provided herein.

The apparatus and methods of this invention provide the feature of being able to either humidify or dehumidify a gas so that a single system can accomplish automatic humidity control of the gas over widely varying conditions of humidity and temperature.

The apparatus and methods of this invention are well adapted to provide high reliability, efficiency and long term continuous automatic operation.

Not only are the present inventive methods and apparatus new and very useful, but also so are the component subassemblies and subsystems and their associated methods of making and use. Such components are efficient and reliable, and they overcome various prior art fabrication, structural and operational problems. Such components are believed to make possible the practical and commercial utilization of systems that incorporate porous interfaces for humidity regulating in various environments.

Additional features, advantages, purposes, embodiments, applications, and the like will be apparent to those skilled in the art from the present specification, associated drawings and appended claims.

BRIEF DESCRIPTION OF THE DRAWINGS

In the drawings:

FIG. 1 is plot illustrating the relationship between porous interface temperatures (as abscissae) and dimensionless mass transfer rate (MTR) or dimensionless heat transfer rate (HTR) (as ordinates) in a gas humidity regulating system of this invention;

FIG. 2 is a diagram illustrating the closed loop control of humidity in a humidity regulating system that employs a porous interface as achieved with a control subsystem of this invention;

FIG. 5 is a fragmentary diagrammatic view of an alternative embodiment of a humidity regulating system of the type shown in FIG. 4 but wherein the recirculating heat pump is replaced by a controlled temperature input water system;

FIG. 22 is a diagrammatic view of another embodiment of a manifolded porous tube array of the present invention;

FIG. 23 is a horizontal sectional view taken through the manifolded tube array of FIG. 22 showing one porous tube in vertical section;

FIG. 24 is a transverse vertical sectional view taken along the line XXIV—XXIV of FIG. 23;

FIG. 25 is an enlarged fragmentary longitudinal vertical sectional view through an end region of one tube structure shown in FIG. 23;

FIG. 26 is a view similar to FIG. 25 but showing an alternative embodiment of one tube structure shown in FIG. 23;

FIG. 32 is a diagrammatic view of an embodiment of a porous interface structure of the present invention;

FIG. 33 is a vertical sectional view across the embodiment shown in FIG. 32;

FIG. 34 is a transverse sectional view taken along the line XXXIIII—XXXIIII of FIG. 33;

DETAILED DESCRIPTION (a) General

Figure 3:
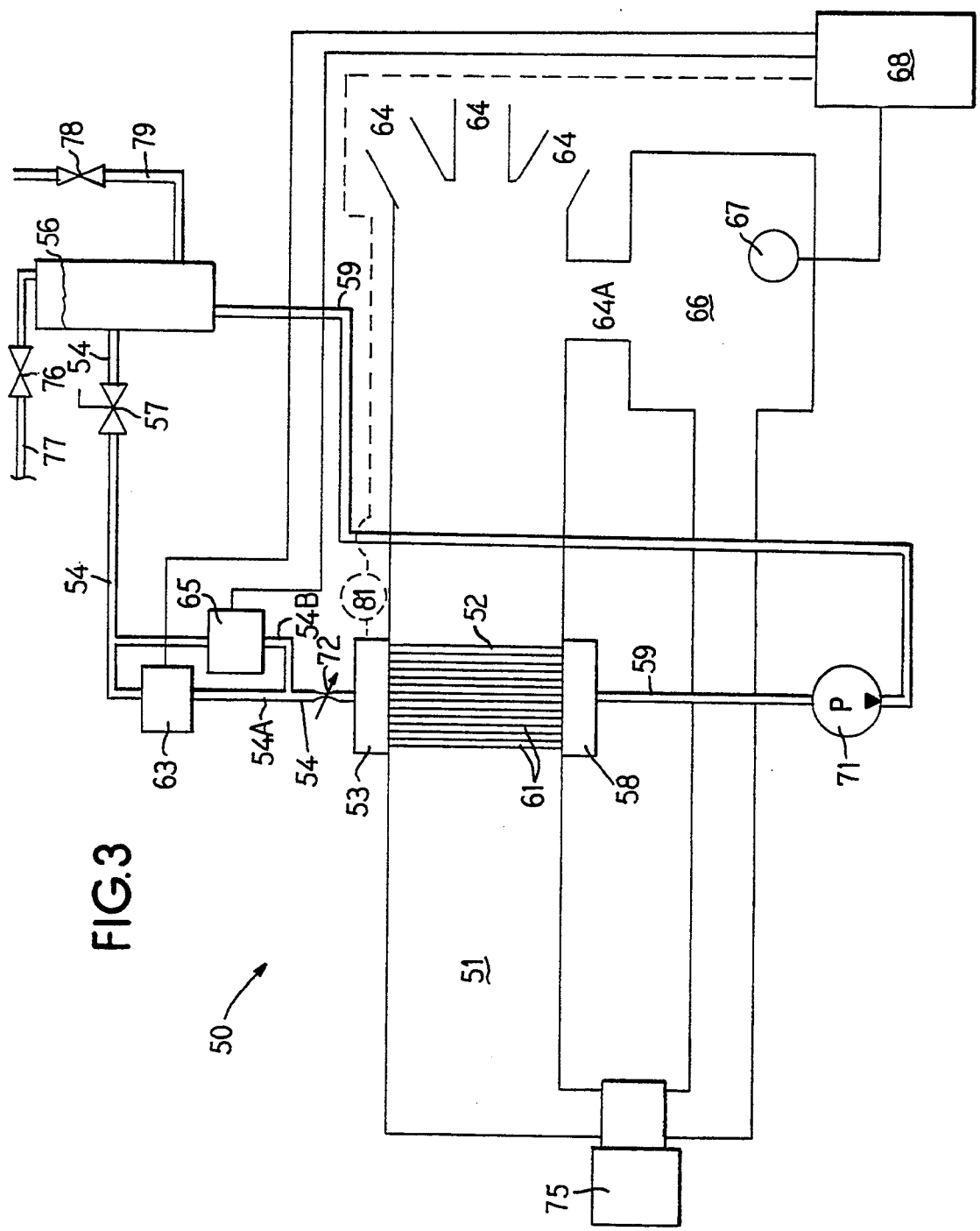
FIG. 3 is a diagrammatic view of one embodiment of a gas humidity regulating system of this invention.

Relative humidity levels which are recommended for human comfort and safety, and for good plant development (important for long-term plant life support on earth or in space) are listed below in Table I:

TABLE I

| Optimal Relative Humidity Levels and Acceptable Range for Human Comfort and Safety, and Plant Growth | |
|---|---|
| Activity | Acceptable Range |
| Human comfort | 20–80% |
| Safety | 45–65% |
| Plant growth | 50–90% |

For human comfort, relative humidity levels should be within the range of about 20 to about 80% depending on the dry bulb temperature and season of the year (to prevent excess moisture loss from mucous membranes and drying out of the skin and hair). For safety considerations, relative humidity levels of 45% or higher are usually desired for the reduction of static electricity, particularly in the presence of flammable materials. Relative humidity levels of about 50 to about 60% have also proven effective in controlling air-borne infection.

The ASHRAE Handbook "Fundamentals, SI", 1989 Edition, pg. 8.14, FIG. 5 discloses a humidity comfort zone which is approximately defined by a parallelogram. The lower parallelogram line is at a dew point temperature of 1.7° C. and the upper parallelogram line is at a dew point temperature of 16.7° C. The vertical parallelogram side lines are slightly slanted to the left (going upwards). The top corners are at approximately 19° and 26° C., respectively, and the bottom corners are at 20.5° and 27.5° C., respectively. This parallelogram covers summer and winter conditions. A good average that would cover both summer and winter uses a temperature of about 23° C. for which the relative humidity extends from about 25% to about 67% and the average is about 50%.

Humidity control systems of this invention utilize the principle that a gas can contain only a limited quantity of water vapor at any given temperature. At vapor saturation, any attempt to add additional vapor results in condensation and the formation of fog or dew. A gas that contains a maximum water vapor is said to be "saturated" and/or "at the dew point". At this condition, the "dry bulb temperature", the "wet bulb temperature", and the "dew point temperature" are all identical, and the "relative humidity" is 100%. A gas that contains, for example, only 60% of the maximum amount of water vapor has a relative humidity of 60%. Relative humidity is a ratio of the water vapor mass contained in the air to the maximum water vapor mass that could be contained at any given temperature. Transducers are commercially available that can measure the relative humidity with sufficient accuracy for most control purposes.

Although relative humidity is a good measure of "comfort", it is a poor indicator of the actual quantity of water vapor contained in the gas. This quantity is better described by the "humidity ratio" (also called the "absolute humidity" or the "specific humidity") which is defined as the mass of water vapor contained in one unit of mass of dry gas. No known transducer can directly measure the humidity ratio, but it can be determined from other measured quantities. The word "humidity" herein generally denotes the humidity ratio.

If a gas that is not saturated is cooled in a constant pressure enclosure, a temperature is reached at which fog or dew will begin to appear. This temperature is called the dew point temperature (Tdp). During this cooling process, the humidity of the gas remains constant, but the relative humidity increases reaching 100% when the gas temperature reaches the dew point temperature. The dew point temperature can be measured directly using, for example, a chilled mirror device, and the humidity ratio can be computed directly from the dew point temperature.

Other pertinent temperatures (referenced above) are the gas dry and wet bulb temperatures which are defined as follows. The gas dry bulb temperature (or simply the temperature T) is the temperature indicated by a temperature transducer that is kept dry and is shielded and/or corrected for radiation effects. It is the actual gas temperature. The gas wet bulb temperature (Twb) is the temperature indicated by any temperature transducer that is covered with a wetted wick (or the equivalent) and that is shielded and/or corrected for radiation effects.

The gas whose humidity is being controlled may be air (preferred) or, especially in space applications, a synthetic oxygen-containing gas designed for life support which contains a preselected amount of oxygen plus a predetermined amount of an inert gas or gases, or the like. When a surface (wet or dry) placed in the gas is cooled below the dew point temperature of the gas, moisture condenses out on the surface decreasing the humidity of the gas. If there is no gas flow, the humidity of the gas decreases, its dew point temperature decreases, and the rate of dehumidification decreases as the gas dew point temperature approaches the surface temperature. If there is a continual flow of gas over the cooled surfacer then the dehumidification process can continue at a steady rate.

Conversely, when the surface temperature is raised above the dew point temperature of the gas, and if the surface is wet, then evaporation occurs from the surface, thereby increasing the humidity of the gas and increasing its dew point temperature. If there is no gas flow, the rate of humidification decreases as the rising gas dew point temperature approaches the surface temperature. If there is a continual flow of gas over the heated surface, then the humidification process continues at a steady rate so long as the surface remains wet.

If the surface temperature is set equal to the gas dew point temperature, no humidification or dehumidification occurs.

When as here, the "surface" is a porous interface which separates liquid water from the gas, the water in contact with the porous interface is held at a controllable temperature. The rate of condensation upon the porous interface determines the rate of dehumidification, and the rate of vaporization upon a porous interface determines the rate of humidification of a gas. Both the rate of condensation and the rate of vaporization are dependent upon the area of the interface, on the properties of the surrounding gas/vapor mixture (temperature, pressure, relative humidity, flow velocity), and on the temperature of the porous interface. Such a rate is referred to herein as the mass transfer rate (MTR), and is positive for humidification and negative for dehumidification. Various other properties, such as porous interface material and thickness, gas flow and property variations along the porous interface, the number of heat and mass transfer units (a dimensionless measure of heat and mass transfer capacity), and the like, all affect the MTR.

The dew point temperature of the gas flowing over a porous interface, the temperature of the water at the porous interface, and the velocity of the gas relative to the porous interface are the primary variables that determine the mass transfer rate (MTR) for evaporation from, or for condensation on, the porous interface. The measurement of these two temperatures is essential for control of the MTR. The gas dew point temperature can be variously measured. For example, it can be measured directly using a chilled mirror transducer, or the like, or it can be determined indirectly by calculation from the gas dry bulb temperature and the relative humidity both of which can be measured by transducers, or the like. Usually, the pressure of the surrounding air (or gas) varies over a small range and need not be monitored, but the pressure difference between the gas and the liquid water either should be assumed to be substantially constant (or negligibly variable or to vary within a contemplated operating range), and/or should be monitored and maintained (i.e., controlled) within a prescribed range, for example, a range defined by bubble point and droplet point pressure differences, or the like.

The use of a porous interface in humidity control can be understood with reference to FIG. 1. The temperature $T_w$ of the porous interface (and of the water at the interface) is shown as the abscissae values, and the dew point temperature Tdp and the air dry bulb temperature, respectively, are shown as vertical lines along $T_w$. Values for the mass transfer rate MTR are shown as ordinate values, with positive quantities above zero indicating humidification and with negative quantities below zero indicating dehumidification.

Values for the heat transfer rate HTR are also plotted with positive values for heating and negative values for cooling.

By the present invention, the water temperature at a porous interface can be controlled so that the rate of heat to mass transfer is controlled. Thus, one of the unique features of controlling the temperature of the water in contact with a porous interface is the ability to control the ratio of heat and mass (water) transfer. This feature is usable to advantage when both temperature and humidity control are required. Because heat and mass transfer through the porous interface are driven by different potentials—the first by the dry bulb and tube water temperature difference (or equivalent), and the second by the gas and tube water vapor density difference (or equivalent)—the values for the heat transfer rate (HTR) and for mass transfer rate (MTR) do not change signs at the same condition. Referring to FIG. 1, it is seen that there are three practical regimes of operation as follows:

1) If $T_w$<Tdp, then HTR and MTR are both negative (heat and water are removed from the gas).
2) If Tdp<$T_w$<Tdb, then HTR is negative and MTR is positive (heat is removed from, and water is added to, the gas).
3) If Tdb<$T_w$, then HTR and MTR are both positive (heat and water are added to the gas).

A fourth theoretically possible operating regime, where HTR is positive and is MTR are negative, is not actually possible with a wet porous interface and can only be accomplished with additional heating. However, the requirements for most applications are met with the three regimes that are attainable. By adjusting the water temperature, it is possible to vary the ratio of HTR to MTR so as to meet the changing load requirements for heat and for moisture (humidity) control.

An embodiment of this invention characteristically utilizes a porous interface which is located in a gas environment that is being humidity and optionally temperature controlled. Water at the porous interface is preferably maintained at a "suction" (negative) pressure to prevent water from seeping out of the porous walls into the gas environment. Warming the water at or near the porous interface so that the temperature of the porous interface wall is above the dew point temperature in the gas environment causes water to evaporate from the porous walls into the gas. Cooling the water at or near the porous interface so that the temperature of the porous interface wall is below the dew point temperature causes water to condense out of the gas environment and to collect on the exterior wall portions of the porous interface. As the moisture condenses, it moves into the interior of the tube through the pores of the porous interface wall and is removed with the flowing water.

Thus, to achieve or maintain a desired humidity level in a gas at a given gas environment temperature in accord with this invention, the porous interface temperature can be regulated by the temperature of the liquid water that is in contact with the porous interface. By maintaining the porous interface at the dew point temperature of the surrounding gas, the humidity in the gas does not change. However, a system of this invention can be operated with the porous interface maintained (i.e., controlled) at temperatures that are either above or below the contacting gas dew point temperature for purposes of achieving humidity control of that gas, as described herein.

(b) The Porous Interface

A porous interface can have many different forms and structures and can involve planar, cylindrical and other porous surfaces. The porous material comprising a porous interface can have various shapes, thicknesses, sizes (including pore size and distribution) and the like. The porous material can be used in various configurations. A present preference is to employ porous material that is structurally rigid under the conditions of use.

A porous interface can incorporate or be comprised of one or more of various known porous materials, such as porous metals; porous ceramics, such as fired clay tubes; woven and/or non-woven fibrous thin walled organic or inorganic materials, such as fabrics (natural or synthetic), cellulosic papers, filters (or natural or synthetic fibers), and the like; molded and/or mechanically, physically, or chemically altered sheet-like media comprised of organic or inorganic (non-metallic) materials, such as porous polymeric membranes, and the like; leathers (natural or synthetic); mixtures of such materials and/or such porous media made therewith, and the like. The porous interface material may be constructed from a composite of materials, such as a composite of materials made by combining a thin porous interface (1 to 1000 $\mu$m in thickness) with a perforated support structure. For example, such a composite can comprise a perforated metal cylinder which is slipped over a convoluted, thin porous sheet structure comprised of ceramic.

A porous interface material can be hydrophilic or hydrophobic. Hydrophilic materials are easily wetted by liquid water, but hydrophobic materials are not. Both porous material types may be used in practicing the invention, but hydrophilic materials are now preferred because they are now believed to be more effective in insuring that the liquid water can pass through the pores. For example, porous stainless steel tubes are hydrophilic and plastic porous tubes are generally hydrophobic unless specially treated.

The thermal conductive properties of a porous interface material can vary and can be important for purposes of controlling the temperature of a porous interface material particularly when the material is in sheet form and particularly relative to the dew point temperature of the gas.

Pore characteristics of a given porous interface material can vary as regards such variables as pore size, pore size distribution, number of pores per unit area (i.e., the pore density) of interface material surface, and the like.

In order for a porous material to be a suitable porous interface material, it must maintain a separation between the gas and the liquid water. The separation is associated with surface tension phenomena at the gas/liquid/solid intersections within the pores of the interface material. Two macroscopic tests that are suitable for use in determining porous material suitability are the "bubble point pressure" test and the "droplet point pressure" test which are defined as follows. Consider a porous tube containing liquid water and with a gas on the outside. The "bubble point pressure" is the minimum pressure difference across the porous tube wall that is required to induce gas flow into the liquid (ASTM E123-87). The "droplet point pressure" is the minimum pressure difference across the porous tube wall that is required to induce liquid flow through this wall into the gas. A material is suitable if there exists some reasonable range of pressures that result in neither gas flow nor liquid water flow through the porous wall.

The spread between these two pressures for a given porous interface depends upon the pore size distribution and material porosity, not simply on the nominal pore size. As a result, porous interfaces from different manufacturers with the same nominal pore size can have different bubble point and droplet point pressures. Preferably, porous materials are used which have a high degree of homogeneity over the porous interface area in order to avoid local spots of liquid water or gas leakage.

Thus, a suitable porous interface material has a droplet point pressure and bubble point pressure that allows the passage of water through the porous interface material and prevents the passage of the gas through the porous interface material under the contemplated conditions of use in the practice of this invention.

A presently preferred porous interface material is porous stainless steel in the shape of a circular tube. Such a material and shape is available commercially in various tube sizes and in various pore sizes and pore distributions. For example, presently preferred porous stainless steel tubes are available commercially from Mott Metallurgical of Farmington, Conn. Such tubes control the negative pressure of the liquid water in contact with the porous interface in the range of about 15 to about 150 cm $H_2O$. Corresponding suitable pore sizes are preferably in the range of about 10 $\mu$m down to about 0.2 $\mu$m, and more preferably, are in the range of about 0.5 to about 2 $\mu$m. The present preference for the geometric structure of the porous interface is to use porous tubing with an inside diameter in the range of about 3 to about 22 mm, and a wall thickness in the range of about 1 to about 3 mm, although larger and smaller tube inside diameters and wall thicknesses can be used. The pore size, the pore size distribution and the number of pores per unit area of a porous interface (or pore density) can vary.

The changes in the temperature and in the humidity of a gas flowing transversely across a single porous tube at reasonable velocities are usually very small. Thus, a single porous tube that contains water usually has a small effect on the humidity and on the temperature of air moving over the tube. Consequently, for practical or typical porous interface embodiments of this invention that employ porous tubes and that are used in situations where a considerable volume (or total mass) of air is to be humidity controlled, it is necessary to employ a porous tubular interface structure that uses a multiplicity of porous tubes. If the porous interface structure involves planar porous surfaces, then such surfaces should have an effective porosity which is practical for intended humidification control purposes.

When a porous tube plurality is employed (preferred), it is preferred that the tube plurality be associated in a structure that comprises a manifolded tube array. The effective size of a particular manifolded tube array including the number of tubes depends on the desired HTR and MTR performance and the conditions of the gas whose humidity is being controlled.

In a porous interface employing porous tubes, the tubes are preferably oriented horizontally (relative to gravity) and also transversely (i.e., perpendicularly) relative to the direction of gas flow, although various tube orientations and configurations can be employed. Spaced, parallel porous tubes are preferred. A porous interface does not require the presence of a gravitational force to operate.

It is presently convenient and preferred to employ as the porous interface a tube array wherein a plurality of spaced, parallel porous tubes are ganged or arranged together preferably in a staggered and aligned relationship to one another, and wherein the individual tubes are functionally interconnected at their respective common opposite ends by a pair of manifolds. Water is then piped to one of these manifolds and taken away from the other so that the individual tubes of the plurality are generally simultaneously provided with water at a predetermined flow rate or pressure. Multiple passes, baffles, and turbulence inducing elements and the like may be employed to enhance performance as is commonly known to those skilled in the art.

(c) Components of Humidity Systems

A humidity control system of this invention utilizes, in addition to a porous interface structure, water, water temperature and pressure regulation means, means for water supply including piping, sensor means, humidity set point means, control means, and, preferably, a water reservoir means.

Conventional water heating and cooling means and conventional water pressurizing means (in particular, pump means) can be used, if desired, to control the temperature of the porous tube walls and to control the pressure of the water inside the porous tubes, respectively.

Means for temperature, and (commonly) also pressure or flow rate, control of water can be provided by any convenient operable conventional device. Such a means, as selected for a given system embodiment, is typically related to system variables, such as the system complexity, the control means being utilized, and the accuracy of humidity control desired, the volume of gas to be humidity controlled, the heat transfer rate (HTR) or mass transfer rate (MTR) performance desired, and the like. Flow of water (as distinct from mere contact at some pressure which can be at or below ambient pressure of the environmental gas) over one side of a porous interface material (while the other opposed porous interface side is in contact with the environmental gas being humidified) is desirable and presently preferred, but is not necessary for operability, as those skilled in the art will appreciate. Preferably, the environmental gas is flowing over one side of the porous interface.

The different embodiments of the invention that are described herein illustrate various examples of systems and system components that can be used. From this description, those individuals of ordinary skill in the art will readily understand the use and selection of components for particular porous interface temperature and pressure regulation at a particular porous interface for purposes of practicing the present invention. For example, workers in the art will appreciate that the interconnecting piping employed need have no special characteristics and is usually sized and determined according to the particular system considerations.

The particular individual sensors employed for a system are preferably conventional and each is preferably capable of producing an electric signal output that is representative of the particular variable being sensed, such as temperature, pressure, humidity, flow rate, or the like, as desired. The output electric signal of a sensor is used directly or indirectly as an input to the control means. Various sensors are illustratively described herein.

(d) Control Subsystems

The control subsystem for a system can utilize a conventional controller, computer, microprocessor, set point control device, or like means. Such control means can be a device which receives input variable signals from at least one sensor, which operates thereon by some form of coupling or the like, and which produces at least one output control signal that is suitable for regulating the operation of at least one responsive, variably operatable component of the system to achieve a set point humidity level in an air (or gas) mass whose humidity content is being controlled.

The type and complexity of the control subsystem employed in any given system depends on various factors, such as the system complexity, the accuracy of the humidity control desired, and the like. The different embodiments of the invention that are described herein include exemplary types of control subsystems and porous interface structures. From this description, those workers of ordinary skill in the art will readily understand the use and selection of control subsystems embodiments that are suitable for use in the practice of particular humidity regulating systems of the present invention.

A control subsystem for a humidity regulating system of this invention automatically regulates the rate or amount of water evaporation from, or of water condensation upon, the porous interface. As indicated above, this regulation of MTR can be achieved by controlling the temperature of the porous interface. Water transfer through the porous interface is carried out in response to the sensed humidity of the gas whose humidity is being controlled.

The manner in which a computerized control subsystem of this invention achieves closed loop control of humidity in gas humidity regulating system that employs a porous interface is illustrate in simplified form in FIG. 2. A humidity sensor 96 senses the existing actual humidity of gas whose humidity is to be regulated and produces an output electrical 97 signal that is representative of the sensed input interface 98 (relative to a control device 88, which is a computer or microprocessor). From interface 98, a signal 87 that is representative of the sensed actual humidity is forwarded as an input to contral device 88. A desired or set point humidity value 86 (usually in the electrical signal equivalent form) is separately input into control device 88. In control device 88, signal 86 is compared with the signal 87 and an error signal 89 is generated. The error signal 89 is acted upon preferably by a control algorithm 91 which is functionally associated with the control device 88, and an output control signal 92 results which is fed to an output interface 93. From interface 93, a signal 94 is fed to an adjustable regulating means 95 which is functionally associated with the porous interface (not shown) and which determines the operating temperature of the porous interface in response to the control signal means 92 that is processed through interface 93.

In a presently preferred control subsystem of this invention, the temperature of the porous interface walls is controlled by automatically controlling the temperature of the water that is placed in contact therewith. For example, in a manifolded porous tube array, water can be passed into the individual tubes at a water temperature which is automatically adjusted in response to the differences between the set point humidity and actual levels of gas humidity. The actual (or sensed instantaneously existing) gas humidity level can be variously measured; for example, as relative humidity, dew point temperature, wet and dry bulb temperatures or the like from which the absolute humidity can be computed. The regulation of water temperature in the porous tubing means is used to correct for any deviation between the actual (or sensed) humidity level in the gas whose humidity is being controlled and a set point (or desired) humidity level. When the sensed gas humidity level is below the set point humidity, the temperature of water in the porous tubing means is maintained at a first temperature which is at or preferably above the dew point of the gas flowing over the porous tubing means. When the sensed humidity level is above the set point humidity, the temperature of water in the porous tubing means is maintained at a second temperature which is at or preferably below the dew point of the gas flowing over the porous tubing means. When the sensed gas humidity level is at about the set point humidity, the temperature of water in the porous tubing means is maintained at about the dew point of the gas flowing over the porous tubing means.

A control subsystem of this invention preferably can receive a variety of input signals as a part of its control function. These input signals can arise from sensors which measure, for example, the temperature and the humidity of the gas whose humidity is being controlled, and they can arise from sensors which measure the condition or state of the humidity regulating system, and its individual components, especially the porous interface condition (interface temperature and water pressure). A control system of this invention can be selected to produce a variety of output signals for regulation or control of the operation of various system components including especially porous interface temperature regulating components, and also preferably water pressure or flow rate regulating components.

The operation of a humidity regulating system can be improved by incorporating into the control subsystem a mathematical model of the system components and/or the gas environment (i.e., a model of the moisture and thermal characteristics of the room or the like). This model allows the use of a control algorithm by a computer in the control subsystem which algorithm is predictive and/or adaptive. This algorithm can be programmed into the operation of a microprocessor or the like which is used to effectuate the operation of the humidity control subsystem.

Thus, in a control subsystem of this invention, the substantially instantaneous sensed humidity level of the gas that is being humidity controlled is monitored, preferably continuously. Monitoring of this humidity level can take place at various locations. Although this monitoring can, for example, take place in a flowing gas at the general location of the porous interface, it preferably takes place at a location downstream from the porous interface. More than one single humidity level monitoring device can be used, if desired, and each device can be located in spaced relationship to the other thereof. The output of such a humidity monitoring device is preferably an electric signal which is fed either directly or indirectly to a control device. After internal processing, the control device then outputs one or more control signals which function to produce and regulate the MTR through the porous interfaces. The MTR is adjusted as needed or desired in order to maintain or achieve a desired or set point humidity in the gas.

Usually, and preferably, at least two different porous interface temperatures must be successively achievable and maintainable. Preferably, various different porous tube means temperatures are achievable and maintainable by the porous interface controlled temperature regulating means (i.e., heating and/or cooling means) which is operably associated with the water that is in contact with the porous interface.

In one exemplary operational mode, water temperatures can be controlled so as to be automatically infinitely variable within a selected temperature range. In another exemplary operational mode, two different water temperatures are utilized, one such temperature being used for dehumidification and the second such temperature being used for humidification, the particular temperature in use being selected by the control means. A mixing of the two differently heated water supplies can be accomplished to achieve a temperature which approximates the dew point of the gas being humidified when the dew point is about at the set point.

The temperature of the porous interface at any given time can be set and can be controlled (or maintained) by the control system. Porous interface temperatures need not be separately monitored when water temperatures are being monitored. However, it is presently preferred to monitor water temperatures substantially instantaneously (or on-line) using temperatures that are representative of the porous interface temperatures, to feed electric signals representative of those monitored temperature values to the control means, and to use those values in the control means to generate output signals for control of the water temperature.

The water pressure (preferably negative) that is associated with the water that is in contact with the porous interface has little effect, for humidity regulation purposes, on the MTR occurring at the porous interface. The primary objective of a controlled porous interface water pressure is to maintain the actual water pressure between the droplet point pressure and bubble point pressure of the porous interface. Depending upon the particular humidity control system and its use (or application), the water pressure can be either known (i.e., fixed or variable within set limits) or variable. If the water pressure is variable, the control system can optionally be, and preferably should be, arranged to accomplish and regulate such variations.

Actual monitoring of substantially instantaneous water pressure in the region of the porous interface need not be accomplished. However, when water pressure is to be controlled by the control system, it is now preferred to monitor this variable and to feed preferably continuously output signals representative of the sensed water pressure values to the control means, and to use these values to regulate the water pressure.

Neither the temperature nor the humidity of the gas flowing over the porous interface may be representative of the gas temperature or humidity downstream of the porous interface. For example, in a conventional chamber of a central air heating and air conditioning (cooling) system, the flowing air temperature in the region of the porous interface may be appreciably greater or less than at a downstream location after the flowing air has been mixed with the chamber air, and also the relative humidity of the flowing air in the region of the porous interface concurrently may be appreciably lower or greater than at a downstream location even after the flowing air has been mixed with chamber air.

In a control subsystem where the system is controlling only humidity, it may be sufficient only to monitor the downstream humidity and to feed the monitored value to the control means as when the temperature of the gas in the region of the porous interface is known or is maintained within a predetermined elevated humidity range relative to the downstream gas mass.

Thus, to achieve a desired (i.e., set point) humidity level in a gas when the humidity of the gas is not at the set point, the temperature of the porous interface (or the temperature of the porous water in contact with the interface) is preferably adjusted by an associated control means to be either above or below the gas dew point temperature in the region of the porous interface. This allows either the humidification or the dehumidification to occur, whichever is necessary to reach the desired or set point humidity. Water pressure can be concurrently controlled.

Once the set point humidity is reached (i.e. sensed) at the location(s) of humidity sensing in the gas, the dew point temperature of the flowing gas in the vicinity of the porous interface may or may not be equal to the porous interface temperature. If the gas dew point temperature equals the porous interface temperature, then no humidification or dehumidification takes place through the porous interface. The control system and the porous interface temperature are preferably adjusted by the control means so that the gas dew point and the porous interface temperatures do not coincide, except possibly when the set point humidity is reached.

When the temperature of the porous interface is settable and maintainable by the control means, the rate at which humidification and dehumidification (MTR) of the surrounding flowing gas occurs can be regulated. Regulation of MTR is then achieved by adjusting one or more of the following variables (for a system where the size and characteristics of the given porous interface are fixed):

(a) The differential between the porous interface temperature and the gas dew point temperature. (This can be achieved by directly adjusting the temperature of the water in contact with the porous interface, by indirectly adjusting the temperature of the water in contact with the porous interface, by adjusting the flow rate of the water, by directly adjusting the temperature of the porous interface, or by a combination thereof).

(b) The gas flow rate across the porous interface. (This can be achieved by directly adjusting the flow rate of the gas, by passing a controllable percentage of the total gas flow across the porous interface while diverting the remaining gas flow around the porous interface and subsequently recombining the two gas flows downstream of the porous interface, or by a combination thereof).

In a system application using variable (a) to regulate MTR, the higher the temperature of the porous interface is above the gas dew point temperature, the greater is the humidification rate, while the lower the temperature of the porous interface is below the gas dew point temperature, the greater is the dehumidification rate (within system limits).

In a system application using variable (b) where the gas contacting the porous interface is flowing, the gas flow rate across the porous interface can be increased or decreased to influence the MTR. An example comprises porous tubes positioned in a duct through which air at a given temperature and pressure is conveyed. Acceleration to a higher rate of gas flow increases the MTR, whereas deceleration to a lower rate of gas flow decreases the MTR.

As the actual humidity of the gas approaches the set point value, the MTR through the porous interface typically is decreased by adjusting one or a combination of porous interface temperature and/or the gas flow rate. The control means used to determine the MTR can use mathematical models of the gas environment to improve the performance and accuracy of the humidity control system.

The present invention permits control of gas humidity and of gas temperature and one can be decoupled from the other if desired. As illustrated herein, an embodiment of this invention can incorporate, if desired, both humidity control and temperature control of a chamber, room, group or multiplicity of compartments or the like.

As a gas humidity regulating system of this invention increases in complexity, the associated control subsystem that is used for a given system also tends to increase in complexity. However, in all system embodiments, the control subsystem functions to control the MTR through the porous interface.

Instead of gas humidity regulation, a porous interface structure of this invention can be utilized in combination with a control subsystem of this invention to provide a system in which a liquid is contacted with a gas and wherein either the liquid is non-aqueous or the gas is non-oxygen containing, or both. During the contacting, either the blending of initially gaseous and liquid starting materials can be accomplished to produce gaseous or liquid formulations of controlled compositions or characteristics, or the reaction between initially gaseous and liquid starting materials can be accomplished to produce gaseous or liquid products of controlled compositions or characteristics.

Examples of blending include petroleum hydrocarbon processing, and the preparation of gaseous or liquid fuel stocks having predetermined product compositions or predetermined combustion characteristics. Examples of reactions include the controlled contacting of a reactive monomer with a coreactant, such as another reactive monomer, preformed oligomer, low molecular weight polymer dissolved in a carrier liquid, or the like.

Other blending examples include the blending of liquid but vaporizable agents, such as stabilizers, pesticides (including insecticides, fungicides, and the like), catalysts, fumigants, odorants, lubricants, hydrocarbons, and the like with a gas, such as air or an oxygen-containing gas, nitrogen, methane, natural gas, sulfur dioxide, ammonia, and the like.

The term "blending" as used herein, refers to either the controlled introduction of a vaporizable liquid into a gas or the separation by condensation of a condensable gas from a gaseous mixture. The term "reaction", "reacting" or equivalent, as used herein, refers to either the controlled introduction of a vaporizable liquid reactant into a gas that is reactable therewith or the separation of a condensable gaseous component from a gaseous mixture (so as to cause a reaction or further reaction to continue through the favorable shifting of a reaction equilibrium, or the like).

EMBODIMENTS

The invention is further illustrated by the following embodiments.

Embodiment (a)

Referring to FIG. 3, an apparatus embodiment is shown schematically of a relatively simple humidity regulating system of this invention that is designated in its entirety by the numeral 50. System 50 is suitable for association with a conventional heating and air conditioning system for a building or the like. A duct 51 carries a previously processed stream of air (not detailed) which can be comprised, for example, of (a) ambient air, filtered ambient air, (b) filtered and heated ambient air, (c) filtered and cooled ambient air or the like, as desired. Such a stream of air can be associated with, and is output from, a conventional central forced air heating and air conditioning system 75 (not detailed), for example, a system of the type commonly used in residences, or for small office, factory or agricultural buildings, suites of rooms, or the like. Thus, air flowing through the duct 51 is approximately at ambient pressure and has a temperature that falls within a predetermined range.

The duct 51 is interconnected with a series of smaller ducts 64, among which is a duct 64A which delivers the processed air to a central or typical location 66 in the system. At location 66, for example, a thermostat 67 for sensing the temperature of location 66 can be used. That thermostat monitors the temperature at location 66 (as being representative) and determines whether heated, cooled or ambient air is output through the duct 51 in response to a set point temperature that has been input into the thermostat.

Figure 15:
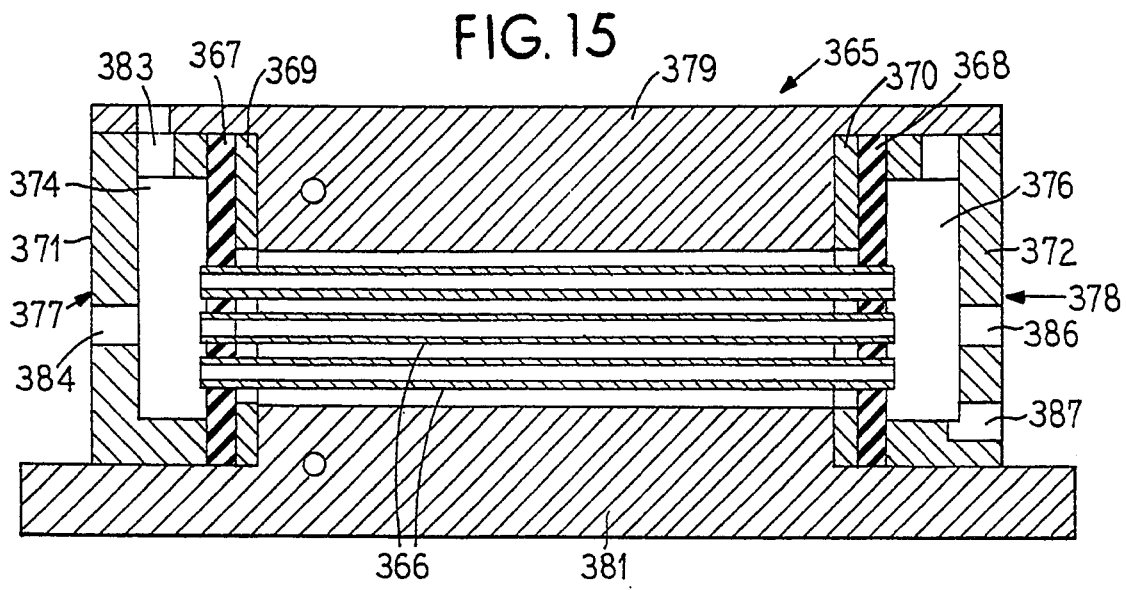
FIG. 15 is a longitudinal vertical sectional view taken along the line XV—XV of FIG. 14.
Figure 14:
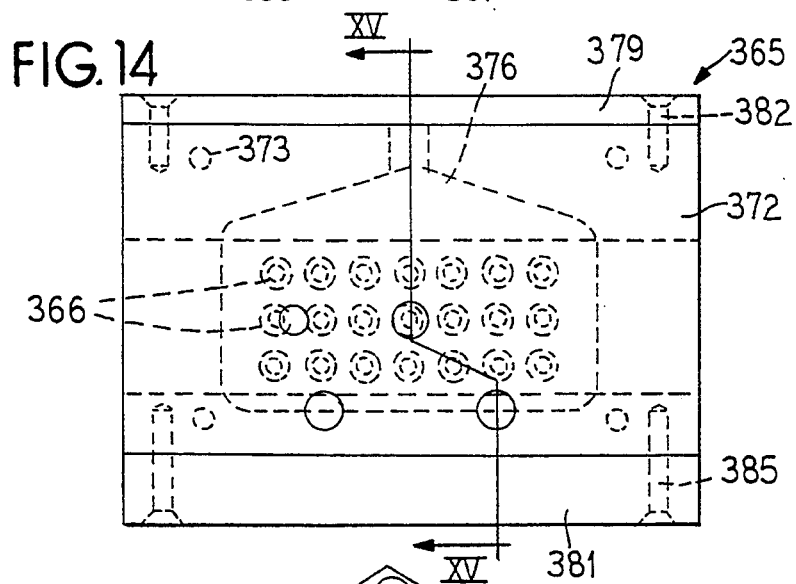
FIG. 14 is an end elevational view of the embodiment of FIG. 13.
Figure 13:
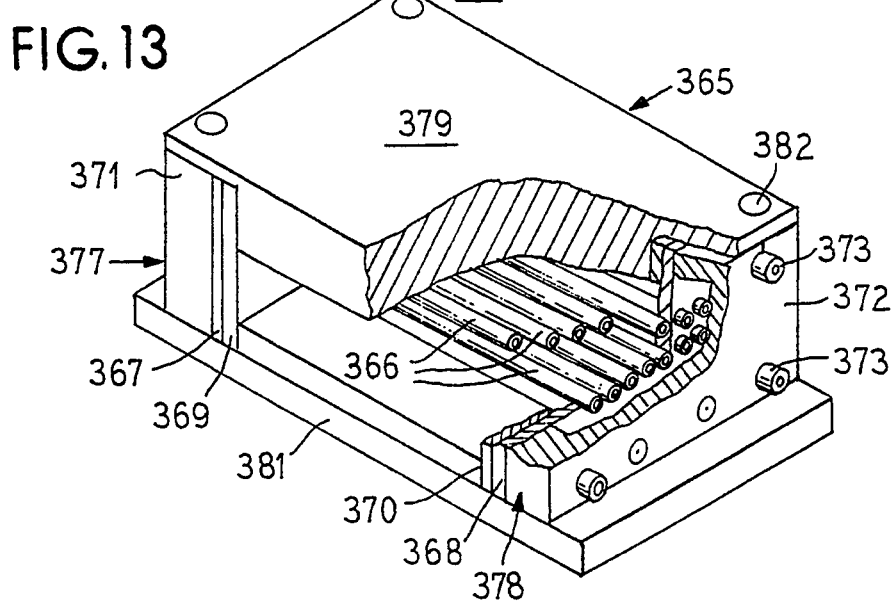
FIG. 13 is a perspective view of one embodiment of a manifolded porous tube array of the present invention, some portions thereof being broken away, and some portions thereof being shown in section.

Mounted transversely across the duct 51 and also preferably horizontally extending is a porous interface structure here illustratively shown as a porous tube array 52 whose structure can have various forms. For example, the array 52 can have a structure as shown in FIGS. 13–15 below and described in Embodiment (h) below. Connected to the input manifold 53 of the array 52 is a supply pipe 54 which is connected to a source of water, shown as a reservoir 56. The water in reservoir 56 can comprise tap (or line) water, distilled water, or the like. The reservoir 56 can be a conventional holding tank which is preferably insulated.

Also, the reservoir 56 can be associated with a float valve 76 which is connected with an input pipe 77 that is joined to a source of water. Valve 76 is adjusted to maintain the water level in the reservoir 56 at a predetermined level. The reservoir 56 can be further equipped with a second float valve 78 that is connected to an overflow pipe 79. The valve 78 is adjusted to discharge water from the reservoir 56 in the event that the water level in the reservoir 56 exceeds a preset level. Connected with the output manifold 58 of the array 52 is a delivery pipe 59 which conveys water discharged from the porous tubes 61 of the array 52 back to reservoir 56.

For convenient start up and shut down purposes, the pipe 54 is optionally provided with a conventional manually operable shut off valve 57.

Connected in series (relative to one another) across the supply pipe 54 between the valve 57 and the manifold 53 is a water heater 63 in branch 54A of pipe 54 and a water cooler 65 in branch 54B in pipe 54. Alternatively, the water heater 63 and the water cooler 65 can be connected in series relative to one another, if desired, with the heater 63 conveniently preceding cooler 65 (relative to the direction of fluid flow). The heater 63 and the cooler 65 are preferably each conventional in structure and operation. Preferably, the heater 63 and the cooler 65 are each of the conventional on-line or on demand type. Water which is charged through both the heater 63 and the cooler 65 via the supply pipe 54 and pipe branches 54A and 54B, and water is either heatable or coolable respectively, during passage therethrough compared to the water temperature associated with the reservoir 56.

The heater 63 and the cooler 65 are each operated with line electricity (lines not shown) and their respective operations are remotely controllable. Preferably, the water heater 63 and the water cooler 65 are each provided with the capacity to relatively rapidly achieve and to maintain a preselected (i.e., set) respective heated or cooled water output temperature.

A pump 71 is connected across the pipe 59. Pump 71 is adapted to operate at a fixed volumetric pumping rate, and can be a positive displacement pump or the like. To regulate water pressure in array 52, line 54 between the combination of the heater 63 and the cooler 65, and the manifold 53 can be provided with a manually adjustable needle valve 72. Thus, a negative pressure across the array 52 is achieved which has a set value that is not regulated by the controller 68 (or other control means).

In using the system 50, the temperature of the air which is being humidity controlled may, for example, be in the range of about 55° F. to about 85° F. (about 12° C. to about 30° C.); the air flow rate through the duct 51 may, for example, be in the range of about 200 to about 400 cubic feet per minute (cfm); the air velocity through the array 52 may, for example, be in the range of about 15 to about 30 feet per second (fps); and the total volume of air being humidity controlled may, for example, be in the range of about 8000 to about 16000 cubic feet per minute (cfm). Each of the system variables employed may be larger and smaller in a given heating and air conditioning system.

A humidity regulating system 50 may, for example, employ a flowing water temperature that is controlled in the range of about 40° to about 110° F., a water pressure (gauge) that is controlled in the range of about −0.3 to about −0.8 pounds per square inch (psi), and a water flow rate that is controlled in the range of about 20 to about 40 gallons per hour (gph). The porous tubing employed in such a system 50 may have, for example, a porosity, pore density, tube diameter, and tube wall thickness characteristics as indicated above. Preferentially, the tubing in the array 52 may, for example, have a total combined tube length in the range of about 30 to about 50 feet between the manifolds 53 and 58.

Those skilled in the art will appreciate that the system 50 of FIG. 3 can utilize various alternative arrangements and components, if desired or available.

Embodiment (b)

An embodiment of a control subsystem that is suitable for functional association with system 50 (see Embodiment (a) above) is shown in combination with system 50 in FIG. 3.

The on/off operation of the water heater 63 and the water cooler 65 is controllable by an associated conventional controller 68. Thus, water at either one of two predetermined temperatures is output from the combination of the heater 63 and the cooler 65 into pipe 54 for delivery into the input manifold 53. Temperature sensors 81 is optionally associated with the manifold 53, for measurement of water temperature, and the sensor 81 is connected with the controller 68. However, a simple control subsystem does not need sensor 81. Optionally, the system 50 can be operated (as explained below) with the present control subsystem so that, when neither the heater 63 nor the cooler 65 is operating, the water from the reservoir 56 at the temperature of the reservoir 56 can be charged through pipe 54 into the manifold 53.

A conventional humidity sensor 67 is positioned in the region of location 66. The electric output signal from the sensor 67 is fed to the controller 68. Controller 68 is provided with a variable but settable humidity set point that is preferably manually settable for a desired humidity level at the position of the sensor 67 at location 66. This set point of controller 68 thus designates a particular humidity that is to be maintained at location 66. Here, the controller 68 operates independently of any controller or the like that is used in combination with a heat sensor and associated settable temperature point. Such a controller is employed for the (conventional) control of circulating air temperature at location 66 or elsewhere in the system.

With water flowing through the array 52 from the source 56, and temperature-regulated air flowing through duct 51, humidity control is achieved as follows. When, on the one hand, the humidity sensor 67 signals the controller 68 that the humidity at location 66 is below the set point value, then the controller 68 outputs a signal that actuates the heater 63 so that the water being circulated through the array 52 from the reservoir 56 is preheated to a predetermined elevated temperature. This temperature is preferably above the dew point temperature of the air passing through the duct 51 and flowing over the tubes 61 of the array 52.

As a result, the air passing through the duct 51 becomes humidified, i.e., has a higher content of water vapor than its starting content. This humidification process continues until the humidity sensor 67 detects that the humidity level in the air at location 66 has arrived at or around the set point value. At this value, the controller 68 shuts down the water heating capacity of heater 63 and the temperature of water flowing through the array 52 drops to a predetermined value. This value can be, for example, the temperature that is associated with the water in the reservoir 56 or otherwise.

When, on the other hand, the humidity sensor 67 signals the controller 68 that the humidity at location 66 is above the set point value, then the controller 68 outputs a signal that actuates the cooler 65 so that the water being circulated through the array 52 from the reservoir 56 is precooled to a predetermined reduced temperature. This temperature is preferably below the dew point temperature of the air passing through the duct 51 and flowing over the tubes 61 of the array 52. As a result, the air passing through the duct 51 becomes dehumidified, i.e., it has a lower content of water vapor than its starting content. This dehumidification process continues until the humidity level in or at location 66 has reached of or around the set point value. At this value, the controller 68 shuts down the water cooling capacity of the cooler 65 and the temperature of the water flowing through the array 52 rises to a predetermined value. This value can be, for example, the temperature that is associated with the water in the reservoir 56 or otherwise.

When the air at location 66 is sensed by the sensor 67 to have the set point humidity value, and the controller 68 is so signalled, the controller 68 shuts down the operation of the heater 63 and the cooler 65.

Figure 10:
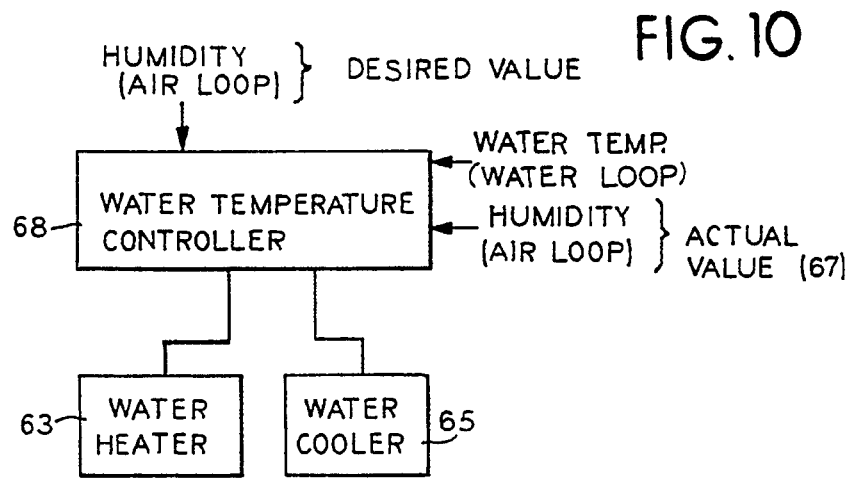
FIG. 10 is a diagrammatic view of the control subsystem employed in the humidity regulating system of FIG. 3.

The control subsystem that is employed in system 50 is illustrated by the layout diagram shown in FIG. 10 which is believed to be self-explanatory. Other alternative control subsystems could also be employed, if desired, in system 50.

Embodiment (c)

Figure 4:
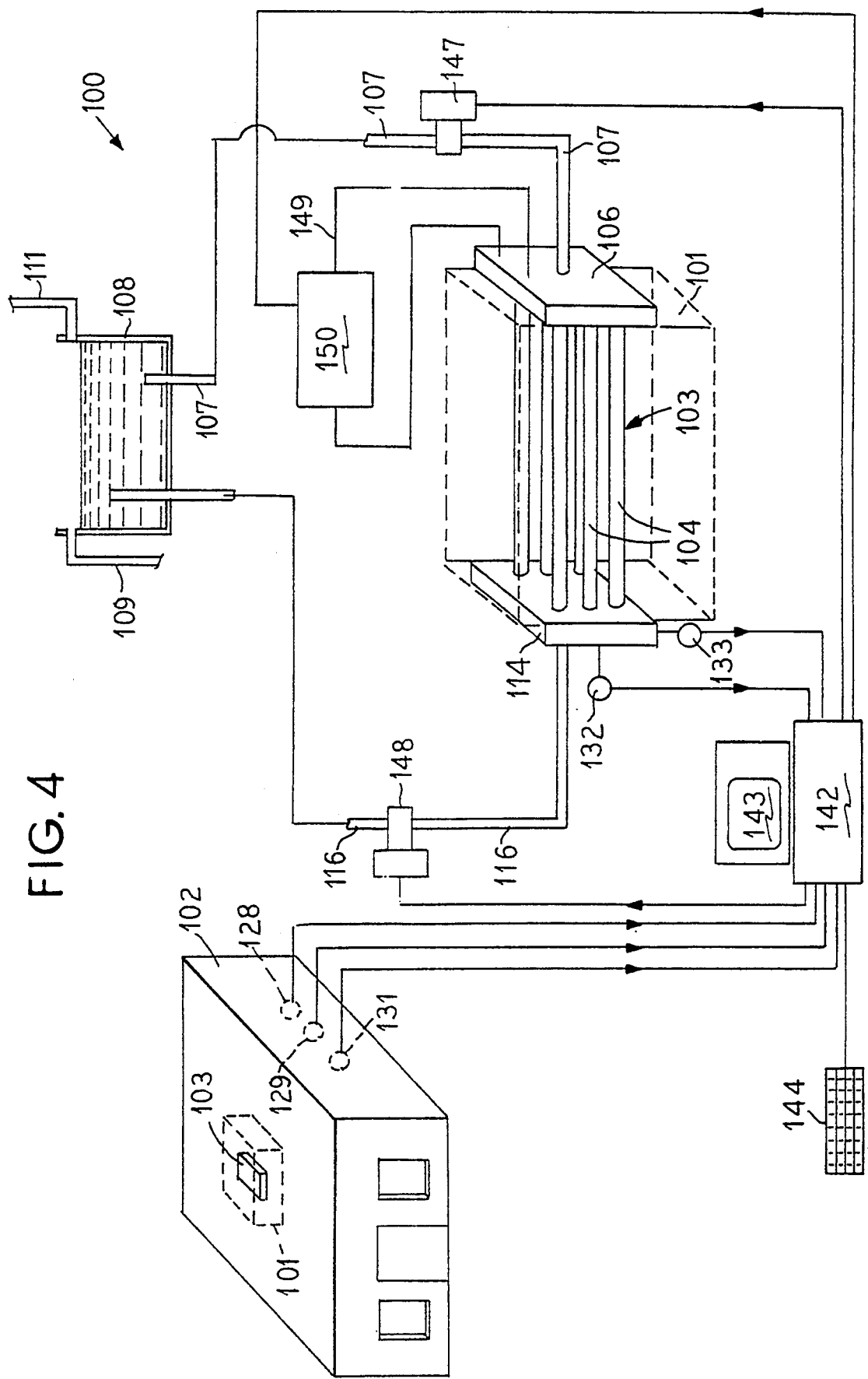
FIG. 4 is a diagrammatic view of another embodiment of a gas humidity regulating system of this invention.
Figure 6A:
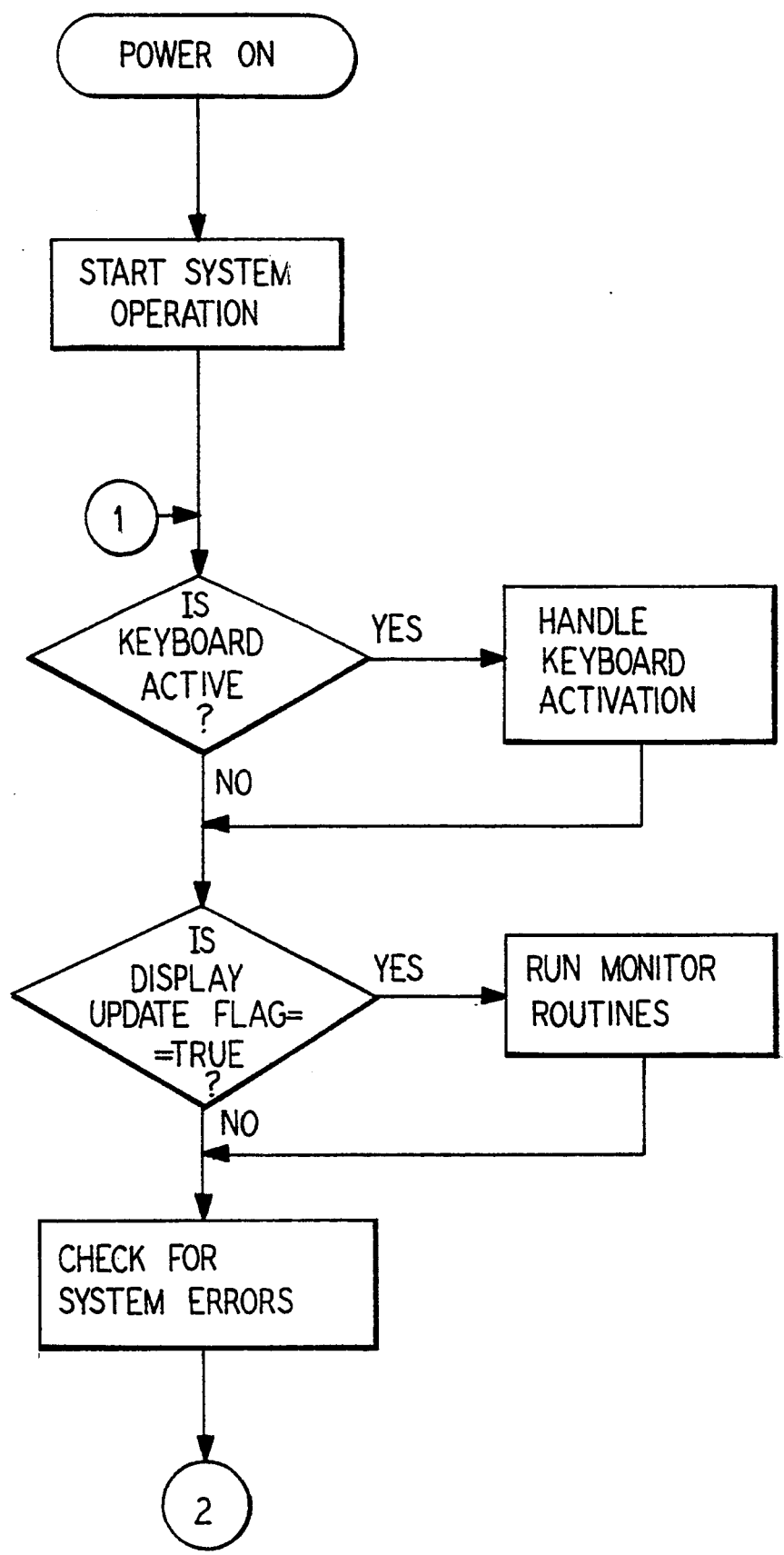
FIGS. 6A-6F comprise block diagrams of one embodiment of a computer program that is suitable for operating the control subsystem of the humidity regulating system of FIG. 4.
Figure 6B:
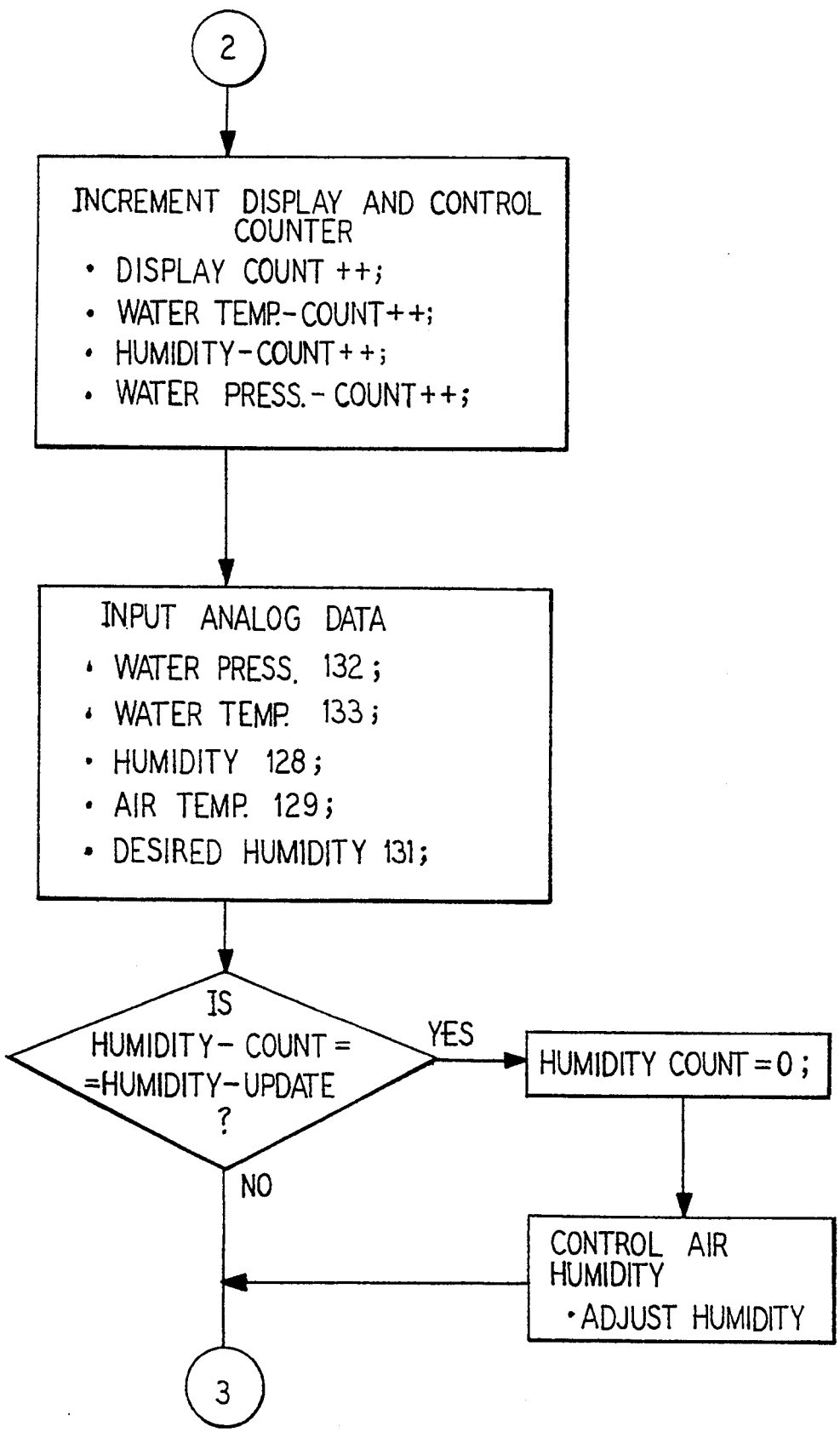
Figure 6C:
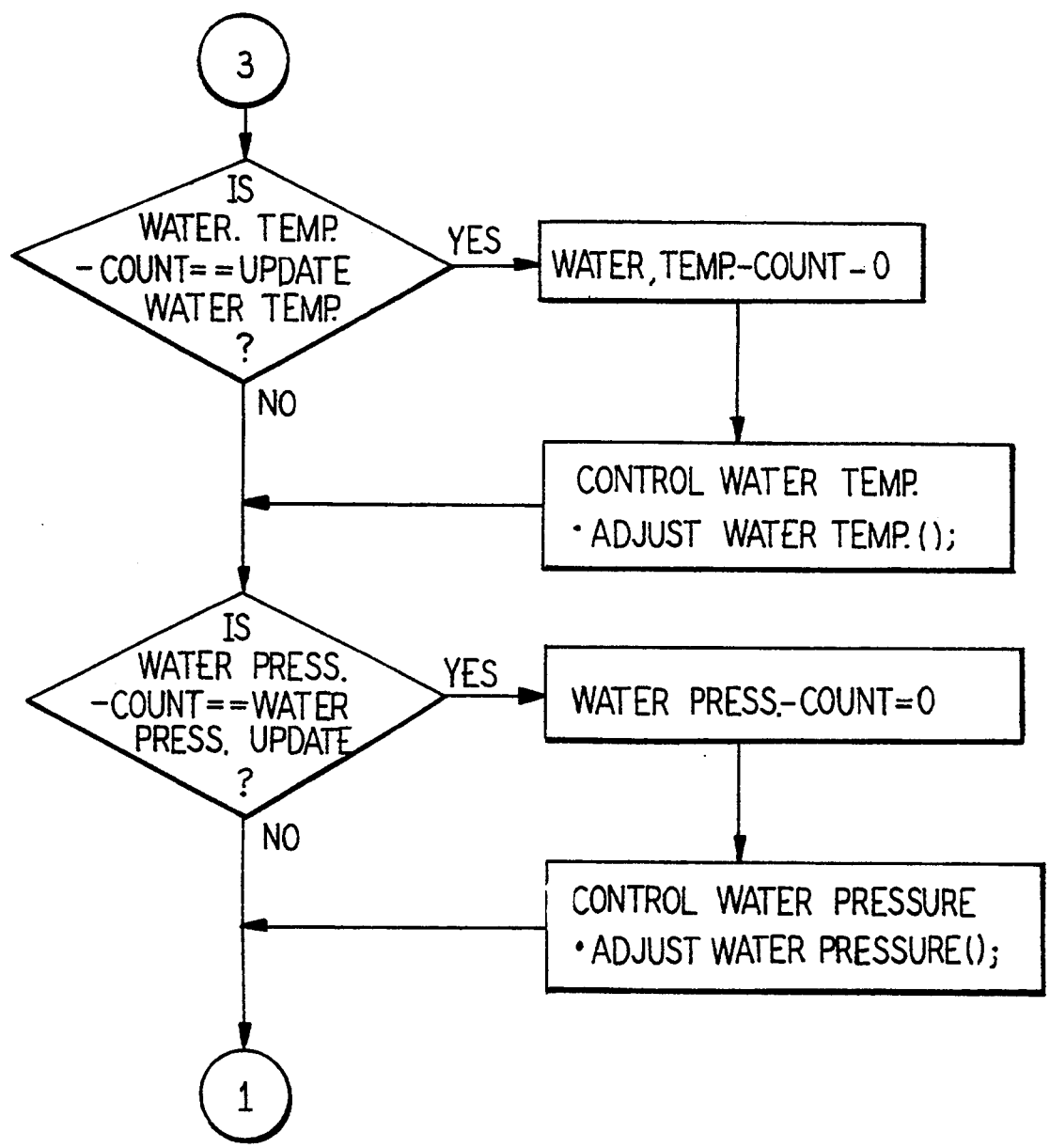
Figure 6D:
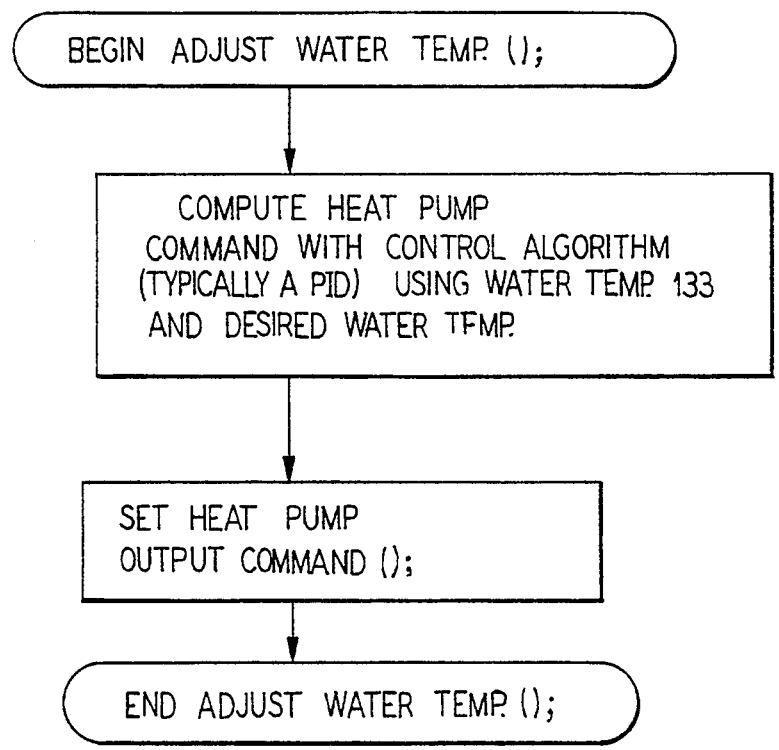
Figure 6E:
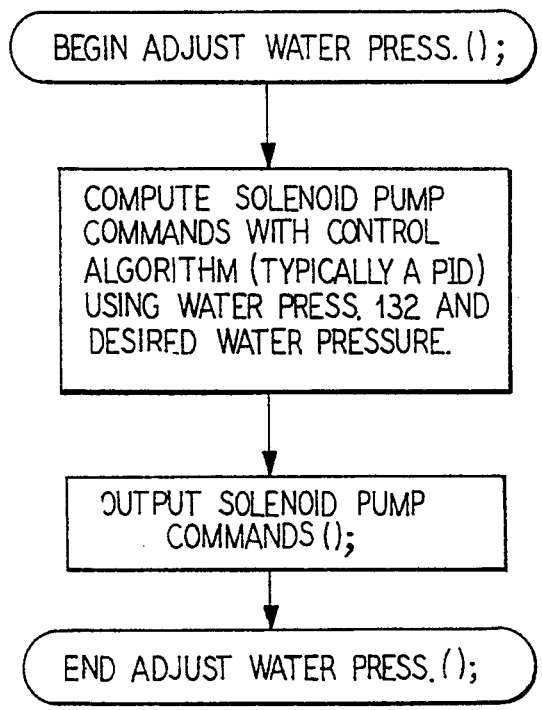
Figure 6F:
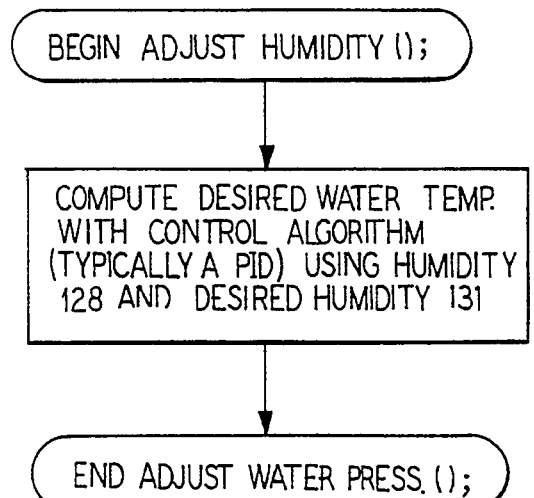

Referring to FIG. 4, there is seen a schematic view of another apparatus embodiment of a humidity regulating system of the invention that is designated in its entirety by the numeral 100. Here, a conventional heating and air conditioning duct 101 (schematically and fragmentarily shown) carries a stream of air (not shown). The air can comprise, for example, filtered, temperature-controlled air that results from processing ambient air in a conventional, but preferably high performance, central heating/air conditioning (cooling) system (not shown). As illustrated, the system 100 is adapted for association with such conventional system so as to provide temperature-controlled air to a controlled environment room (not shown) in a building 102, or the like.

The duct 101 is suitably and conventionally interconnected with such a room in building 102 for air heating purposes. A conventional temperature and pressure control system (not shown) is provided for a central heating/air conditioning system (conventional, not shown), which control system can be independent of the present humidity control system 100.

Figure 19:
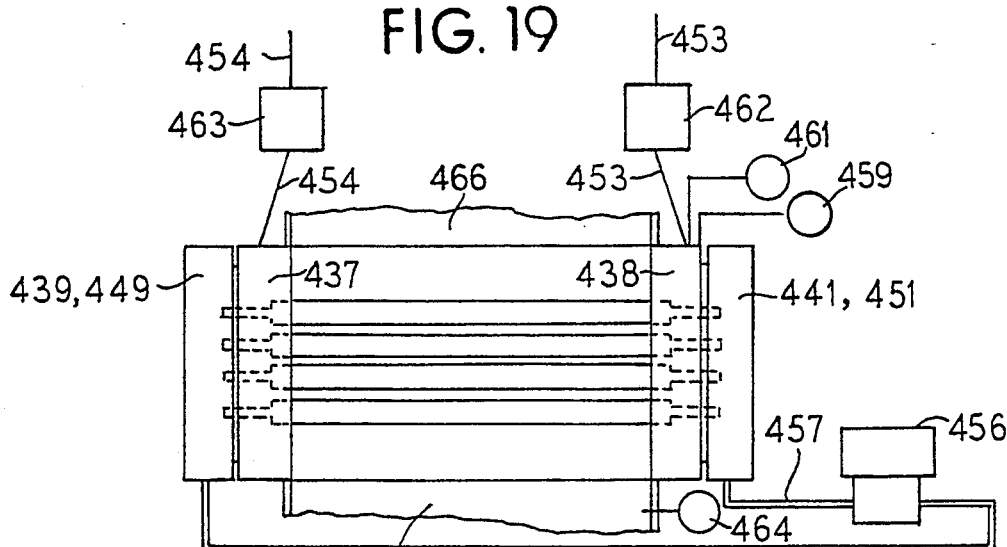
FIG. 19 is a diagrammatic view of another embodiment of a manifolded porous tube array of the present invention.
Figure 20:
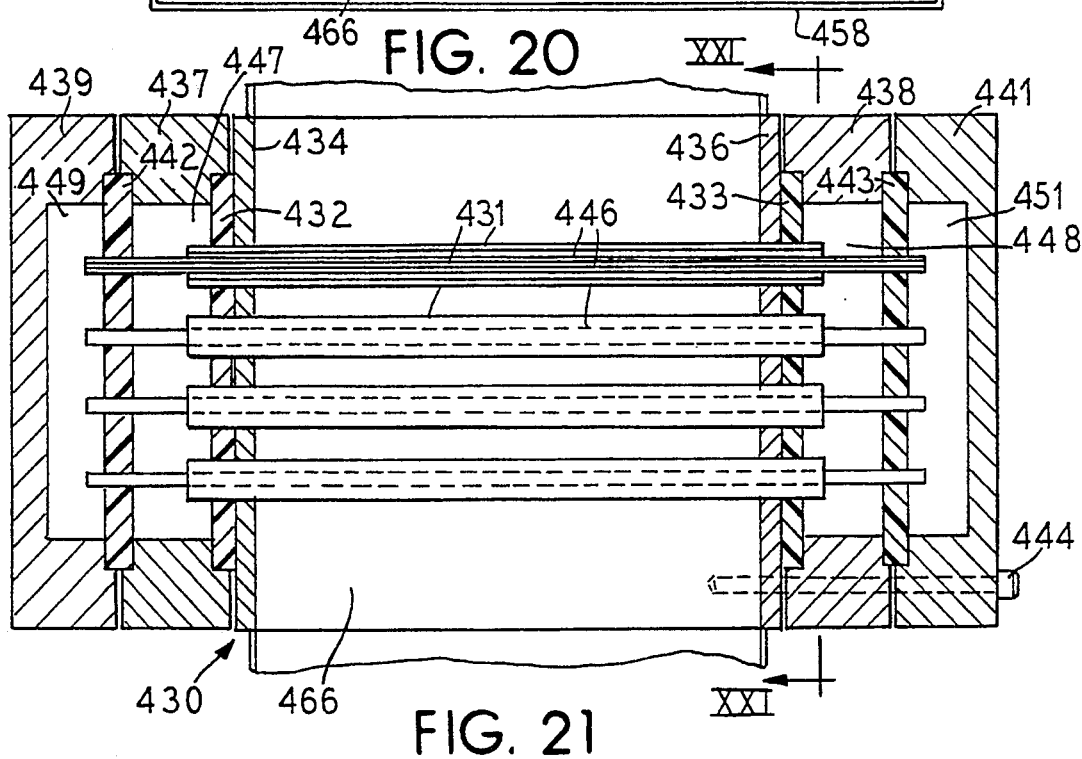
FIG. 20 is a horizontal sectional view taken through the manifolded tube array of FIG. 19.
Figure 21:
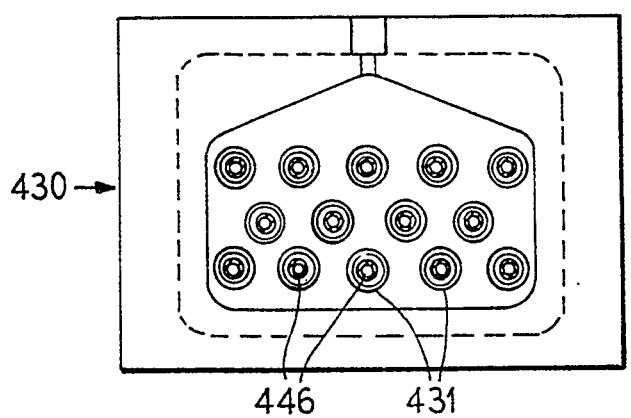
FIG. 21 is a transverse vertical sectional view taken along the line XXI—XXI of FIG. 20.

A porous interface structure, preferably a manifolded porous tube array 103, is incorporated into system 100. Array 103 can have various structures such as described herein. For example, array 103 can have a structure such as shown in FIGS. 19-21 below, and as described in Embodiment (j) below.

The porous tubes 104 of the array 103 are mounted in duct 101 preferably transversely, relative to the direction of air flow, and preferably horizontally, relative to gravity. A water reservoir 108 is optionally incorporated into system 100 but is not required. Connected between the water reservoir 108 and an input manifold 106 which serves as the input for the array 103 is a water input pipe 107. Conveniently, the water reservoir 108 is provided with an overflow pipe 109 which provides a maximum water level control in the reservoir 108. Also, the water reservoir 108 is provided with a water supply pipe 111 from a tap water source or the like. The input supply 111 can be associated with a float valve or the like (not shown), which is adapted to admit water to the reservoir 108 from pipe 111 whenever the water level in the reservoir 108 falls below a minimum level.

Connected across the pipe 107 at a location between the reservoir 108 and the manifold 106 is a remotely operatable solenoid-actuated pump 147 which is normally opened for charging or priming purposes. Thus, water is charged to the manifold 106 from the reservoir 108 through the pipe 107 past the pump 147. From the manifold 106, the water passes through the porous tubes 104 of the array 103, and into a discharge manifold 114. From the manifold 114, the water enters the pipe 116 which connects to the reservoir 108. Connected across the pipe 116 at a location between the reservoir 108 and the manifold 114 is a remotely operatable solenoid-actuated pump 148 which is opened for charging.

In using the system 100, the temperature of the air which is being humidity controlled may, for example, be in the range of about 55° F. to about 85° F; the air flow rate through the duct 101 may, for example, be in the range of about 200 to about 400 cubic feet per minute (cfm); and the air velocity through the array 103 can be, for example, in the range of about 15 to about 30 feet per second (fps); and the total volume of air being humidity controlled may, for example, be in the range of about 8000 to about 16000 cubic feet per minute (cfm). Each of the system variables employed may be larger and smaller in a given heating and air conditioning system.

A useful humidity control system 100 may, for example, regulate the array 103 water temperature in the range of about 40° to about 110° F. and the array water pressure in the range of about $-0.3$ to about $-0.8$ pounds per square inch (psi). The porous tubing employed in such a system 50 may have, for example, a porosity, pore density, tube diameter, and tube wall thickness characteristics as indicated above. Preferentially, the tubing in the array 52 may, for example, have a total combined tube length in the range of about 30 to about 40 feet between the manifolds 53 and 58.

Those skilled in the art will appreciate that the system 100 of FIG. 4 can utilize various alternative arrangements and components, if desired and available.

Embodiment (d)

An embodiment of a control subsystem that is suitable for functional association with system 100 (see Embodiment (c) above) is shown in combination with system 100 in FIG. 4.

When the water pressure in the array 103, as sensed by the pressure sensor 132, is greater than the desired water pressure, the solenoid pump 148 is actuated. The pump 148 then pumps the water through pipe 116 from manifold 114 into the reservoir 108. Pump 148 is actuated repeatedly until the pressure in the array 103 has attained the desired value at which value the pump 148 is deactuated.

Correspondingly, when the pressure in the array 103 as sensed by pressure sensor 132 is less than the desired water pressure, the pump 147 is actuated, and pump 147 then pumps the water from the reservoir 108 through pipe 107 to manifold 106. Pump 147 is actuated repeatedly until the pressure in the array 103 has attained the desired value, at which value the pump 147 is deactuated. When the water pressure in array 103 is equal to the desired water pressure, neither pump 147 nor pump 148 is active and the lines 107 and 116 are closed.

To regulate the water temperature of water in the array 103, a pipe loop 149 is connected to manifold 106 and in turn the pipe loop 149 is connected a heat pump 150. Such a heat pump 150 is conventional and commercially available and can be variously constructed. For example, the heat pump 150 can be (a) a conventional combination of a water heater and a refrigerated cooler with a "Freon"-type coolant or the like), (b) a Peltier thermoelectric heat pump, (c) a thermoelectric heat pump that uses thermoelectric couples and ceramic plates, or the like. A conventional combination heat pump can incorporate, in addition to a water pump which circulates water through the pipe loop 149 and associated water heating and water cooling subassemblies, an internal water temperature control system that is remotely operatable from a control signal input. The heat pump 150 is remotely operable and can adjust the water temperature over a predetermined range.

For operational and control purposes, the system 100 shown in FIG. 4 is provided with various condition state sensors, each of which produce an electrical output signal that is representative of the sensed variable. Thus, the controlled environment room in the building 102 is provided with both a humidity sensor 128 which detects the actual ambient room humidity and also with a temperature sensor 129 which detects the actual ambient room temperature. Also, a humidity set point device 131 is provided in the room where the desired humidity level for the room is set manually.

For operational and control purposes, the system of FIG. 4 is also provided with various system sensors, each of which similarly produce an electrical output signal that is of the sensed variable. Thus, as above indicated, a representative water pressure measurement for the pressure in the manifolded array 103 is provided by a pressure sensor 132 that is associated with the manifold 114. Also, a representative water temperature measurement for the porous tube surface temperature in array 103 is provided by a temperature sensor 133 that is associated with the manifold 114.

Each of the sensors 128, 129, 132 and 133 and the device 131 is connected by wires to a microcontroller unit 142 so that the respective electrical outputs from these sensors are fed to the microcontroller unit 142. The microcontroller unit 142 processes the information received from such sensors and the outputs control signals to the solenoid-activated pumps 147 and 148 and to the heat pump 150, all according to a predetermined processing software program. The program execution sequence, system checks and operating parameters, sensor operability, operating equipment status and the like of microcontroller 142 can be monitored using an associated monitor 143 and command or modifying signals can be input through an associated keyboard 144.

When the sensed humidity which is detected by the sensor 128 is determined by the microcontroller unit 142 to be below the humidity set point associated with the device 131, the temperature of the water in array 103 is lowered to a level determined by a programmed control algorithm in microcontroller unit 142 by sending the appropriate signals to heat pump 150. Also, the water pressure can be adjusted as described previously. In general, the lower the sensed humidity is (as calculated by the microcontroller unit 142) below the set point, the greater the temperature of the water in the array 103 as called for by the microcontroller unit 142, in accord with an associated programmable control algorithm.

When the sensed humidity detected by the sensor 128 is determined by the microcontroller unit 142 to be above the humidity associated with the device 131, the temperature of the water in array 103 is lowered to a level determined by the programmable control algorithm. In general, the higher the sensed humidity (as calculated by the microcontroller unit 142) above the set point, the greater is the temperature of the water in the array 103.

Figure 11:
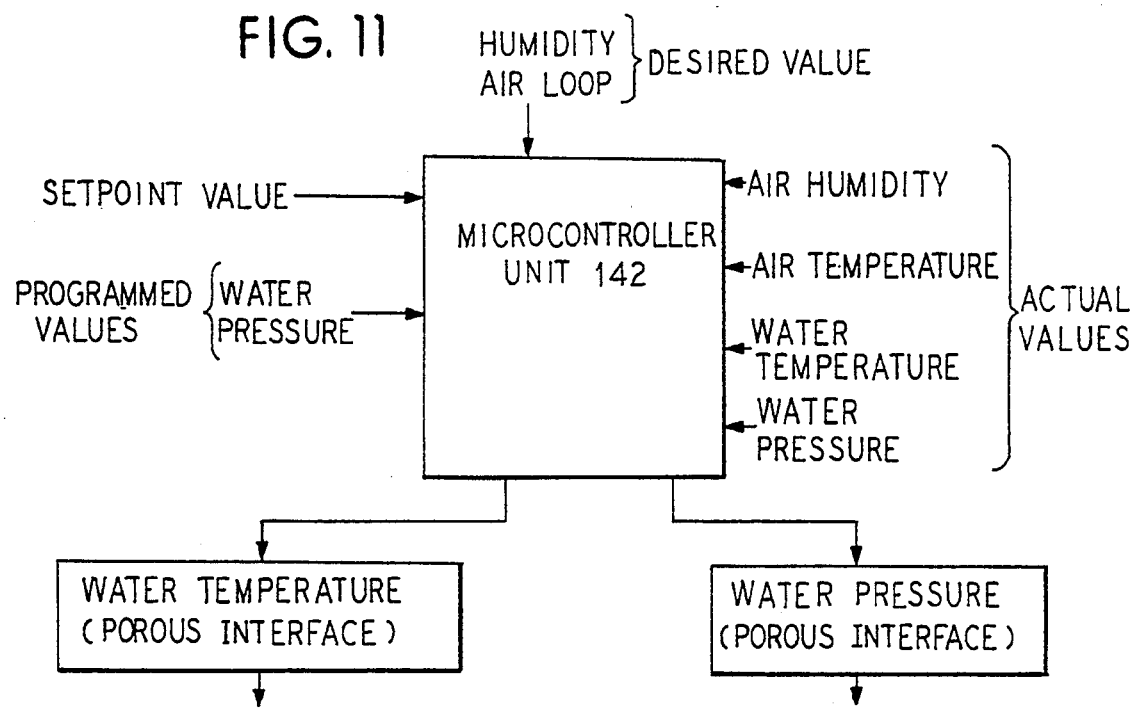
FIG. 11 is a diagrammatic view of the control subsystem employed in the humidity regulating system of FIG. 4.

The control subsystem employed in system 100 is illustrated by the layout diagram shown in FIG. 11. Here the actual values for the temperature and humidity of the air loop and the water loop are sensed and fed to the microcontroller unit 142. Control of humidity in the air loop is achieved by the microcontroller unit 142 from such actual values which unit 142 compares to the desired humidity of the air loop and the programmed values of for the water loop. From such comparisons, control signals are output from unit 142 which regulate the water temperature, and pressure of water in array 103. Other alternative control subsystems could also be employed, if desired.

Referring to FIGS. 6A-6F, a computer processing software program is shown in diagrammatic form that is suitable for use with the microcontroller unit 142 and the control subsystem illustrated diagrammatically in FIG. 9 for controlling the operation of the system 100 of FIG. 2.

The block diagrammatic presentation in FIGS. 6A-6F is believed to be self-explanatory to those skilled in the art and to require no detailed description herein. This software program itself represents an illustrative control algorithm for the processing of difference signals obtained by comparison of measured humidity values to a set point humidity value.

Other alternative control subsystems could also be employed, if desired, in system 100.

Embodiment (e)

A humidity regulating system 175 embodiment is fragmentarily seen in FIG. 5. System 175 is similar to FIG. 4, but, in system 175, the heat pump 150 of system 100 is replaced in system 175 by an on-line type of input water temperature regulating system. Components similar to those in system 100 are similarly numbered to those in system 175 but with the addition of prime marks thereto for convenient identification purposes.

In FIG. 5, a remotely operable solenoid valve 137 is connected across the pipe 107' at a location between the reservoir 108' and the manifold 106'. Valve 137 is normally open. Thus, water is charged to the manifold 106' from the reservoir 108' through the pipe 107' past the valve 137.

To maintain a desired negative (suction) water pressure across the manifolds 106' and 114' a step solenoid valve 118 is positioned in pipe 107' after valve 137 and before input manifold 106'. Valve 118 is remotely operable. Both the water flow rate and the water pressure in the array 103' are regulatable by the pump 148' and the valve 118.

To regulate the water temperature of water entering the manifold 106', a pipe loop 113 is connected with a T-connector to pipe 107 downstream from the valve 137. Across the pipe 113 is connected a valve 112. The valve 112 is conveniently and preferably similar to the valve 118 in both its structure and operation. When water, which is flowing in the pipe 113, passes through valve 112 mixes with water flowing in pipe 107', the temperature of the resulting water stream in the pipe 107' is altered.

The water from the reservoir 108' is normally at ambient (or near ambient) temperature, whereas the water in pipe 113 is at either above or below ambient temperature to a predetermined degree. The rate at which the water having a predetermined temperature in pipe 113 is admixed with the water from the reservoir 108' determines the temperature of the mixed water. The rate of this mixing is controlled by the valve 112. Therefore, to achieve a desired temperature in the mixed water, it is necessary to regulate the temperature of the secondary water flowing in pipe 113.

To regulate the temperature of the secondary water in pipe 113, a water heater 119 and a water cooler 121 are employed, each being preferably of the demand-type. A demand type temperature regulator allows the normally pressurized tap water that is fed, independently to each of heater 119 and cooler 121, through respective supply pipes 122 and 123, to be heatable or coolable (as the case may be) to a predetermined extent during water passage therethrough relative to the temperature of the entering tap water. For simple control, the heater 119 and the cooler 121 are each operated at a predetermined temperature, which can be a manually adjustable or set point output temperature. The output pipe 124 from the heater 119 is connected to the valve 112 through a remotely operatable on/off valve 139, which is solenoid actuated and normally in an open position. Valve 139 is conveniently and preferably similar to valve 137 in both its structure and operation.

The output pipe 126 from the cooler 121 is connected to pipe 113 downstream of valve 137. Across pipe 126 is connected a valve 127. Valve 127 is conveniently and preferably similar to valve 112 and also to valve 118 in both its structure and operation. When the cooled water which is flowing in pipe 126 passes through valve 127 and mixes with heated water flowing in pipe 124, the temperature is reduced (relative to the water temperature of the water from heater 119) in the resulting water stream entering pipe 113.

The amount of this temperature reduction is dependent upon the rate at which the cooled water that has a predetermined temperature and is present in pipe 126 is admixed with the water from the heater 119 flowing in the pipe 124. This mixing rate, in turn, is determined by the valve 127. By adjusting this mixing rate, therefore, the temperature of the water in pipe 113 is regulated. Thus, after the water in pipe 113 has passed through valve 112 and has mixed with the water in pipe 107', a desired feed water temperature in the output pipe 107' downstream from valve 112 is achieved.

For maximum heating or cooling, the water in pipe 124 or pipe 126, respectively, is used. To permit the water in pipe 124 to flow unimpeded and undiluted through valve 112 and into pipe 127, valve 112 is opened to its maximum extent and valves 137 and 127 are each closed. To permit the water in pipe 126 to flow unimpeded and undiluted through valve 112 and into pipe 127, valve 112 is opened to its maximum extent and valves 138 and 137 are each closed. Hence, within predetermined limits, the feed water in pipe 107', which is being charged to the array 103', can have a preselected or desired temperature as needed for humidity control purposes in accord with this invention.

For operational and control purposes, the system 175 shown in FIG. 5 is provided with air humidity state sensors, each of which produce an electrical output signal that is representative of the sensed variable.

Also for operational and control purposes, the system 175 of FIG. 5 is further provided with various system sensors, each of which produce representative electrical output signals. For example, temperature of the water in pipe 113 is monitored by a downstream temperature sensor 134, the water temperature in pipe 107' can be monitored by a temperature sensor 136, and the water in pipe 107' upstream from the valve 137 can be monitored by a temperature sensor 146.

Each of the sensors and regulatable components is connected to a microprocessor unit for control purposes.

Embodiment (f)

Figure 7:
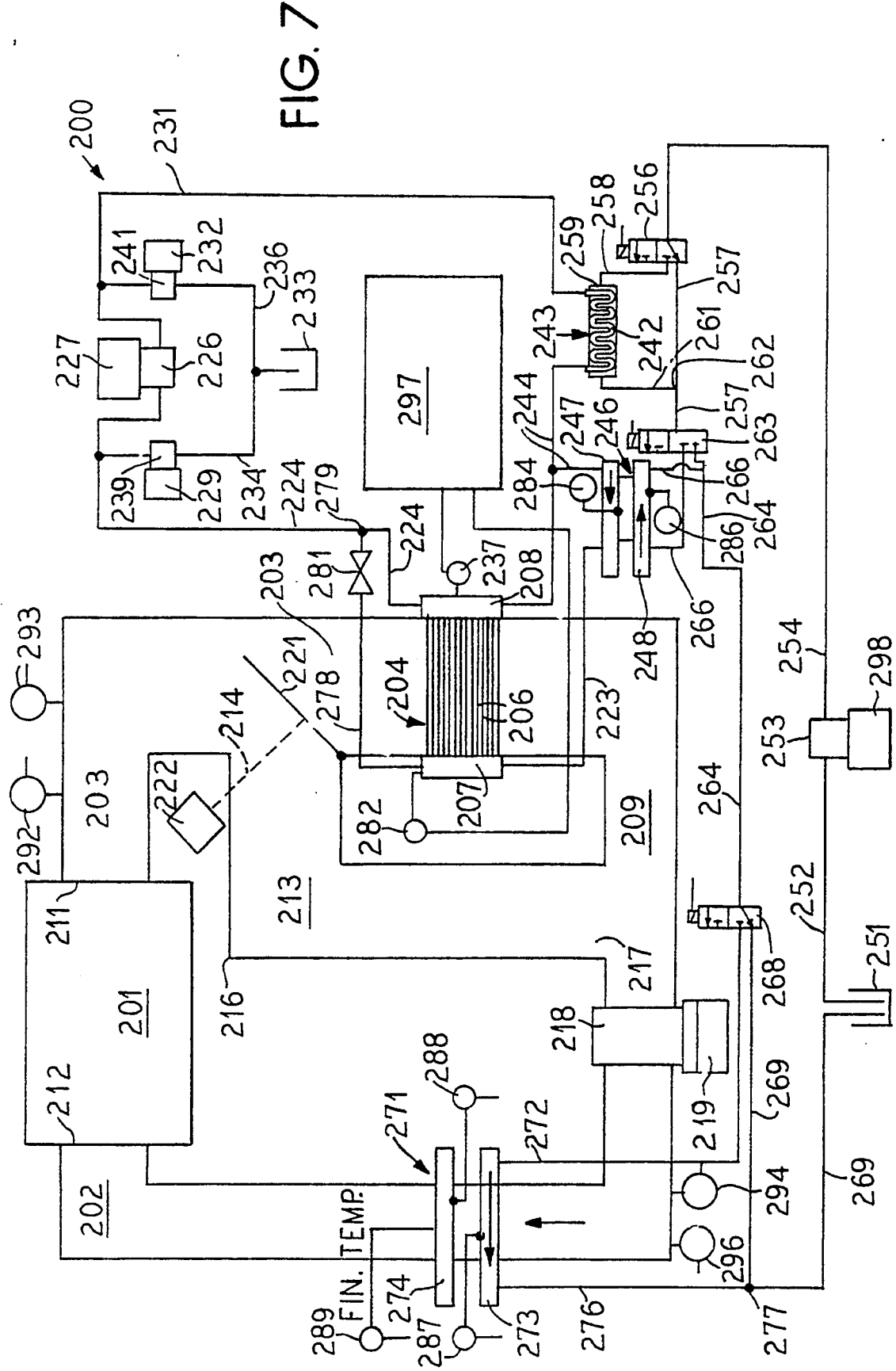
FIG. 7 is a diagrammatic perspective view of another embodiment of a gas humidity regulating system of this invention which also regulates the gas temperature.

Referring to FIG. 7, there is seen schematically an apparatus comprising a more complex (relative to the system 100 of FIG. 4) air humidity regulating system 200 of this invention which also regulates air temperature. System 200 is adapted for use in an environment for a plant habitat where an effective relative humidity control range of about 40% to about 80% is desirable having an accuracy of about ±10% or less from the relative humidity set point.

The humidity regulating system 200 with such a control capacity preferably also has the ability to function in microgravity (as on a space shuttle or space platform), reduced gravity (as on a lunar base or the like), or on Earth. Also, such a system 200 preferably has the additional ability to reclaim moisture (for example, during a dehumidification cycle) of a quality suitable for plant habitat recycling or for addition to potable water supplies, which is important in space-based applications where fresh water is limited or unavailable. The humidity and temperature regulating system 200 achieves these desires and preferences.

The present system embodiment 200 has the capacity to remove from its air loop about 1.5 pounds of water per 24 hour day or to add about 1.5 pounds of water per 24 hour day from the air loop. The system 200 has a thermal capacity of about 100 watts for its water loop.

In addition, the present system 200 is provided with (i.e., is integrated with) a capacity to control concurrently the temperature of the air being humidified by this system. Thus, the system 200 is rated with a capacity to control habitat air temperature in the range of about 15° C. to about 30° C. within about ±1.5° C. of the air temperature set point. The system has a thermal capacity of about 100 watts for the air loop.

The system 200 can handle a total habitat air volume (i.e., in the air reservoir or plant culture chamber) of about 2 cubic feet under a pressure approximating atmospheric (i.e., 14.7 pounds per square inch). From this habitat volume, air is circulated through the systems ducts (as hereinbelow described) at a rate that is in the range of about 15 to about 25 cubic feet per minute (cfm). Air passes over the tube array 204 at a velocity of about 16.4 ft/sec (5 m/s).

In the system 200 shown in FIG. 7, a plant culture chamber 201 is provided which is equipped with an air circulation pathway that includes input and output air circulation ducts 202 and 203, respectively. Duct 203 has interconnected thereto at a location downstream from chamber 201, a porous interface structure which is here illustrated by manifolded porous tube array 204 (generally now preferred). The structure of a array 204 can be as described with reference to Embodiment (h) and FIGS. 13-15 below (although other array structures which are taught herein can also be used). Array 204 has a plurality of porous tubes 206. The tubes 206 are in spaced, adjacent, parallel relationship to one another and are disposed transversely across duct 203. The sets of respective common opposite ends of the tubes 206 are each interconnected to a respective one of an input manifold 207 and an output manifold 208. These manifolds 207 and 208 are preferably located in abutting relationship on respective opposed outside surfaces of duct 203.

The tubes 206 in the array 204 are preferably comprised of stainless steel tubing whose characteristics are 0 cm $H_2O$ droplet point pressure and 115 cm $H_2O$ bubble point pressure. The array 204 preferably incorporates a total linear footage of such tubing 206 that is in the range of about 8.75 to about 10.5 feet (about 2.6 meters to about 3.2 meters) between the opposed manifolds 207 and 208.

To achieve the desired humidity and temperature control, the total internal volume of the tube array 204 is in the range of about 1.29 to about 1.55 cubic inches ($in^3$). The temperature of the water flowing through the tubes is controlled to be in the range of about 37° to about 113° F. (about 4° to about 45° C.), and the water in array 204 is controlled at a gauge pressure that is in the range of about −0.3 to about −0.8 psi, (about 20 to about 55 cm $H_2O$) and has an associated flow rate that is in the range of about 15 to about 17 gallons per hour gallons per hour (gph).

The respective outer (in relation to chamber 201) end portions of ducts 202 and 203 are interconnected together by a connecting duct 209, thereby completing an air circulation pathway out from, and back to, the chamber 201 via an exit port 211 and an entrance port 212. A bypass duct 213 having an elbow 216 therein is connected at one end thereof to duct 203, thereby to define an entering port 214. At the end opposite to entering port 214, the duct 213 is connected to duct 209 to define an exit port 217.

The entering port 214 is located upstream from the array 204 in duct 203. Across the duct 209 downstream from the exit port 217, a circulating air fan 218 is provided which is driven by an associated electric motor 219. A diverting valve plate 221 is provided which pivots along an edge of the entering port 214. The valve plate 221 is sized so that, depending upon its spatial position, it is adapted either to completely close off the entering port 214 or to completely close off the duct 203 upstream from the array 204. The valve plate 221 is mechanically linked (linkage not detailed) to a reversible drive motor 222 that is remotely controllable. At settings of the valve plate 221 intermediate between the respective indicated closed positions relative to duct 213 and to duct 203, partial air flow through each of the ducts 203 and 213 results. The relative air flow in each duct is dependent upon the position of the valve plate 221, as those skilled in the art will appreciate.

Thus, an air circulation pathway is provided through which air is circulated by a fan 218 from the chamber 201 through the ducts 203 and/or 213, 209 and 202 and back to the chamber 201.

A water circulation pathway or loop for circulating water through the array 204 during humidification or dehumidification is provided as follows. Water, which is charged into the input manifold 207 of the array 204 through the input pipe 223, passes through the tubes 206 and exits through the output manifold 208. From the manifold 208, the water enters the output pipe 224 and flows to a pump 226 which is preferably of the positive displacement type. Pump 226 is driven by a motor 227. Motor 227 is remotely controllable and is operatable at various speeds (rpm) so that a variable flow rate of water can be pumped by the pump 226.

In pipe 224 upstream from, but adjacent to, pump 226 is a T-connection to a first solenoid-actuated pump 239. Downstream in the discharge pipe 231 from the pump 226, but adjacent to, the pump 226 is a T-connection to a second solenoid-actuated pump 241. The pipes 234 and 236, respectively, from each of the pumps 239 and 241, is connected to a sealed, expandable water reservoir 233 wherein chamber volume is thus variable.

Water circulating in pipe 231 is delivered to the input end of the tube 242 of a heat exchanger 243 of a tube-in-shell type. From the output end of the tube 242, the water is delivered through a pipe 244 to side 247 of a water-to-water thermoelectric heat pump 246. From the opposite end of side 247 of the heat pump 246, the water is charged into pipe 223 which connects with manifold 207, thus completing the water circulation pathway or loop.

To provide the capacity for cooling, the system 200 as shown in FIG. 7 is provided with a chilled water source that is represented by, and is part of, the sealed reservoir 251. For example, the reservoir 251 can be associated with facilities provided on a space station (not shown).

The chilled water from the reservoir 251 is circulated at a nominal flow rate of about 15 to about 17 gallons per hour (gph) and the chilled water is regulated by means (not shown) in the reservoir 251 to a temperature of about 46° F. (about 8° C.) along a flow pathway or loop. Thus, from the reservoir 251, the chilled water is drawn through a connecting pipe 252 by pump 253. The cooled water from pump 253 is output into a pipe 254 and conveyed to a conventional 3-way/2-position, solenoid-actuated valve 256. The pump 253 is driven by an electric motor 298. In one position of the valve 256, the chilled water in pipe 254 is conveyed through valve 256 and passes into pipe 257. In this position, the chilled water is bypassed around the heat exchanger 243, and no appreciable cooling takes place in the heat exchanger 243 as water from pipe 231 circulates through the tube 242 and out through pipe 244.

In the second position of the valve 256, the chilled water in pipe 254 is conveyed through the valve 256 and passes through the lead-in pipe 258 into the shell side 259 of the heat exchanger 243. After passing through the shell side 259, which is in heat-exchange relationship with the tube 242, the chilled water exits through the pass-out pipe 261. The opposite end of the pass-out pipe 261 is connected by a T-connector 262 to pipe 257. In this second position, the water flowing in the tube 242 is cooled.

Pipe 257 is connected to another 3-way/2-position, solenoid-actuated valve 263. In one position of the valve 263, the chilled water in pipe 257 passes through the valve 263 and enters one end of pipe 264. In this position, the chilled water is bypassed around the water-to-water thermoelectric heat pump 246. Thus, no appreciable cooling is available to the heat pump for controlling the temperature of the water flowing from pipe 244 and passing first through the side 247 of heat pump 246 and then passing into pipe 223.

In the second position of the valve 263, the chilled water in pipe 257 passes through the valve 263 and enters one end of the lead-in pipe 266 which connects with the side 248 of the heat pump 246. After circulating through the heat pump 246, the resulting chilled water exits through pass-out pipe 266 which connects with pipe 264. In this second position, cooling is available to the heat pump 246 for controlling the temperature of the water flowing from pipe 244 through the side 247 of the heat pump 246 and passing into pipe 223.

Pipe 264 terminally connects at its opposite end with another 3-way/2-position, solenoid-actuated valve 268. In one position of the valve 268, the chilled water in pipe 264 passes through the valve 268 and enters one end of return pipe 269. In this position, the chilled water is bypassed around an air-to-water thermoelectric heat pump 271 that is situated across the duct 202 between the fan 218 and an entrance port 212, and that is in heat-exchange relationship with the air flowing through duct 202. (An arrow shows the air flow direction in duct 202.) Thus, no appreciable cooling is available to the heat pump 271 for controlling the temperature of the air circulating in the duct 202.

In the second position of valve 268, the chilled water in pipe 264 passes through the valve 268 and enters one end of the lead-in pipe 272, which connects at its opposite end with one side 273 of the heat pump 271. After thus circulating through the heat pump 271, the chilled water exits from the side 273 of the heat pump 271 at the opposite end of side 273 into the pass-out pipe 276, which terminally connects with the return pipe 269 through a T-connector 277. The pass-out pipe 269 connects with the sealed reservoir 251, thereby completing the cooled water flow pathway or loop. In this second position, cooling is available to the heat pump 271 for controlling the temperature of the air circulating in the duct 202.

As those skilled in the art appreciate, the thermoelectric heat pumps 246 and 271 are conventional and commercially available devices. A present preference is to employ as such a device an embodiment which is available from Merlow Industries, Inc. of Dallas, Tex. Such a device is typically comprised of thermoelectric couples of p and n-type semiconductor material that are connected electrically in series and thermally in parallel and that are sandwiched between a pair of ceramic plates. The operate by regulation of the direction and amount of input current in combination with an associated feedback loop and temperatures controller. Heat absorption (cooling) is proportional to the current and also the number of thermoelectric couples. Heat that is dissipated at the hot side of such a device is removed by circulating chilled water, as described above.

Those skilled in the art will appreciate that the system 200 of FIG. 7 can utilize various alternative arrangements and components if desired or available.

Embodiment (g)

Figure 8:
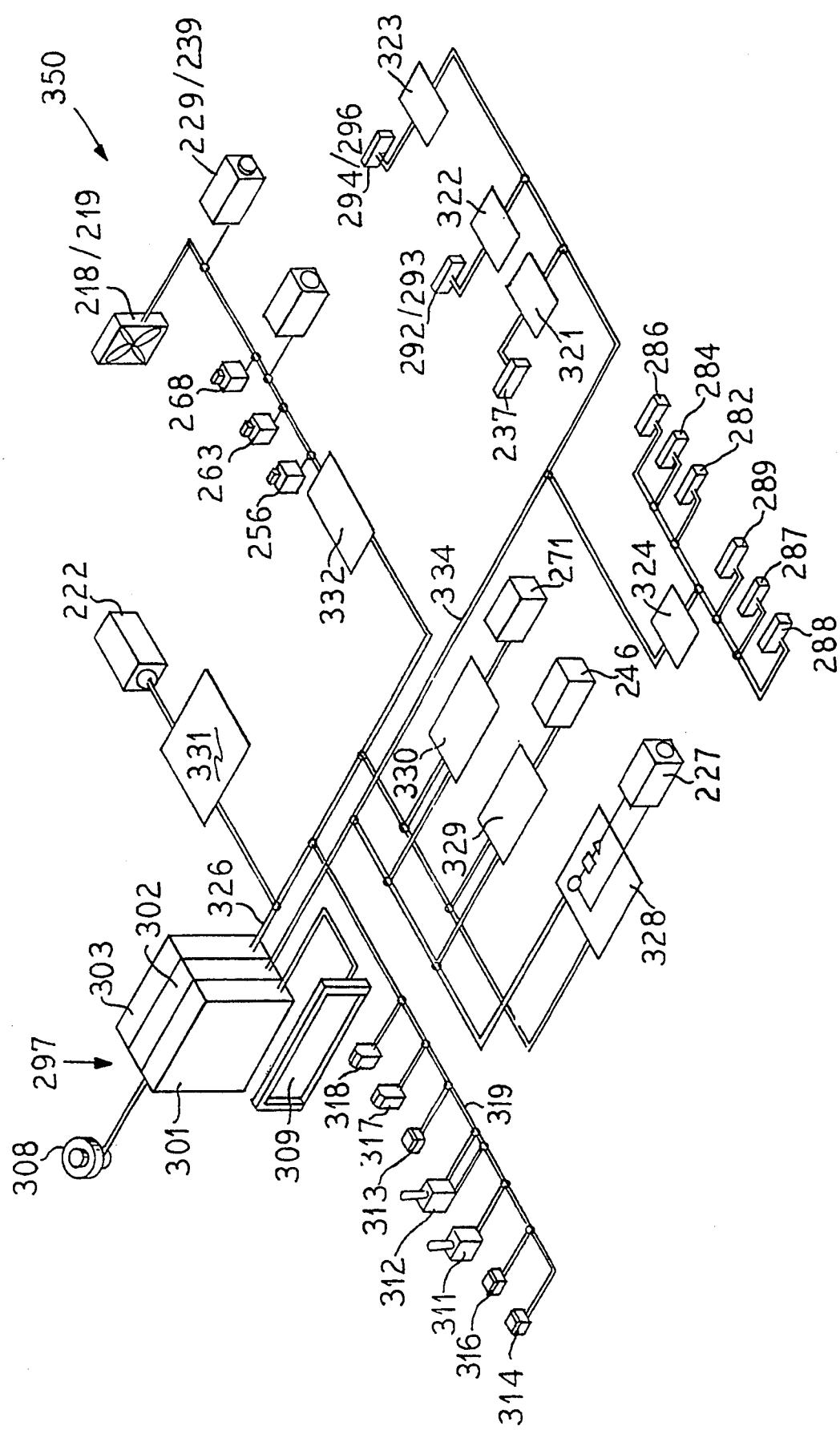
FIG. 8 is a block diagrammatic view of the control subsystem employed in the humidity and temperature regulating system of FIG. 7.
Figure 12:
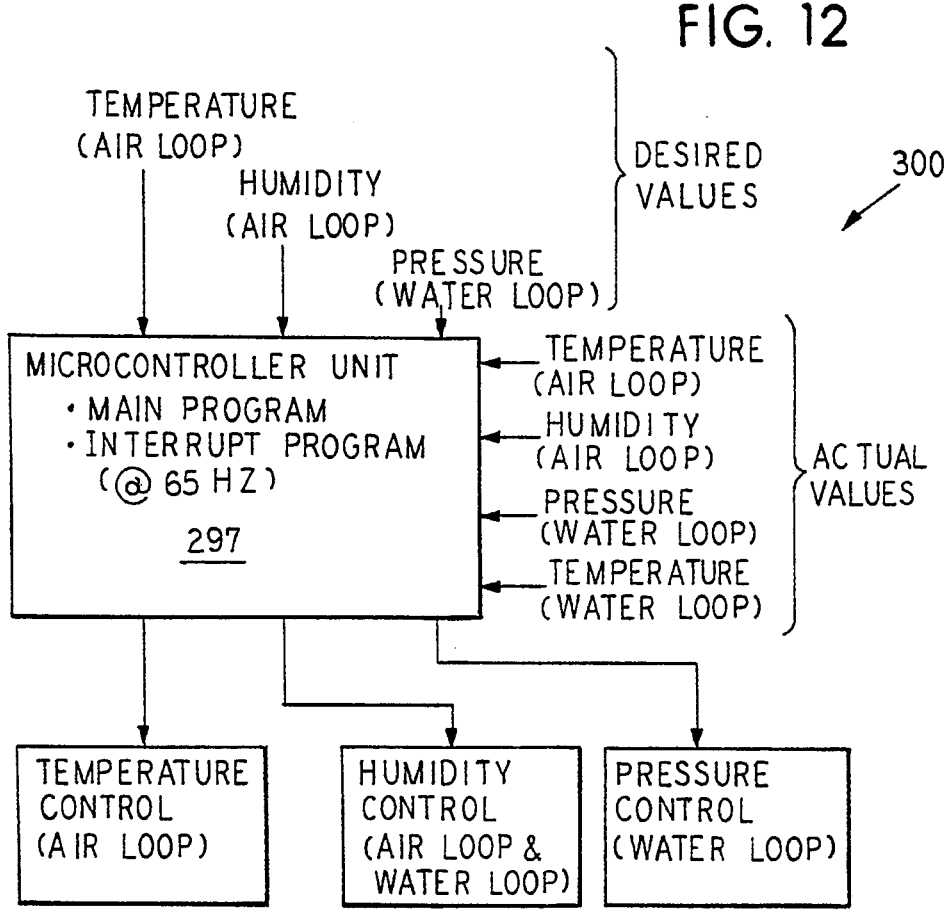
FIG. 12 is a diagrammatic view of the control subsystem employed in the humidity regulating system of FIG. 7.

An embodiment 300 of a control subsystem that is suitable for functional association with system 200 (see Embodiment (f) above) is shown in combination with system 200 in FIG. 7 and also separately in FIGS. 8 and 12.

When the water pressure in the array 204, as sensed by a pressure sensor 237 (preferably a transducer), is greater than the desired water pressure, the solenoid 229 of pump 239 is actuated. The pump 239 then pumps water from pipe 224 into pipe 234 for conveyance into the reservoir 233. Pump 239 is repeatedly thus actuated until the pressure in the array 204 attains the desired value at which value the solenoid 229 of pump 239 is deactuated.

Correspondingly, when the pressure in the array 204, as sensed by pressure sensor 237, is less than the desired water pressure, the solenoid 232 of pump 241 is actuated. The pump 241 then pumps the water from the reservoir 233 through pipe 236 for addition to pipe 231. Pump 241 is repeatedly thus actuated until the pressure in the array attains the desired value at which value the solenoid 232 of pump 241 is deactuated.

When the water pressure in the array 204 is about equal to the desired water pressure, then neither pump 239 nor pump 241 is operative.

One method to charge water into the water loop is to bypass the array 204 so that little or no water circulates through the porous tubes 206. A bypass pipe 278 is connected from the input manifold 207 to the output pipe 224. Pipe 278 is connected to pipe 224 by a T-connector 279. Pipe 278 is fitted with a valve 281 which is normally in a closed position. Pipe 278 offers far less resistance to water flow therethrough than does the water flow through the array 204. Because of this difference in the flow resistance, water flow through the array 204 is effectively bypassed when valve 281 is opened.

For purposes of automatic control of the system 200 shown in FIG. 7, various condition sensors are provided, each of which converts a sensed variable into an electric signal output that is representative of the sensed variable. Thus, in addition to the pressure sensor 237 (above described), the array 204 is provided with a temperature sensor 282 that is associated with the manifold 207.

The side 247 of the water-to-water thermoelectric heat pump 246 is provided with a temperature sensor 284, and the side 248 of the heat pump 246 is provided with a temperature sensor 286. The side 273 of the air-to-water thermoelectric heat pump 271 is provided with a temperature sensor 287, and the side 274 of the heat pump 271 is provided with a temperature sensor 288. In addition, the outer surface of side 274 of the heat pump 271 (over which flowing air passes) is provided with a temperature sensor 289.

The system operating variables affecting the water circulating through the array 204 are (a) the temperature of the circulating water which is controlled through the valves 256 and 263 and the water-to-water thermoelectric heat pump 246, (b) the pressure of the circulating water which is controlled by the solenoid pumps 239 and 241, and (c) the circulating water flow rate which is controlled through the pump 226.

The system operating variables for the air circulating through the chamber 201 are (a) the temperature of the circulating air which is controlled through the array 204, the air-to-water thermoelectric heat pump 271, and the setting of the valve plate 221 (which is controlled by the motor 222), and (b) the humidity level of the circulating air which is controlled by the array 204 and the setting of the valve plate 221.

To provide a command function for controlling these operating variables, the flowing air temperature and humidity are determined by the temperature sensor 292 and humidity sensor 293 in the duct 203 adjacent to the exit port 211, and by the temperature sensor 294 and the humidity sensor 296 in the duct 209 downstream from the fan 218. The sensors 292 and 293, and the sensors 294 and 296, respectively, can each be combined into a single humidity/temperature sensor (preferred) that produces two output signals.

The outputs from each of the temperature/humidity sensors 292/293 and 294/296 are fed to a microcontroller 297 (see also FIG. 8; connecting wires not detailed). The microcontroller 297 carries out its functions using a control software program. By controlling the system operating variables that are sensed by the sensors 282, 237, 284, 286, 287, 288, 289, 292, 293, 294 and 296, and that are fed to the microcontroller 297, the temperature and the relative humidity of air circulating in the air loop are each controlled. After the input information signals are processed by the microcontroller 297, command output signals from the microcontroller 297 regulate the operation of the valves 256, 263, 268 and 221, the pumps 226, 239 and 241, and the thermoelectric heat pumps 246 and 271. Thus, the temperature and also the relative humidity of gas (air) in chamber 201 are controlled at independently (within operating limits) selected respective set point values.

The control subsystem 300 employed in system 200 is further illustrated by the layout diagram shown in FIG. 12. Actual values for the temperature and humidity of the air loop and the temperature and humidity of the water loop are sensed and fed to the microcontroller 297. In effect, those values are compared by the microcontroller 297 to desired values for the temperature and humidity in the air loop and to programmed (set) values for the temperature and humidity in the air loop and to programmed values for the pressure and temperature in the water loop. The microcontroller 297 then outputs control signals which operate a unit for separately controlling air loop temperature and humidity, and water loop pressure.

The temperature control unit is comprised of controllable components in or associated with the air loop; the humidity control unit is comprised of controllable components in or associated with each of the air loop and the water loop; and the pressure control unit is comprised of controllable components in or associated with the water loop. The air loop humidity is regulated by a combination of the air loop flow control (with a bypass duct 213), and a stepped, loop water temperature control (with valves 263 and 256, the heat exchanger 243, and the thermoelectric heat pump 246).

Other alternative control subsystems could also be employed, if desired. For example, instead of using heat pumps as in the system 200 to regulate the temperature of the air loop, the energy gained in the loop water could be used either alone or in combination with the heat pumps. Also, instead of using the foregoing combination of the air loop flow control and stepped loop water temperature control to regulate air loop humidity, other control arrangements and other combinations of regulatable components could be used. Thus, the loop water temperature could be controlled either solely or in combination with an air-to-water heat pump, a water-to-water heat pump or the operating speed of pump 226 (and its motor 227). Instead of using solenoid pumps to control the water pressure in array 204, this pressure could be controlled by solenoid valves, gravity, speed of pump 226, a sealed bellows reservoir which is bellows-extensible and contractible, or the like.

With regard to the water pressure control in the tube array, each of the two solenoid pumps 239 and 241 delivers a specific amount of water per stroke (present preference is about 0.1 ml/stroke). Since water is substantially incompressible, it changes significantly in pressure with volume change. The system compliance due to the porous tube itself, however, insures that the pressure spikes are not significant. Thus, small amounts of water are input into, or removed from, the water loop, the amount being dependent upon the pressure change desired. If solenoid valves were used in place of the solenoid pumps 229 and 231, one valve is placed under negative pressure while the other valve is placed under positive pressure. Thus, water is let in or pushed out by opening the respective valve. However, solenoid pumps do not require that the water in pipes 234 and 236 be near the pressures existing at the inlet and outlets of the circulation pump 226.

In a sealed bellows system, a bellows reservoir can be connected at one end thereof to the water line by a T-connector. A force is applied to the other, or free end, of the bellows reservoir by a constant opening force, a linear step motor actuator, a constant force spring, or the like. The result is that the water pressure is variable according to the applied force on the bellows.

In a water loop that uses a circulation pump located on the outlet of the tube array, water pressure in the tube array can be varied by adjusting of speed of the pump in conjunction with using a fixed pressure drop near the inlet to the tube array. A variation of this method is to hold the pump speed constant and vary the pressure drop with a proportional valve or the like.

In a gravity-controlled system, the height of an open reservoir relative to the porous tube array can be used to either create a negative water pressure (if the reservoir is below the tube array) or a positive water pressure (if above). A float on a tank water level is set and the float rises and falls so that water is either let in or out of the tank in response to dehumidification or humidification.

An overview of the control subsystem 300 that is incorporated into the system 200 is diagrammatically shown in FIG. 8. The microcontroller 297 incorporates a central processing device 301 that is functionally associated with both an analog interface device 302 and a digital interface device 303. The analog interface device 302 is itself integrated with an analog-to-digital converter. Also, the peripheral devices of microcontroller 297 conveniently include a computer reset button 308 or the like, and a liquid-crystal-display (LCD) panel 309, a cathode ray tube (CRT) or the like.

The microcontroller 297 is provided with a run and setup switch 311; an operation select switch 312; an option select switch 313; an option up switch 314; an option down switch 316; a light emitting diode (LED) 317 for error indication; and a LED 318 for run indication, all of which are connected to the digital interface device 303 through a bus 319.

Four conventional signal conditioning devices 321, 322, 323 and 324 are provided to condition the signals from various sensors and transfer the analog input information through a bus 334 to the analog interface device 302. Thus, sensed pressure from pressure sensor 237 is fed as an input signal to the signal conditioning device 321. The relative humidity as computed by the microcontroller 297 from the air loop temperature and humidity sensors 292 and 293 is fed as an input signal to signal conditioning device 322. The relative humidity as computed from the air loop temperature and humidity sensors 296 and 294 is fed as an input signal to signal conditioning device 323. The temperature sensed by each of the respective temperature sensors 286, 284, 282, 289, 287 and 286 is fed as an input signal to signal conditioning device 324.

After the input signals are processed in the central processing device 301, the control signals are output from the digital interface device (i.e. a parallel input-/output interface) 303 via the bus 326 to the five drive units 328, 329, 330, 331 and 332. Each drive unit uses the control signals for operating a specific one, or group, of electromagnetic devices. Thus, drive unit 328, in response to control signals, controls the operation of the solenoid valve 268 from one of its two positions to the other. This control subsystem 300 is used to regulate the humidity and the temperature of the air in the plant culture chamber 201.

With regard to valve 268, the program 350 term "enable" is used for the position of valve 268 where cooled water is circulated through the thermoelectric heat pump 271. The program 350 term "disable" is used for the position of valve 268 where no such circulation occurs and thermoelectric heat pump 271 is bypassed. Similar program terminology is also used for valves 263 and 256.

Similarly, the inputs from the temperature sensors 284, 286 and 282, and from humidity/temperature sensor 292/293, are used to control both the temperature of flowing water and the humidity of the air in the air loop. This control is achieved by regulating the motor 222 operation, by energizing the thermoelectric heater 246 and by the solenoid-actuated switching of each of valves 256 and 263.

Similarly, the inputs from the pressure sensor 237 are used to control the pressure of water in the water loop including array 204. This control is achieved by regulating the operations of solenoid pumps 232/241 and 229/239. The microcontroller 297 controls motor 227.

The microcontroller 297 is programmed to control both the loop water flow rate and the loop air flow rate by only turning on (or off) the motors 227 and 219 respectively. The microcontroller can also be programmed to use pump/motor 226/227 and fan/motor 218/219 to control temperature and humidity.

In a program for operating of the microcontroller 297, three control units (see FIG. 12) are preferably integrated and intermixed.

Figure 9A:
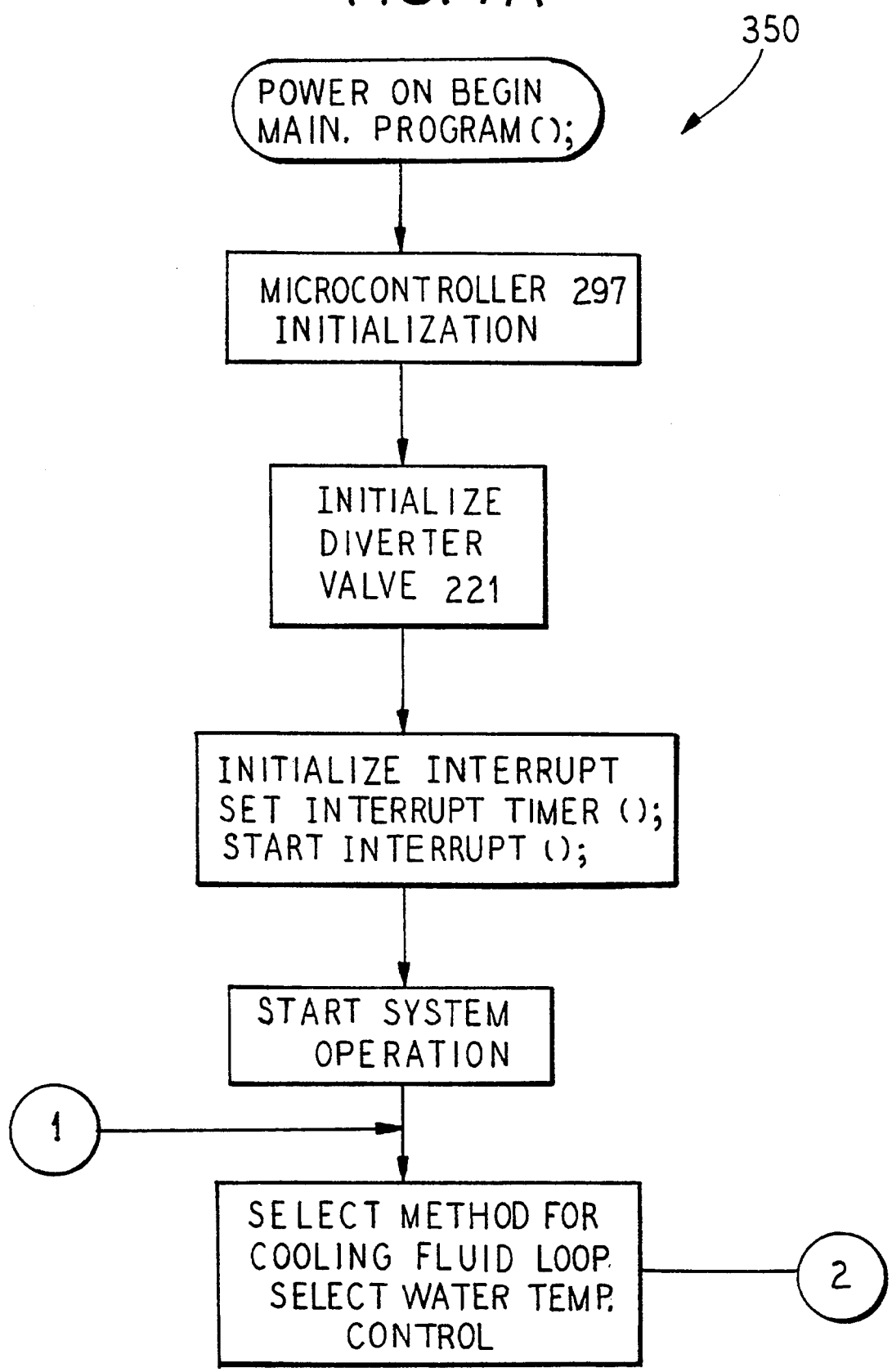
FIGS. 9A-9N comprise block diagrams of one embodiment of a computer program that is suitable for operating the control subsystem of FIG. 8.
Figure 9B:
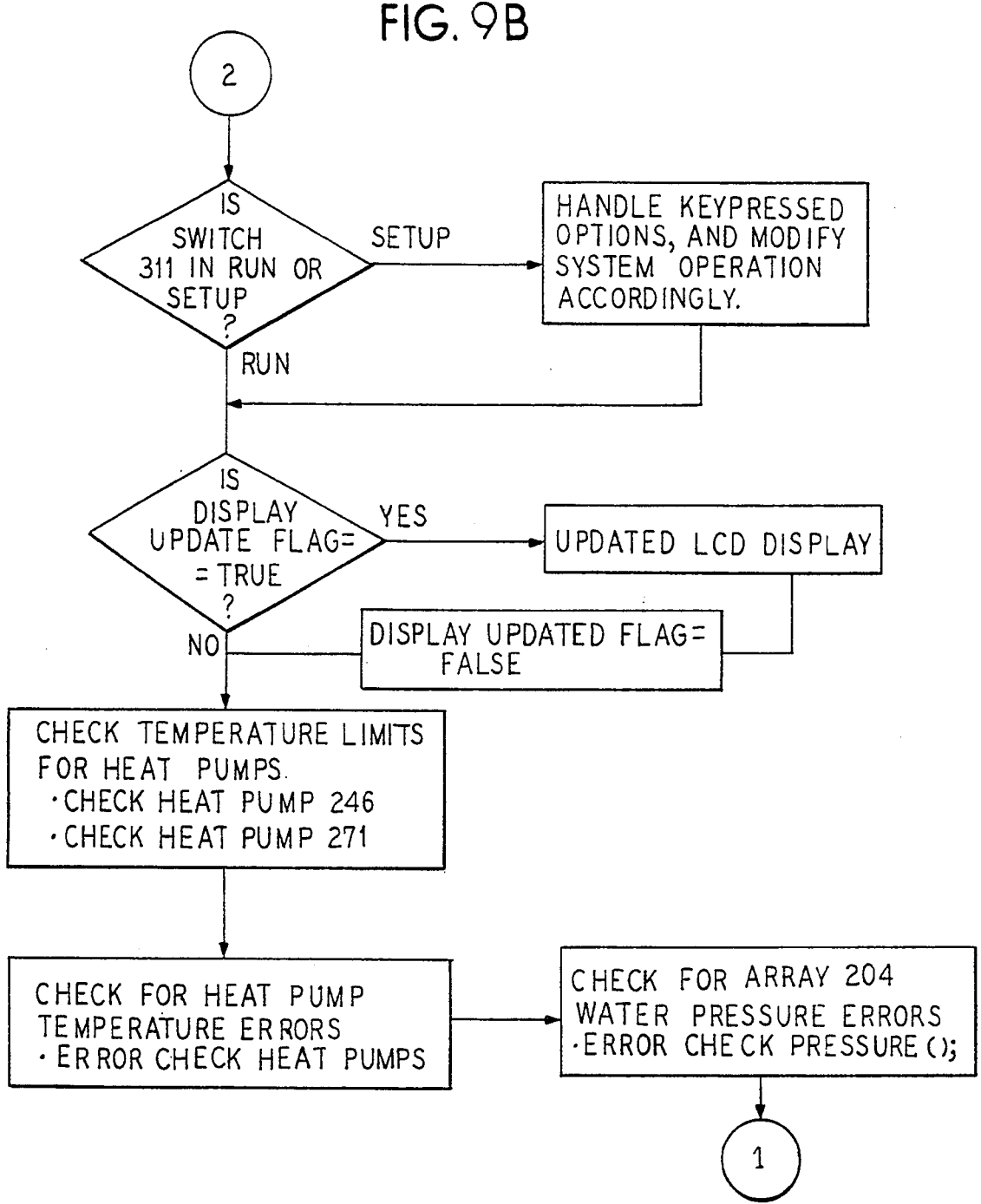
Figure 9C:
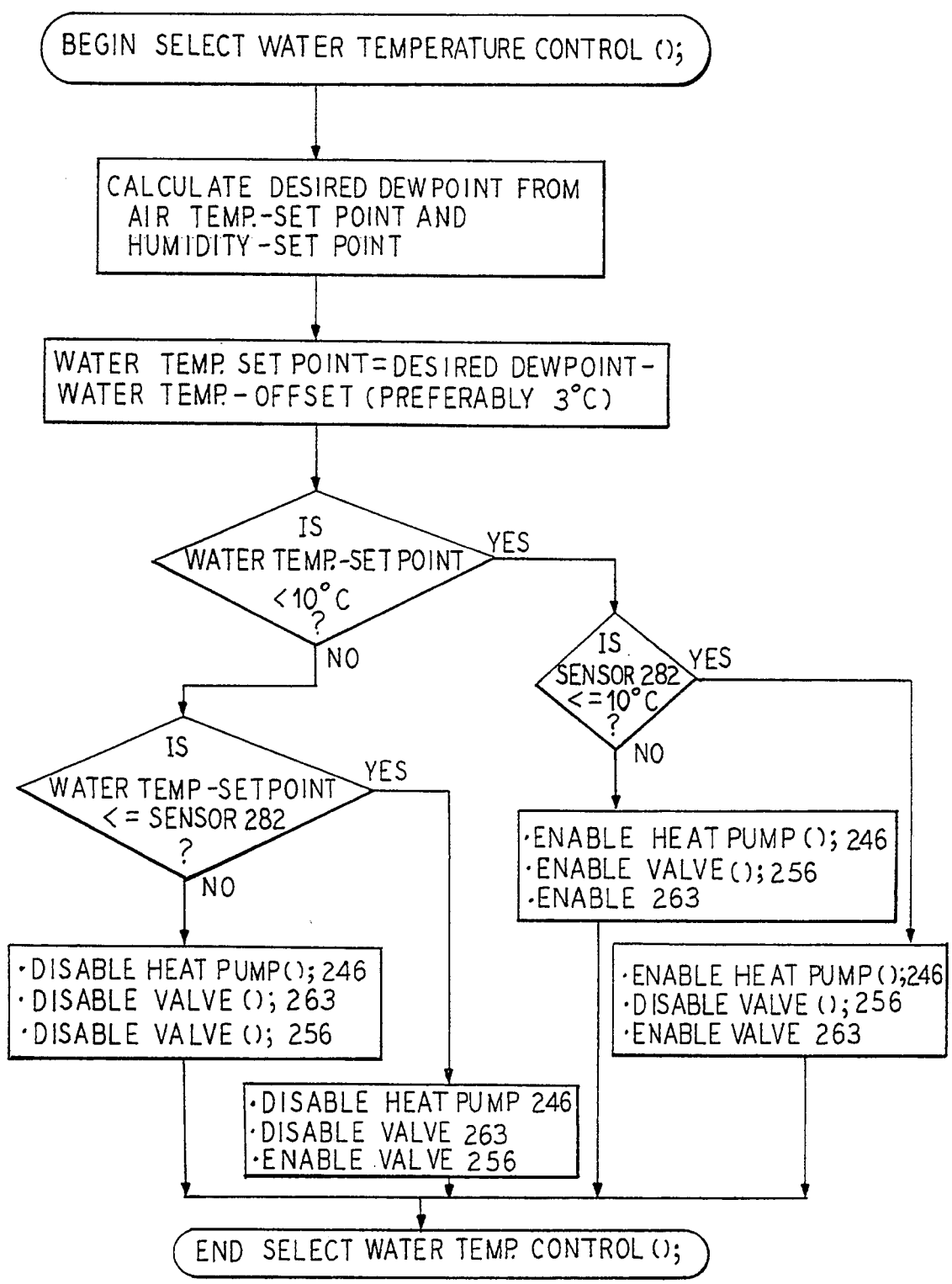

The program 350 and program step sequences shown in FIGS. 9A–9N are believed to be largely self-explanatory to those of ordinary skill in the art, so they will not be discussed or described in detail. The main program sequence shown in FIGS. 9A and 9N is performed during normal operation. After completing system initialization procedures, the main program loop is entered and system operation commences (see FIGS. 9A and 9B). Then, checks are made of the sensors and of the controllable components, inputs from the switches are read, and the LCD panel 309 is updated.

Figure 9D:
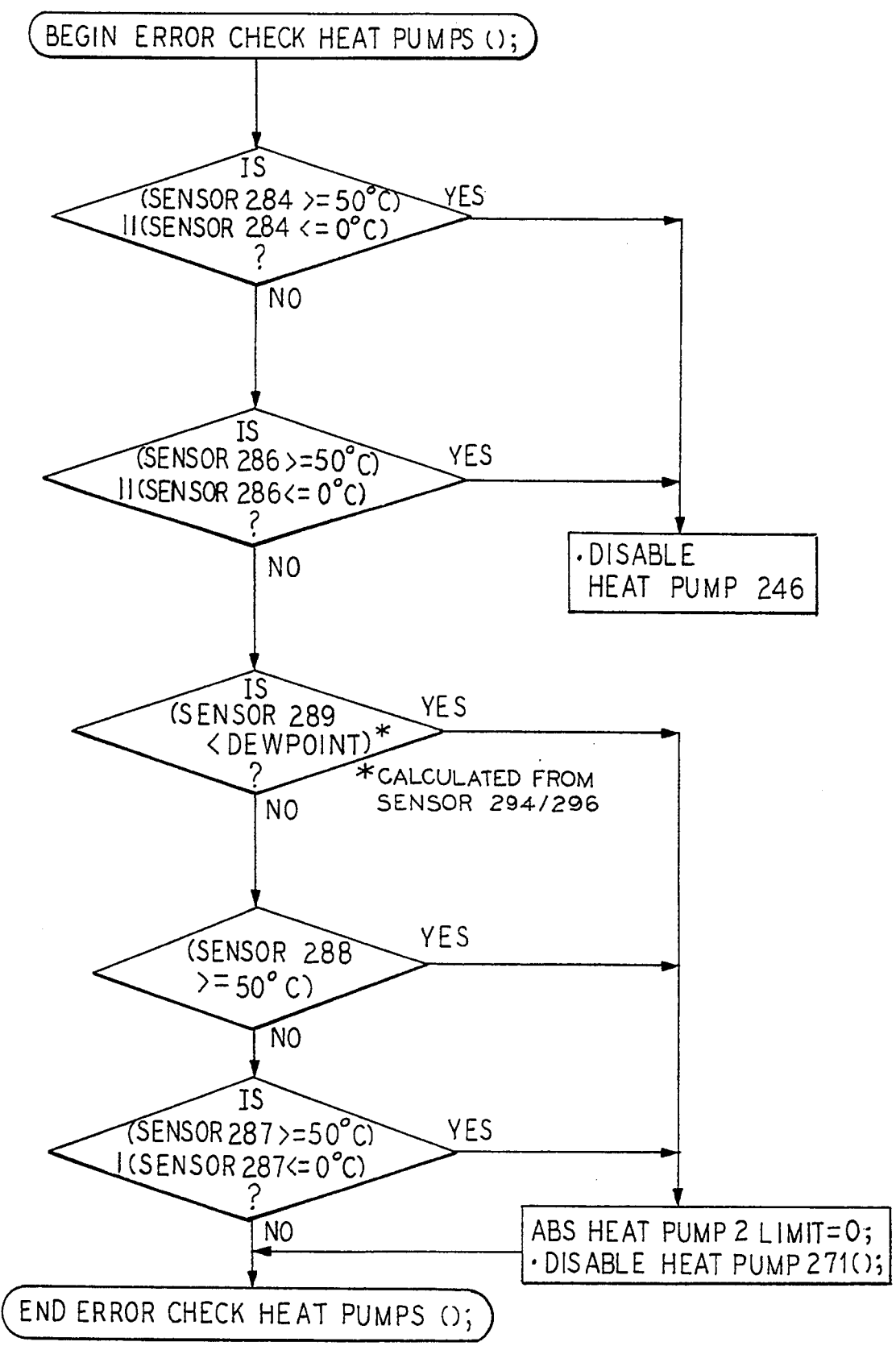
Figure 9E:
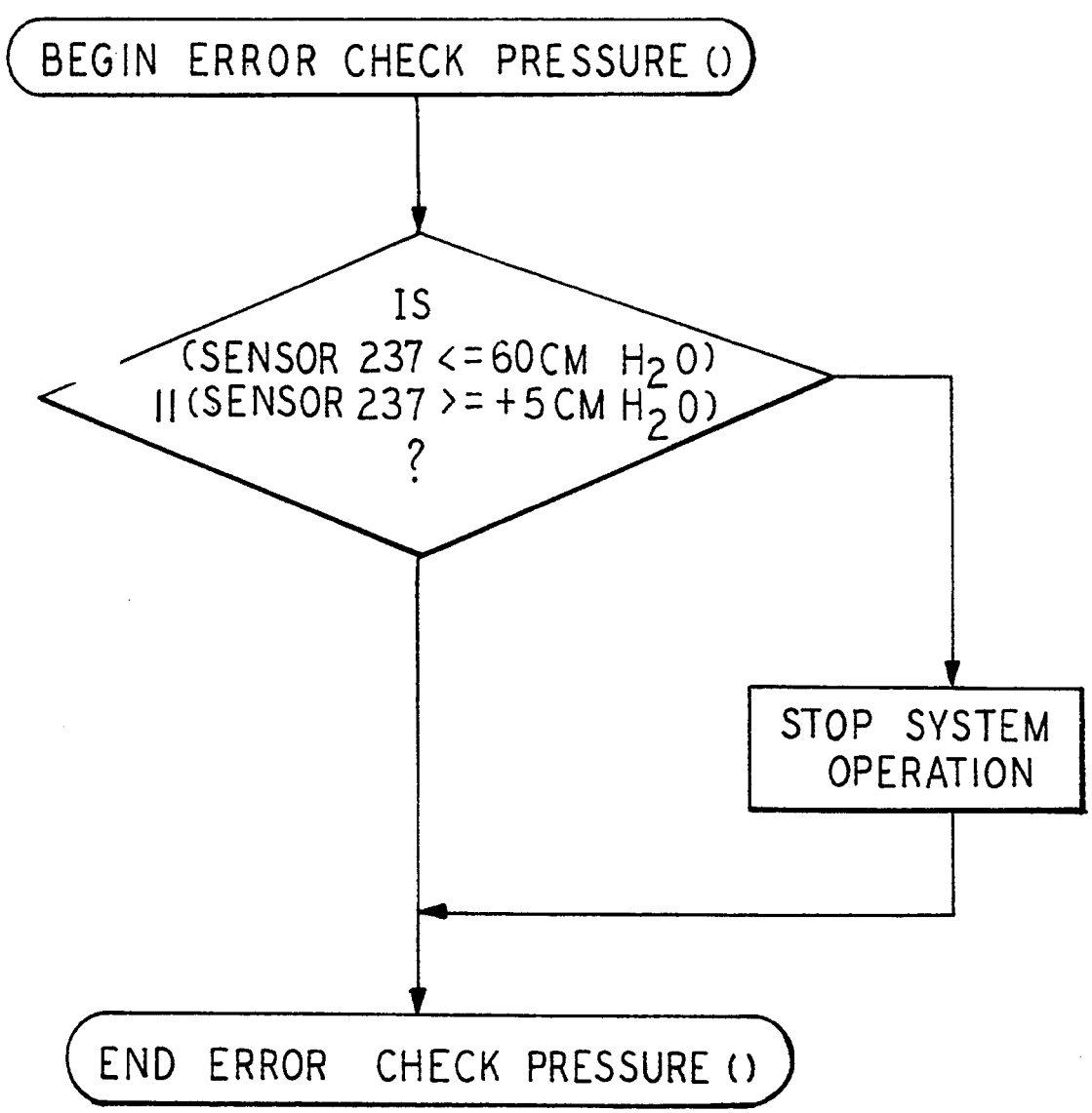

The temperature limits of the thermoelectric heat pumps 296 and 271 are error checked using the program procedure shown in FIG. 9D. The power limit for thermoelectric heat pump 296 is controlled by the program procedure shown in FIG. 9F, and the power limit for thermoelectric heat pump 271 is controlled by the program procedure shown in FIG. 9G. In the error check and also in the power limit control of heat pump 271, where the output of temperature sensor 289 is compared to the dew-point, the dewpoint is calculated using sensor 294/296 in order to prevent dew from forming on the outer surface of side 274 of heat pump 271.

The loop water temperature set point is determined by the microcontroller as being equal to the value of the desired (or set point) dew point temperature less 3° C. Various water temperature set points are achievable preferably by controlling the operation of heat exchanger 243 and thermoelectric heat pump 246.

In the program 350, four operational combinations are utilized (see FIG. 7C). Proceeding from warmest to coldest resulting loop water temperatures, these combinations are:

1. Electrically enable the thermoelectric pump 246; open valve 256 to shunt chilled water around heat exchanger 243; and close valve 263 to flow chilled water through thermoelectric heat pump 246.
2. Enable heat pump 246; enable valve 256; and enable valve 263.
3. Disable heat pump 246; disable valve 263; and disable valve 256.
4. Disable heat pump 246; disable valve 263; and enable valve 256.

The combinations identified as 1 and 2 (above) in the present subsystem 300 are chosen for use with a water temperature set point that is below about 10° C. The combinations identified as 3 and 4 (above) in the present system 300 are chosen for use with a water temperature set point that is above about 10° C. The question of which one of these operational combinations to employ at any given time is determined by microcontroller 297 from (a) the temperature being sensed by loop water temperature sensor 282 and (b) the set point humidity in the air loop ("desired dew point") using the "Select Water Temperature Control" program procedure shown in FIG. 9C.

Temperature sensor 290, for example, is used for monitoring only. Pump 221/222 has Hall effect sensors which are fed to the brushless control 328 which maintains the pump speed at a preset value. Motor pump 226/227 (for water loop flow rate control) is controlled by a preset pressure constant (1 l/min.). Thermoelectric pump 246, solenoid valve 256 and solenoid valve 263 are used to control the loop water temperature (see the select water temperature control program sequenced in FIG. 9C). Motor pump combination 226/227 is used to fine tune the humidity by diverting the airflow away from the porous tubes.

Figure 9H:
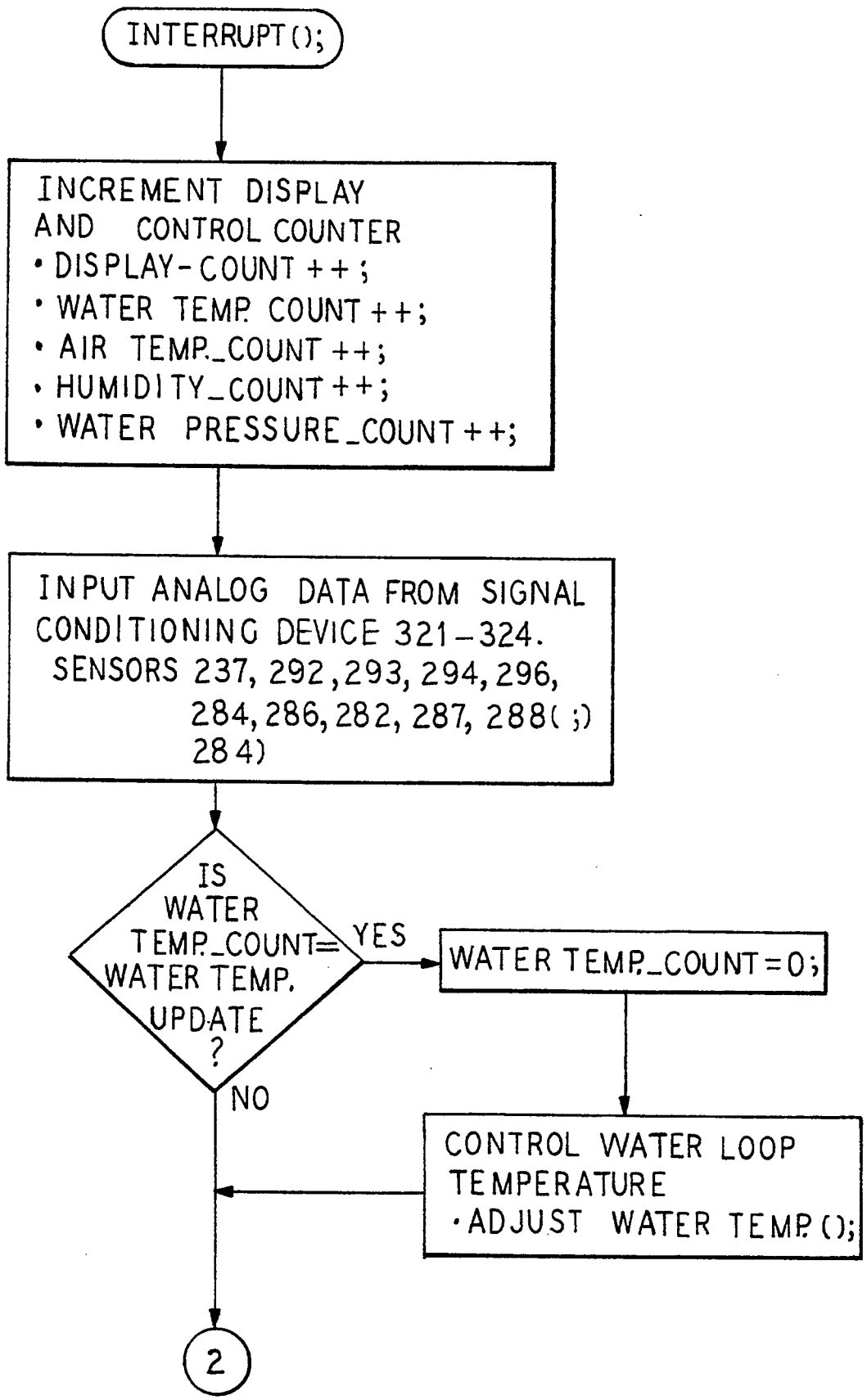
Figure 9I:
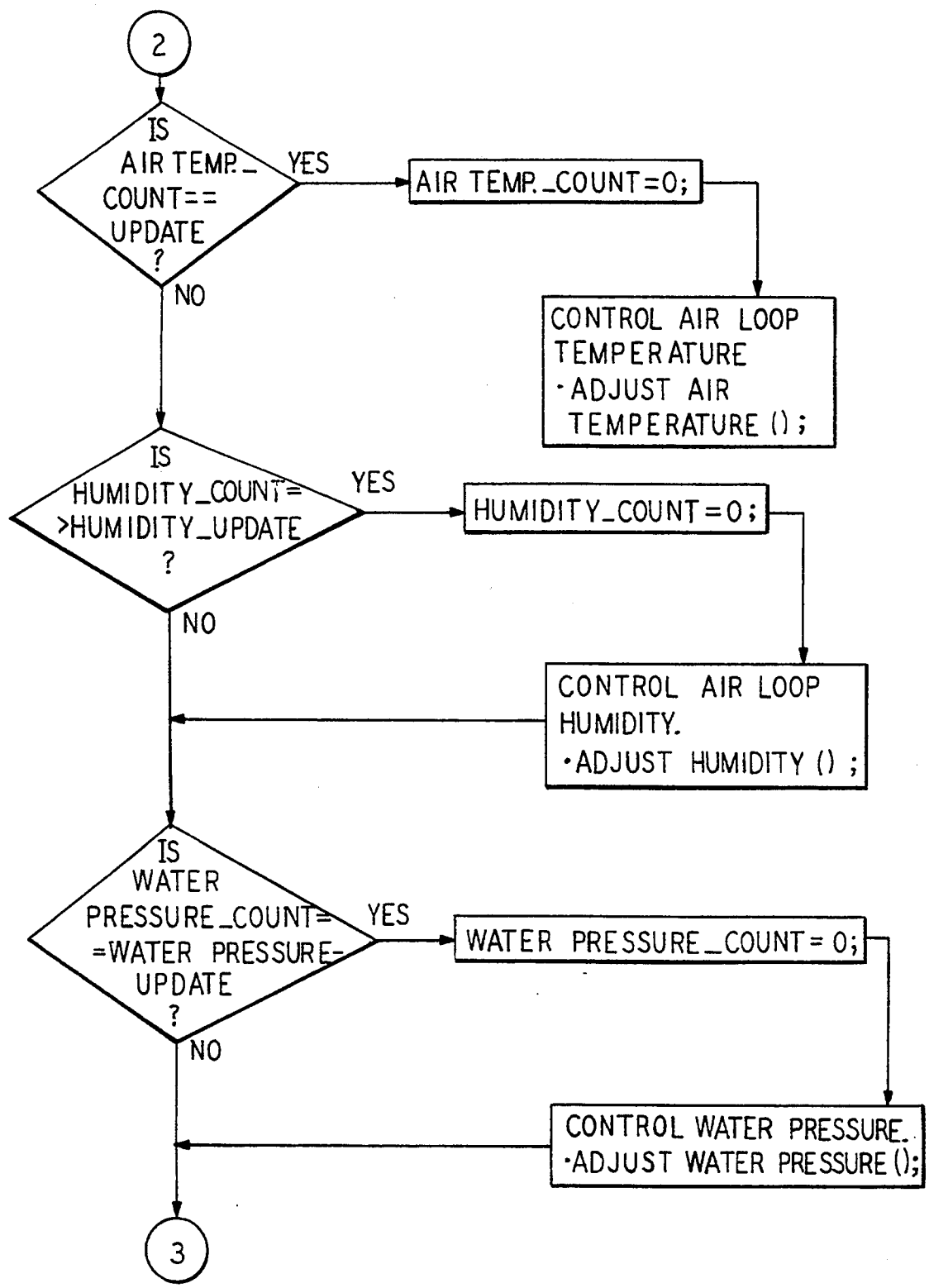
Figure 9J:
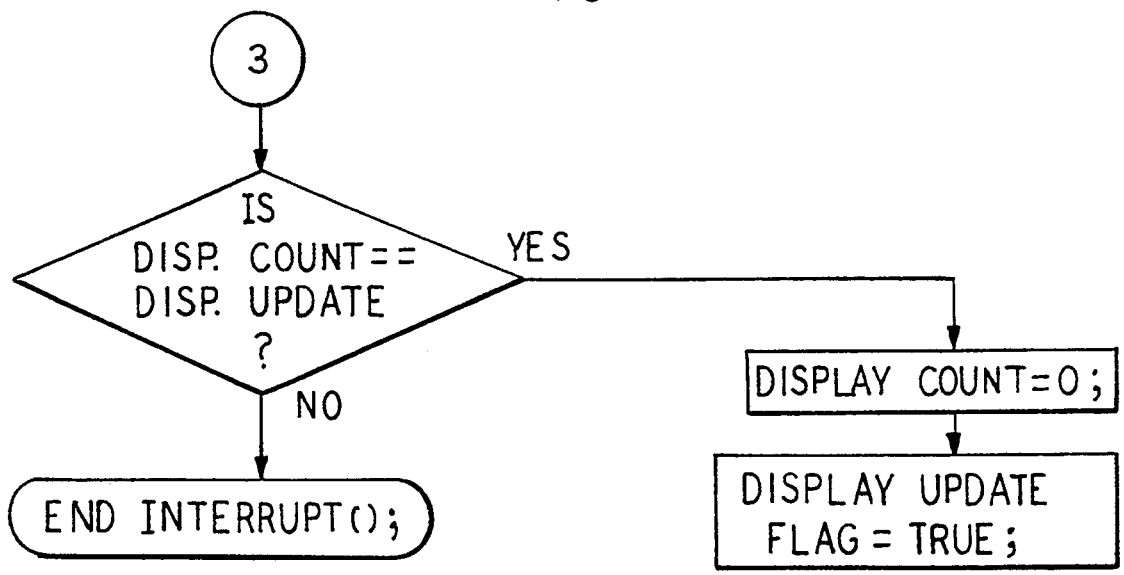

When the control processing device generates an interrupt signal (preferably 65 Hz), the program 350 executes the interrupt program shown in FIG. 9H. The interrupt program procedure begins with the incrementing of display and control counters. These counters are used to enable control and display program procedures as a multiple of the number of interrupt signals received. Thus, the sensor imputs to the signal 321–324 are received, the drive units 328–332 are adjusted conditioning devices.

The interrupt program procedure sections 341 and 342 are separately carried out for, respectively, the water loop temperature and the air loop temperature and adjustments, if needed, are made, including to the thermoelectric heat pump 246 and 276. Another set of program evaluation loops 343 and 344 are carried out for, respectively, the air loop humidity control and the water loop pressure and adjustments, if needed, are made.

Figure 9K:
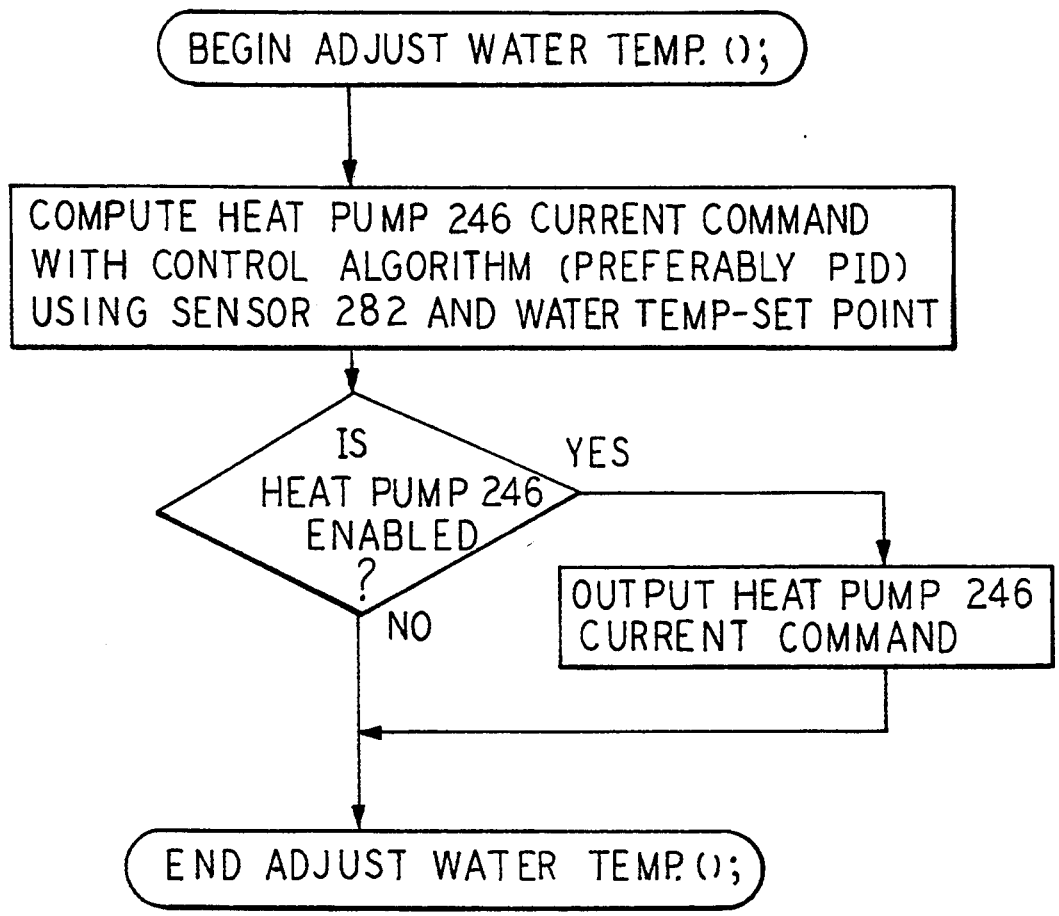

The water loop temperature is adjusted by the interrupt program procedure shown in the FIG. 9K. The water loop pressure is adjusted by the interrupt program procedure shown in FIG. 9L. The air loop temperature is adjusted by the interrupt program procedure shown in FIG. 9M. The air loop humidity is adjusted by the interrupt program procedure shown in FIG. 9N (where the actual dew-point is measured by humidity temperature sensor 292/293).

As in FIG. 6, the initials "PID" indicate a proportional integral derivative in FIG. 9.

During normal operation, the main program is executed. Thus, the normal or main loop program is entered and operation commences.

In place of the above-described control subsystem that is employed in system 200, other alternative control subsystems within the spirit and scope of the invention can be employed, if desired.

Embodiment (h)

Referring to FIGS. 13–15, one embodiment 365 of a porous interface structure of this invention is shown. This embodiment comprises a manifolded porous tube array wherein the porous tubes are preferably comprised of stainless steel. The porous tube array 365 incorporates a plurality of straight porous tubes 366 of equal lengths which are arranged as three layers, each layer having seven equally horizontally spaced tubes 366. Each layer is vertically oriented over a preceding layer and with its component tubes 366 being vertically aligned with the individual corresponding tubes 366 of the underlying layers. Adjacent its respective opposite end regions, each respective tube 366 is slidably but sealingly mounted in an orifice formed in elastomeric sealing gasket plates 367 and 368. Thus, the tube plurality is here illustratively comprised of 21 tubes 366 that are supported and positioned by the pair of sealing gasket plates 367 and 368. In array 365, the tubes 366 are preferably comprised of stainless steel, and the gasket plates 367 and 368 are conveniently but preferably comprised of an elastomer, such as a synthetic rubber-like neoprene (presently preferred), butadiene-styrene, or the like.

Each gasket plate 367 and 368 is held adjacent to and continuously about its peripheral edge portions. Thus, in the array 365 the inside peripheral face (relative to tubes 367) of each gasket plate 367 and 368 contacts one of a pair of a retaining plates 369 and 370. The outside peripheral face of each gasket plate 367 and 368 contacts the edge portions of one of a pair of C-configured housings 371 and 372. The retaining plates 369 and 370 are conveniently comprised of a metal such as aluminum or the like. The housings are conveniently comprised of a metal, or a plastic, such as polycarbonate (presently preferred), or another high performance engineering resin, or the like.

Each assembly of retaining plates 369 or 370, gasket plates 367 or 368, and housings 371 and 372 is conveniently secured together by a mounting means, such as a plurality of machine screws 373 or the like. Each resulting assembly comprises a manifold structure 377 and 378 which defines an interior cavity 374 and 376, respectively, into which the ends of the tubes 366, which are held in each gasket plate 367 and 368, slightly extend. Each gasket plate 367 or 368 is clamped between, and is engaged in a fluid-tight seal with, the contacting portions of each plate 369 or 370 and housing 371 or 372.

Fixing the manifold structures 377 and 378 in spaced relationship to one another are top and bottom spanners 379 and 381 which are mounted across top and bottom portions, respectively, of each manifold structure 377 and 378 by machine screws 382, 385 or the like. Spanners 379 and 381 can be formed of metal, plastic (polyvinylchloride is convenient and illustrative), or the like. In the manifold 377 relative to cavity 374, a water outlet port 383, and a temperature probe mounting hole 384 are provided. In the manifold 378 relative to cavity 374, a water inlet port 387 and a temperature probe mounting hole 386 are provided.

Thus, water can be pumped into the cavity 376, through tubes 366, and out through the cavity 374 while air or gas is pumped across tubes 366 between the spanners 379 and 381. The water temperature, pressure and flow rate can be controlled. For example, temperature and pressure transducers can be associated with each chamber or cavity 374 and 376, and flow sensors can be located at manifold inlets and outlets, for control monitoring purposes. The systems 50, 100 and 200 are, for example, adapted for using the array 365.

The gasket plates 367, 368 in the combination shown and described provide a highly advantageous yet convenient means for fabricating the array 365. Each plate 367 and 368 can be first formed as by die cutting, stamping or the like, and the plurality of tubes 366 then associated therewith at their respective ends. Thereafter, the manifolds 377 and 378 can be assembled and associated with the spanners 379 and 381. A slight movement or shifting of an individual tube 366 relative to an associated gasket plate 367 or 368 does no harm or causes no inconvenience.

When, alternatively, the respective regions adjacent the opposite ends of the individual tubes are each soldered, braised, adhesively bonded or the like to an end plate, a rigid, brittle structural configuration results. This structure is subject to damage as a result of the normal stress, tension and like forces that occur in assembling the array or in using the array. A rigid, brittle structure is easily damaged because the tube end regions are readily broken or cracked away from an end plate or the like causing leakage. The use of the gasket plates (preferred) avoids severe cracking problems entirely and also permits a manifolded array to be easily fabricated. The elastomeric compressibility characteristic of such gasket plates makes it possible to achieve an excellent seal between the peripheral holding and clamping means, and relatively rapid array assembly and disassembly. Little or no array maintenance is required.

Embodiment (i)

Figure 16:
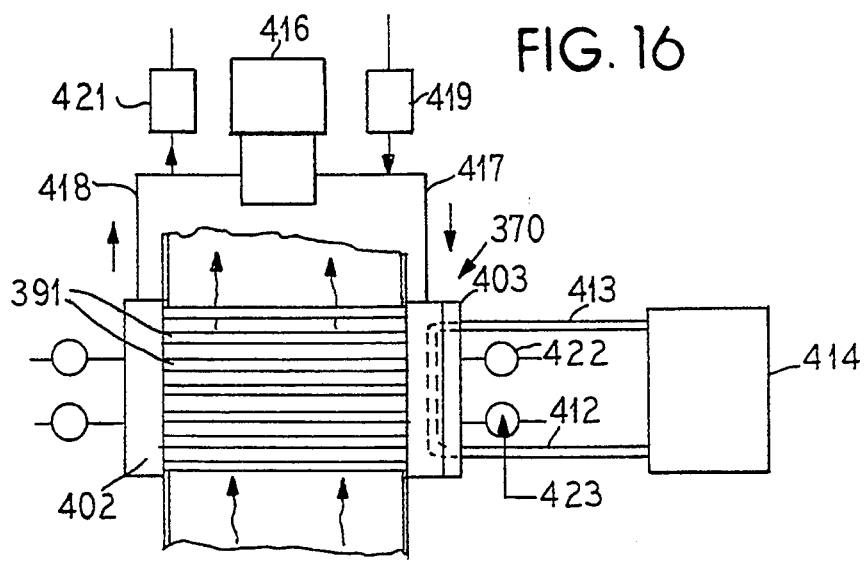
FIG. 16 is a diagrammatic view of another embodiment of a manifolded porous tube array of the present invention.
Figure 17:
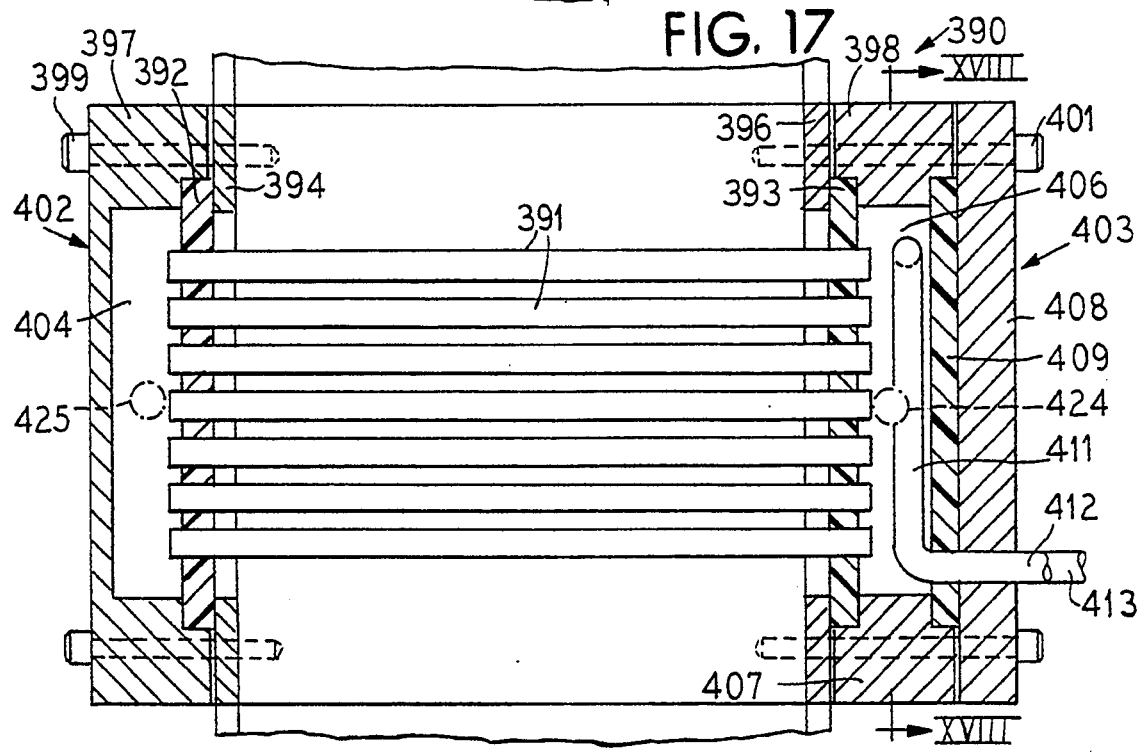
FIG. 17 is a longitudinal sectional view taken through the manifolded tube array of FIG. 16.
Figure 18:
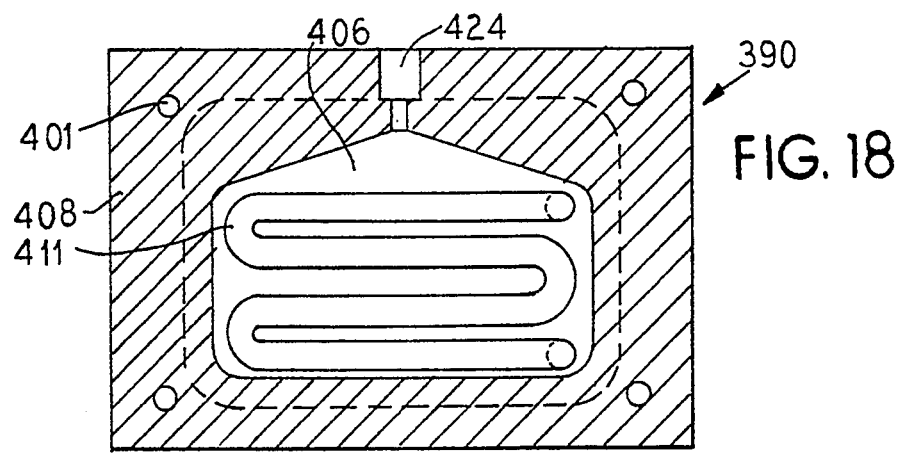
FIG. 18 is a transverse vertical sectional view taken along the line XVII—XVII of FIG. 17.

Referring to FIGS. 16–18, another embodiment 390 of a porous interface structure of this invention is shown. Here, a plurality of porous tubes 391 are each similarly end supported by resilient gasket plates 392 and 393. The plates 392 and 393 are sealingly and peripherally mounted between the retaining plates 394 and 396 and housings 397 and 398 with the screws 399 and 401. All components of the array are comparable in manner to the corresponding components of array 365 and its structure and assembly. Top and bottom spanners, not detailed, are employed which are similar to the spanners 379 and 381 of the array 365. Each of the manifold structures 402, 403 has defined therein a chamber 404, 406, respectively, which is comparable to the array 365. Input and output orifices are provided (but not shown in the sectional view) in the manifolds 403 and 402, respectively.

However, the array 390 has one housing 398 which is comprised of two components, identified as a peripheral spacer plate 407 and an end plate 408. The spacer plate 407 is conveniently and sealingly engaged with the adjacent peripheral portions of the end plate 408 by a resilient gasket plate 409. Screws 401 hold the assembly of end plate 408, spacer block 407, retaining plate 396 and gasket plates 393 and 409.

A tube configured as a coil 411 with input and output leads 412 and 413 is provided. The coil 411 reposes in chamber 406 adjacent gasket plate 409 and the leads 412 and 413 extend generally normally thereto through gasket 409 and end plate 408. The leads 412 and 413 are sealingly associated with gasket 409. The leads 412 and 413 are each associated with a conventional refrigeration unit 414 so that a conventional coolant, such as a freon, ammonia, or the like can be circulated through the coil 411.

Water can be circulated in a loop from a circulation pump 416 at a chosen flow rate successively through pipe 417 (which conveniently interconnects with chamber 406 through a channel 424), manifold 403, tubes 391 and manifold 402, and back to pump 416 through pipe 418 (see FIG. 14). Solenoid pumps 419 and 421 on each side of pump 416 are provided to maintain a desired pressure in the water loop with the pump 419 inputting water and the pump 421 outputting water responsively to pressure, such as the pressure sensed by a pressure transducer 422.

Air is circulated across tubes 391 of the array 390 in a manner similar to that achieved with the array 365.

The temperature of water flowing through chamber 406 of manifold 403 can be monitored by a temperature sensor 423 and the output signal employed to control the temperature of the coolant that is circulated through coil 411. Thus, the temperature of water flowing through tubes 391 is controlled.

Embodiment (j)

Referring to FIGS. 19–21, there is seen another embodiment 430 of a porous interface structure of this invention. Here, a plurality of microporous tubes 431 are each end supported in resilient gasket plates 432 and 433, and the plates 432 and 433 are sealingly and peripherally mounted between the rigid retaining plates 434 and 436 and the rigid spacer blocks 437 and 438.

Each spacer block 437 and 438 is in turn mounted to a C-configured housing 439 and 441 with a resilient gasket plate 442 and 443 being peripherally and sealingly located therebetween. Each of the respective assemblies which is comprised of retaining plate 434, gasket 432, block 437, gasket 442, housing 439, gasket 433, block 438, gasket 443, and housing 441 is conveniently held together by screws 444. Top and bottom spanners, not detailed, are employed which are similar to the spanners 379 and 381 of array 365.

Coaxially extending through each porous tube 431 is a nonporous tube 446 of smaller diameter relative to tubes 431 through which a fluid can be circulated. Each tube 446, adjacent its respective opposite end, is extended through a preformed hole in each of the gasket plates 442 and 443. Thus, each tube 446 is sealingly engaged with each gasket plate 442 and 443. Manifold chambers 447 and 448 are defined at the respective opposite ends of tubes 431. Chamber 447 is defined by block 437 and gaskets 442 and 432, and chamber 448 is defined by block 438 and the gaskets 433 and 443. Also, manifold chambers 449 and 451 are defined at the respective opposite ends of tubes 446. Chamber 449 is defined by housing 439 and gasket 442, and with chamber 451 is defined by housing 441 and gasket 443.

Thus, water is charged to chamber 448 through a pipe 453, and passes from chamber 448 into tubes 431 and chamber 447. A pipe 454 leads from chamber 447. However, chamber water is static and does not circulate.

Coolant is circulatable from a circulation pump 456 (or refrigeration unit or the like) successively through a pipe 457, chamber 451, tubes 446, chamber 449 and a pipe 458. Circulation of coolant through tubes 446 is thus employed for controlling the temperature of water flowing through tubes 431 (the flow occurring as a result of water moving through the pores of tubes 431). For example, a temperature sensor 459 can monitor the water temperature in the chamber 448 and this sensed temperature can be used for a control loop (not detailed), which controls the temperature of fluid circulated through tubes 446.

Water pressure in the water loop and in tubes 431 can be regulated by sensing water pressure, for example, by pressure sensor 461 at chamber 448, and using the sensed pressure to control the operation of solenoid pumps 462 and 463. A humidity/temperature sensor 464 associated with the duct 466, through which air is circulated transversely over the tubes 431, can be used for a humidity control loop (not detailed).

Embodiment (k)

Referring to FIGS. 22–26, there is seen another embodiment 470 of a porous interface structure tube array of this invention. This tube array 470 incorporates a plurality of straight porous tubes 471 of equal lengths which are exemplarily here arranged as three layers. The tubes in each layer are equally spaced from one another and the location of tubes in adjacent layers is such that the tubes are staggered. Thus, non-uniform air flow horizontally or transversely over the tubes occurs. All tubes 471 are closed at their ends on a common array 470 side and these closed ends are supported by a block 472. At their respective opposite ends, all tubes 471 are supported by and sealingly engaged adjacent their ends by an elastomeric sealing gasket plate 473 which is preformed with holes for slidably receiving the respective tube 471 ends.

The gasket plate 473, as before, is held by, and is sealingly associated with each of a retaining plate 474 and with one side of a sleeve block 476. The opposite side of sleeve block 476 receives another gasket plate 477 and an end plate 478 is received over block 476 and gasket plate 477 so that gasket plate 477 is sealingly positioned therebetween. The assembly is held together by screws 479. A manifold chamber 481 is thus defined by gaskets 477 and 473 and by sleeve block 476.

Within each of the porous tubes 471 is extended a non-porous tube 482 of smaller outside diameter than the inside diameter of tubes 471. The interior end of each tube 482 is closed and is in spaced adjacent relationship to the (interior) closed end of its associated tube 471. The opposite end of each tube 482 extends outwardly from its associated tube 471 and projects sealingly through a preformed orifice in the gasket plate 477.

Within each of the non-porous tubes 482 is extended a non-porous tube 483 of smaller outside diameter than the inside diameter of tube 482. The interior end of each tube 483 is open and is in spaced adjacent relationship to the (interior) closed end of its associated tube 482. The opposite end of each tube 483 extends outwardly from its associated tube 482 and the mouth of each tube 482 is sealed about its tube 483.

Thus, water is charged into manifold chamber 481 and enters tubes 471, but the water remains static at a predetermined pressure therein. Water pressure is maintained within a predetermined range by the input solenoid pump 484 and by the output solenoid pump 486. Pressure sensor 489 can be used to sense pressure in chamber 481 for pressure control purposes.

In addition, a coolant, such as freon, is charged into each of the tubes 483 through an associated charging pipe 487 (joint not shown), and then, at internal tube ends, flows back between tubes 483 and tubes 482. At the end of the tube 482, the coolant exits through take off pipes 488 that are associated with each tube 482. The charging pipes 487 and the take off pipes 488 are associated with a conventional refrigeration unit 492. A temperature sensor 491 can be employed to sense the water temperature in the chamber 481 for controlling the temperature of the coolant being circulated through the tubes 483 and 482.

In an alternative tube configuration (see FIG. 26), the tube 483 can be spirally wound upon a straight length of itself so that the total effective length of the time exposure of coolant to water in the tube 471 is increased for a given coolant flow rate compared to the corresponding time exposure achieved with the tube structure shown in FIGS. 22-25.

Embodiment (l)

Figure 27:
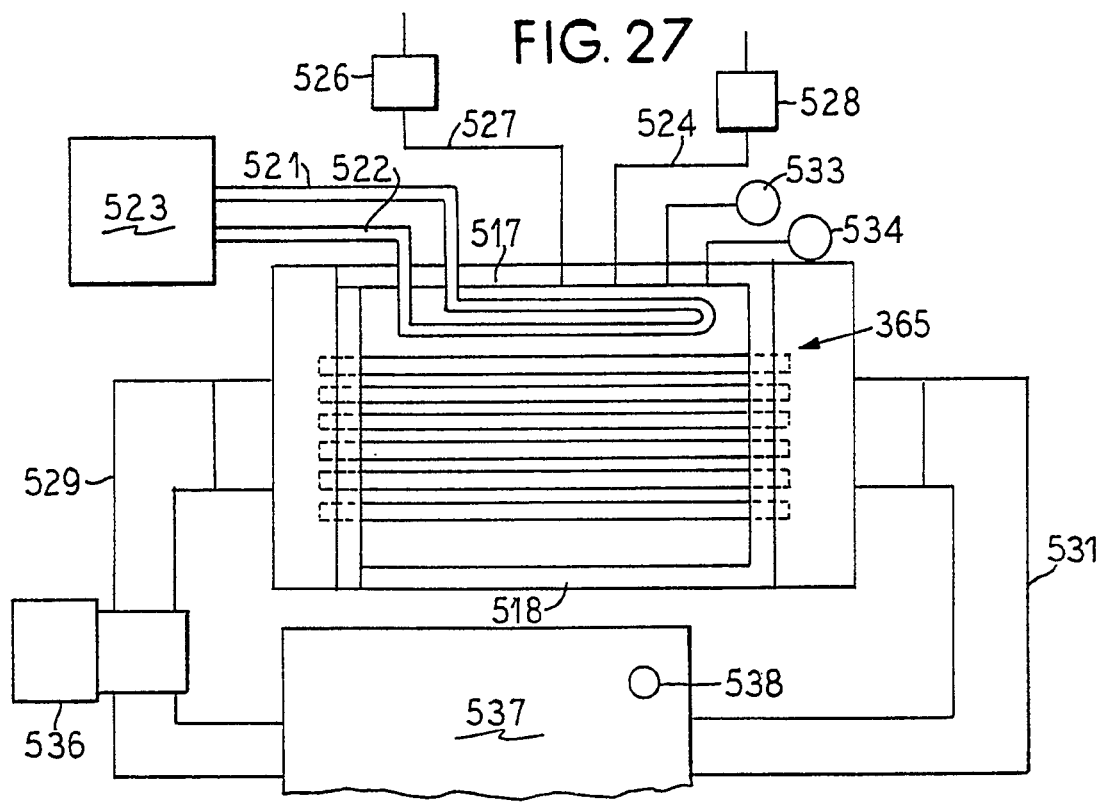
FIG. 27 is a diagrammatic view of another embodiment of a manifolded porous tube array of the present invention.
Figure 28:
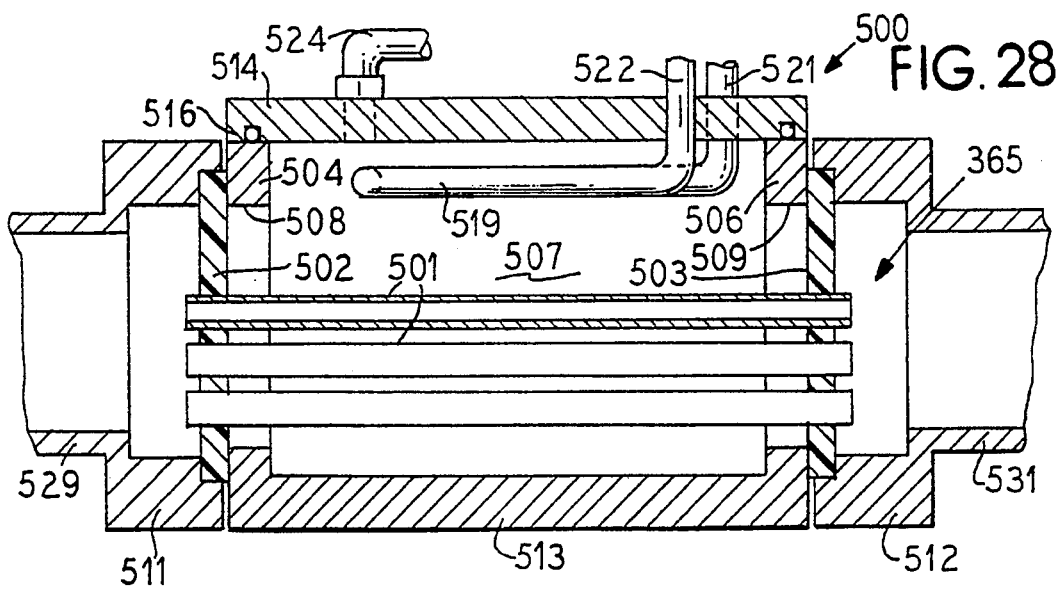
FIG. 28 is a vertical sectional view through the manifolded tube array of FIG. 27 showing one porous tube of the tube plurality in vertical section.
Figure 29:
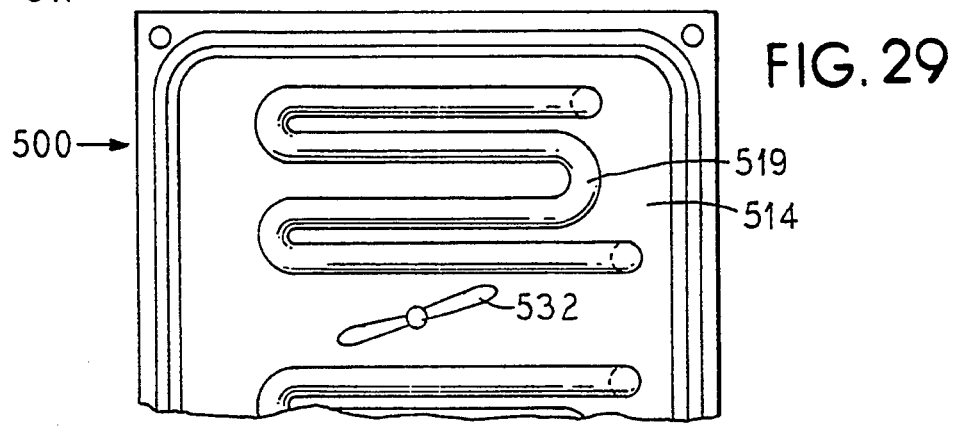
FIG. 29 is a fragmentary view of the undersurface region of the top plate of the array shown in FIG. 28 showing the coolant coils and a gas circulating propeller.

Referring to FIGS. 27-29, there is shown another embodiment 500 of a porous interface structure of this invention which is here a manifolded porous tube array. The tube array 500 incorporates a plurality of straight porous tubes 501 of equal lengths which are illustratively arranged as three layers with the tubes in each layer, and between each layer, being equally spaced from one another. If desired, tubes in adjacent layers can be staggered relative to preceding layers. Adjacent its respective opposite end regions, each tube 501 is slidably but sealingly mounted as part of an array 365 in an elastomeric sealing gasket 502 and 503.

Each gasket plate 502 and 503 is held on its respective opposed face about its peripheral edge portions by the outside surface portions of a different one of an opposed end wall 504 and 506 of a chamber 507. Each end wall 504 and 506 has defined therein an aperture 508 and 509, respectively, through which the tubes 501 of the tube plurality extend. The opposite or outside edge portions of the face of each gasket plate 502 and 503 is held by the terminal end face of a respective connector 511 and 512. The assembly of each end wall 504, 506 with its respective associated gasket plates 502, 503 and connectors 511, 512 is held together by screws (not shown) or the like.

In the embodiment shown, the end walls 504 and 506 are integrally formed with a bottom wall 513. Also, end walls 504 and 506 are provided with a removable top wall 514 which is sealingly associated about its periphery with the end walls 504 and 506 and with side walls 517 and 518 (not detailed, but preferably separate) through an O-ring seal 516 or the like. All walls of chamber 507 are conveniently held together by screws or the like (not shown). As thus formed, chamber 507 is defined by such walls and by gasket plates 502 and 503.

As in array 390, a tube configured as a coil 519 is provided which has input and output leads 521 and 522. Coil 519 is positioned in spaced, parallel adjacent relationship to top wall 514, and leads 521 and 522 extend through the top wall (sealant between leads and top wall not shown). The leads 521 and 522 are each functionally connected with a conventional refrigeration unit 523 or the like.

The chamber 507 is charged with static water through an inlet pipe 524. Pressure of water in chamber 507 is sensed by pressure sensor 533. When water pressure in chamber 507 increases above a set value during operation of array 500, the water pressure is decreased to the set value by means of a solenoid pump 526 or the like that is connected to chamber 507 through an outlet pipe 527 (not detailed). When water pressure in chamber 507 decreases below a set value, as when humidification is accomplished, the water pressure is increased to the set value by means of a solenoid pump 528 that is associated with inlet pipe 524. Liquid in chamber 507 is circulated therein by means of the propeller 532 that is suspended from the top wall 514 (propeller drive motor not detailed).

Each of the connectors 511 and 512 is connected to a duct 529 and 531, respectively. A stream of air or gas in duct 529 passes through connector 511, flows through the tubes 501, and exits through connector 512 into duct 531.

The temperature of water in chamber 507 is sensed by the temperature sensor 534. Temperature, so sensed, can be used to control the temperature of water in chamber 507 through the operation of the refrigeration unit 523 and the regulation of the temperature of the coolant circulated in coil 519.

The air or gas stream flowing through tubes 501 can be maintained and adjusted by the blower 536. Ducts 529 and 531 connect with a chamber 537, such as a chamber for plant culture or the like. The set point of the relative humidity sensed in chamber 537 by a temperature/humidity sensor 538 can be used to control the water temperature in the chamber 507 to initiate humidification or dehumidification of air flowing through tubes 501.

Figure 31:
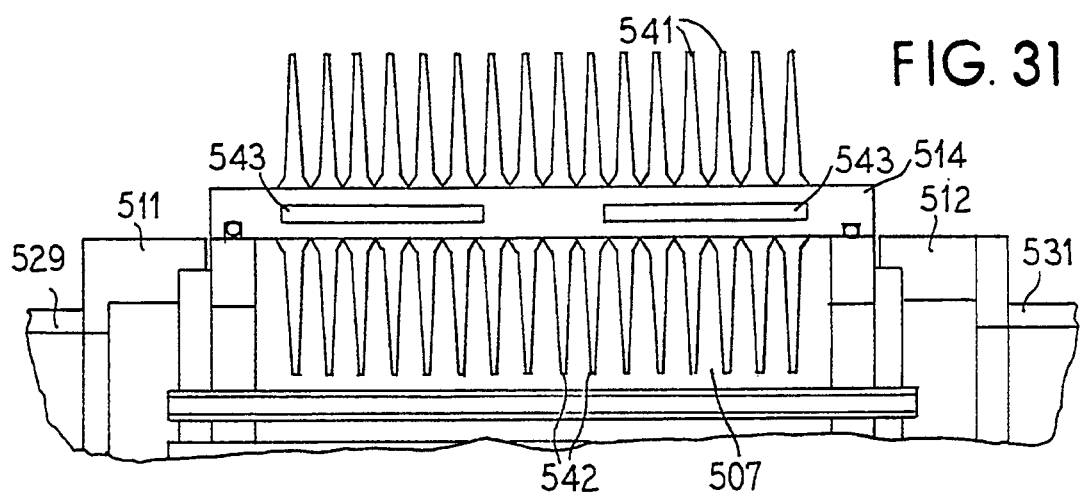
FIG. 31 is a vertical sectional view through the top plate of FIG. 30 showing the location of the heat exchanger fins and the thermoelectric heater units.
Figure 30:
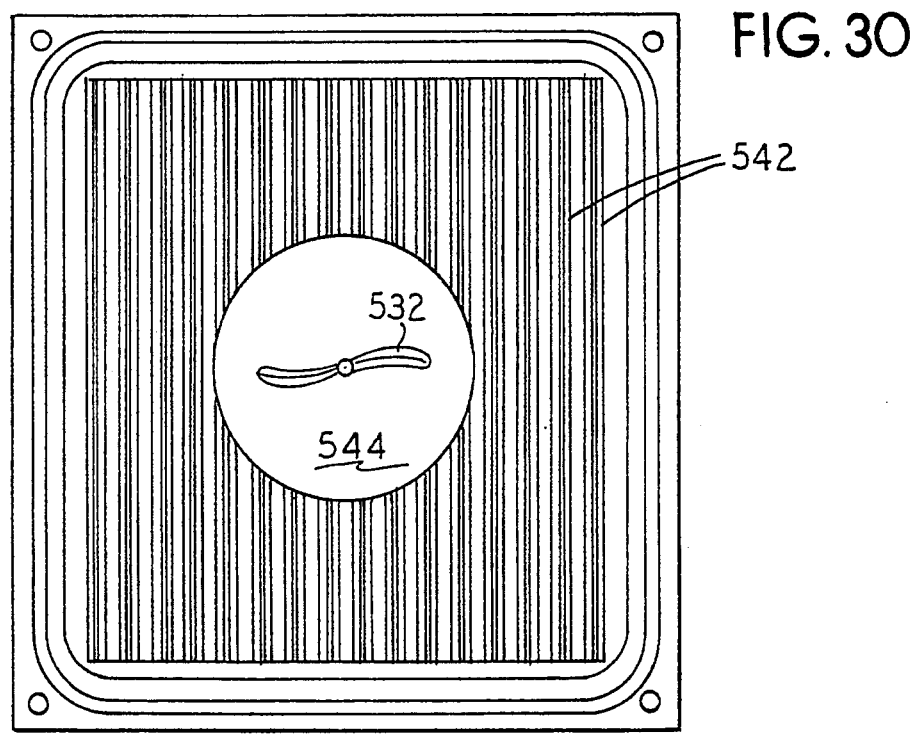
FIG. 30 is a view similar to FIG. 29, but showing an alternative embodiment of a top plate which is provided with heat exchanger fins and a gas circulating propeller.

An alternative embodiment for the top wall 514 is shown in FIGS. 30 and 31. Here, the top wall 514 is provided with a plurality of upwardly extending heat fins 541 and a plurality of downwardly extending heat fins 542. Internally, wall 514 is fitted with a plurality of thermoelectric heaters 543. In a central circular portion 544, the downwardly extending heat fins 542 are removed and a water circulating propeller 532 is rotatably mounted with its axis at the wall center (propeller drive motor not shown). Thus, water in chamber 507 can be controllably warmed or cooled.

If desired, the chamber 507 can be located (oriented) on an edge thereof. One side wall can comprise bottom wall 513 and the opposed side wall can comprise top wall 514. In this way, the water in chamber 507 can be controllably heated or cooled to accomplish humidification or dehumidification of air or gas circulated through tubes 501.

Embodiment (m)

Referring to FIGS. 32–34, there is seen another embodiment of a porous interface structure 551 of the present invention. Structure 551 employs a pair of manifolds 552 which each engage with one of a pair of retaining plates 553 with O-rings 554 being used for sealing purposes. Clamped between each plate 553 and its associated manifold is a porous plate 556. The assembled structure 551 is held together by nut and bolt assemblies 557.

Within each manifold 552 is a temperature control tube 558 which is connected with cooling or heating fluid supply lines 559 for fluid circulation purposes in controlling the temperature of water that is charged into, and resides in, each manifold 552. Water pressure in each manifold 552 is controlled by input and output solenoid pumps 561 and 562, and 563 and 564, respectively, that are associated with supply pipes 566.

Temperature and pressure sensors 567 and 568 respectively are employed for control purposes.

Air that is being humidity regulated is circulated through channels 569.

Embodiment (n)

Figure 35:
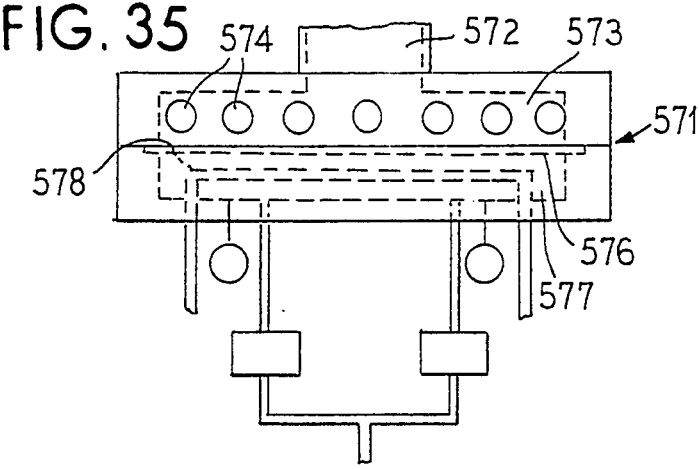
FIG. 35 is a diagrammatic view of another embodiment of a porous interface structure of the present invention.
Figure 36:
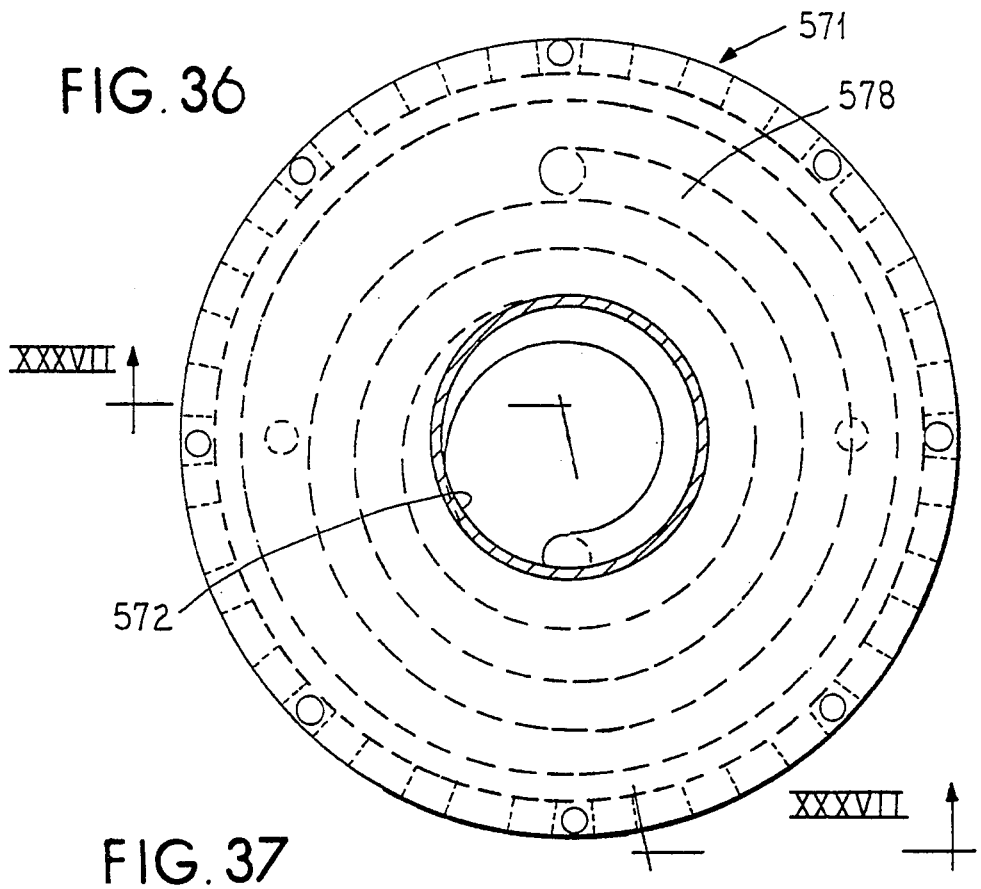
FIG. 36 is a plan view of the upper face of the embodiment shown in FIG. 35.
Figure 37:
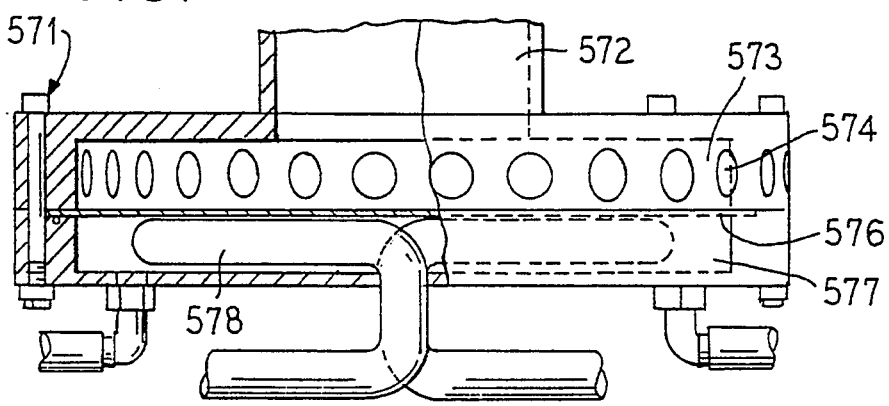
FIG. 37 is a vertical sectional view taken along the line XXXVII—XXXVII of FIG. 36.

Referring to FIGS. 35–37, there is seen another embodiment of a porous interface structure 571 of the present invention. Structure 571 is similar to structure 551 except is circular in configuration. Air that is being humidity regulated is charged through duct 572 into chamber 573 and passes from chamber 573 out through exit orifices 574. The floor of chamber 573 comprises a porous plate 576. A water chamber 577 is below plate 576 and a temperature control tube 578 in a spiral configuration is provided in chamber 577.

Embodiment (o)

Figure 38:
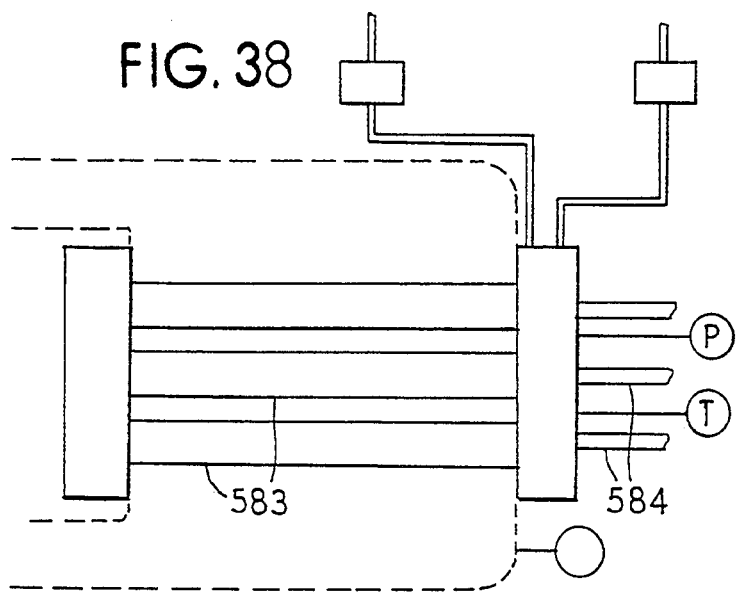
FIG. 38 is a diagrammatic view of another embodiment of a porous interface structure of the present invention.
Figure 40:
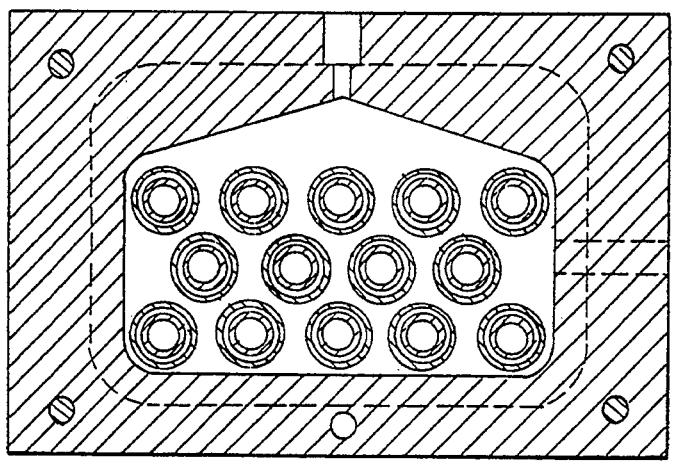
FIG. 40 is a vertical sectional view taken along the line XL—XL of FIG. 39.
Figure 39:
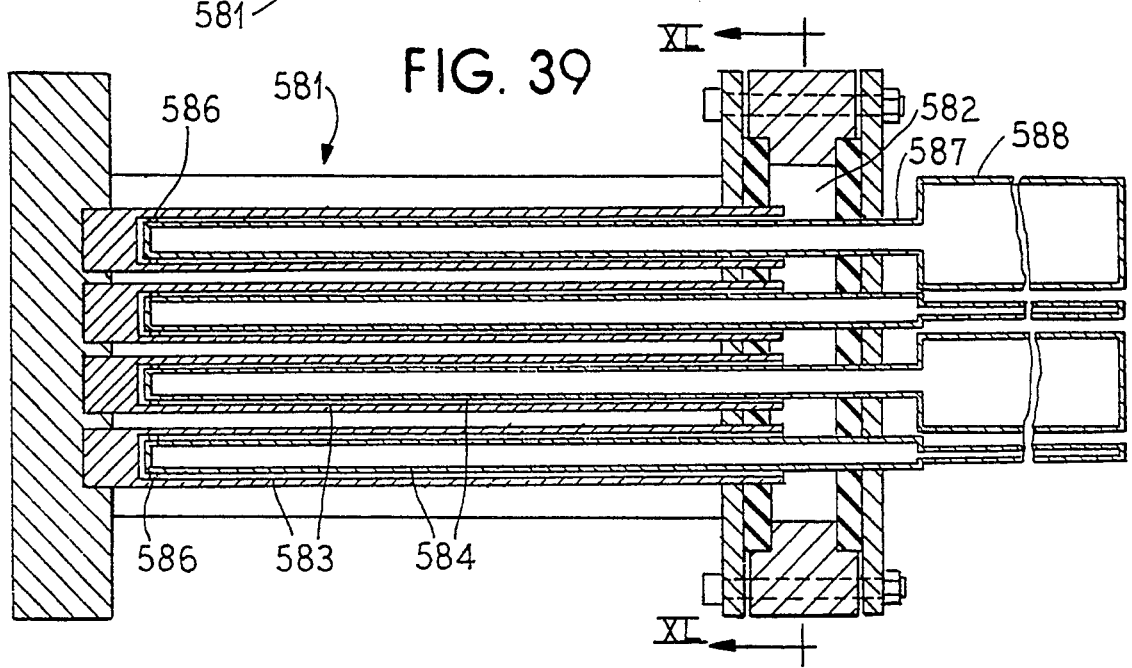
FIG. 39 is a transverse sectional view taken across the embodiment shown in FIG. 38.

Referring to FIGS. 38–40, there is seen another embodiment 581 of a porous interface structure of the present invention.

Embodiment 581 is similar to the embodiment shown in FIGS. 22–26. As in the embodiments 551 and 571, water is static in the manifold 582 and water pressure is controlled by solenoid pumps, valves, or other maintenance means. The temperature inside each of the porous tubes 583 is controlled by a heat pipe 584. The cross-sectionally circular end portion 587 of each pipe 584 is inside each of the porous tubes 583 and the flat end portion 588 of each pipe 584 is outside the manifold 582 with conventional thermoelectrics associated with it. The porous tubes 583 are each sealed at one end and are slid over the circular end portion 587 of each heat pipe tube 584. An inner tube support 586 supports the heat pipe tube 584 inside the porous tube 583 and allows for water to flow around it.

Various other and further embodiments, applications, structures, and the like will be apparent to those skilled in the art from the description provided herein and no undue limitations are to be implied or inferred therefrom.

What is claimed is:

1. A manifolded porous tube array for humidification and dehumidification of a gas comprising in combination:
   (a) a pair of spaced, opposed elastomeric sealing gasket plates, each plate having an inside face and an outside face and perimeter portions;
   (b) a plurality of porous tubes arrayed in spaced relationship to one another, each one of said tubes having exterior circumferential surface portions and a pair of opposite ends, said exterior surface portions that are adjacent each said opposite end of each said tube being slidably but sealingly positioned in a different respective one of said gasket plates;
   (c) a pair of manifold means, each one being sealingly associated with said perimeter portions and generally enclosing said outside face of a different one of each of said gasket plates with all said tube ends that are so positioned in each gasket plate communicating with a generally fluid tight manifold chamber that is defined by the combination of the adjacent one of said manifold means and the associated said gasket plate, each one of said manifold means further including hole means for conduit association so that a fluid is circulatable from said hole means of one of said manifold means through said tubes to said hole means of the other of said manifold means; and
   (d) spanner means which circumscribes said tube plurality and which has longitudinally opposite ends that are each associated with a different one of said manifold means so that a chamber is defined by said spanner means and said gasket plates through which chamber said tube plurality extends, said spanner means including at least two passageway means which are positioned so that a fluid is circulatable through said chamber from one said passageway means about said exterior circumferential surface portions of said tubes to another of said passageways means.

2. The manifolded porous tube array of claim 1 wherein at least one of either (a) said plurality of porous tubes, or (b) at least one of said manifold means is functionally associated with at least one of either temperature regulating means or pressure regulating means.

3. The manifolded porous tube array of claim 2 wherein said temperature regulating means is so associated and said temperature regulating means is external of said manifolded means and said plurality of porous tubes.

4. The manifolded tube array of claim 1 wherein said porous tubes are comprised of porous stainless steel.

5. The manifolded tube array of claim 1 wherein temperature regulating means is functionally associated with said spanner means and said temperature regulating means includes:
   (a) heating means;
   (b) projecting fin means; and
   (c) bladed fluid circulating means.

6. The manifolded tube array of claim 1 which incorporates temperature regulating means that includes a plurality of non-porous continuously extending pipe means through which a heating or cooling fluid is circulatable and each one of said pipe means is located within a different one of said porous tubes, and which also incorporates a second pair of manifolds with each one of said second pair of manifolds being adjacent a different one of said first manifolds and being associated with a different one set of opposed ends of said pipe means so that said fluid is circulatable through said pipe means.

7. The manifolded porous tube array of claim 6 wherein:
   a second pair of spaced, opposed elastomeric sealing gasket plates are included, each one having a plurality of transversely spaced, longitudinally extending second aperatures defined therein;
   each one of said pipe means being slidably but sealingly positioned in a different one of said second apertures of a different one of said second gasket plates; and
   each one of said second gasket plates being sealingly associated about its perimeter portions with one of said second manifolds.

8. The manifolded porous tube array of claim 6 which includes pump means for circulating said heating or cooling fluid through said pipe means via said second pair of manifolds.

9. The manifolded porous tube array of claim 6 which includes means for maintaining a fluid in said porous tubes at a static pressure.

10. The manifolded porous tube array of claim 1 wherein temperature regulating means is functionally associated with at least one of said manifold means and said temperature regulating means includes a non-porous, continuously extending, heat-transferring conduit means with temperature regulating means for said conduit means so that, when water is input into one of said manifold means and passes into said porous tubes, said water is temperature regulatable.

11. The manifolded tube array of claim 10 wherein said conduit means is located in one of said manifold means.

12. The manifolded porous tube array of claim 10 wherein said conduit means is a non porous pipe means which is associated with pump means for circulating a fluid through said non-porous pipe means and said temperature regulating means comprises fluid temperature regulating means for said fluid.

13. The manifolded tube array of claim 12 wherein said non-porous pipe means is associated with heating means for maintaining the temperature of said second fluid.

14. The manifolded porous tube array of claim 10 wherein said conduit means is a non porous pipe means and water supply means is exteriorly connected between said hole means of each said manifold means, and said water supply means includes pump means and pressure maintaining means.

15. The manifolded tube array of claim 1 wherein temperature regulating means is functionally associated with said spanner means and includes a nonporous continuously extending pipe means through which a heating or cooling fluid is circuitable and which is so located relative to said chamber that a fluid which is circulatable through said chamber is temperature regulatable before said fluid reaches said porous tubes.

16. The manifolded porous plate device of claim 15 wherein at least one of said manifold means is associated with at least one of either temperature regulating means or pressure regulating means.

17. The manifolded porous plate device of claim 15 wherein temperature regulating means is functionally associated with at least one of said manifold means and said temperature regulating means includes a non-porous, continuously extending, heat transferring conduit means and also temperature regulating means for said conduit means.

18. The manifolded porous plate device of claim 15 which further incorporates temperature regulating means, said temperature regulating means including a non-porous continuously extending pipe means located in one of said manifold means through which a heating or cooling fluid is circulatable and over which said water or said flowing gas is conveyable.

19. The manifolded porous plate of claim 18 which includes pump means for circulating a fluid through said non-porous pipe means, fluid temperature regulating means for said fluid, and fluid pressure regulating means.

20. The manifolded porous plate device of claim 15 which further incorporates:
   (a) said porous plate means comprises a pair of spaced, parallel said porous plate members, each said plate member having an outside face, an inside face, and perimeter portions, said porous plates members having interconnecting non-porous spacer means extending about said perimeter portions,
   (b) a pair of manifolds, each one being associated over said outside face and about said perimeter portions of a different one of said porous plate members so as to define between each said porous plate and said associated manifold a manifold chamber,
   (c) said spacer means being discontinuous at least two perimetrically spaced locations so that a duct means is defined between said porous plate members that extends between said discontinuities, and
   (d) retaining means holding said porous plate members, said manifolds, and said spacer means together so that a liquid can be maintained at a controlled pressure in each of said manifold chambers while a gas is flowed through said duct means.

21. The manifolded porous plate device of claim 20 wherein temperature regulating means is associated with at least one of said manifold chambers, and said temperature regulating means includes non-porous, continuously extending, heat transferring conduit means.

22. The manifolded porous plate device of claim 15 wherein said porous plate means has a circular perimeter, said flowing gas enters said other manifold means centrally, radially moves over said porous plate means, and exits from circumferential orifices defined in said other manifold means.

23. The manifolded porous plate device of claim 22 wherein said one manifold means is associated with temperature regulating means, and said temperature regulating means includes a spirally extending, non-porous pipe means through which a temperature-regulated fluid is circulatable, said spirally extending pipe means being in, adjacent relationship to said porous plate.

24. The manifolded porous plate device of claim 15 wherein said porous plate is comprised of porous stainless steel.

25. A manifolded porous tube array for humidification and dehumidification of a gas comprising in combination:
   (a) a plurality of porous tubes arrayed in transversely spaced relationship to one another, each said tube having exterior circumferential surface portions and a pair of opposite ends;
   (b) each said tube being closed at one said end, said closed ends all being located at a common longitudinal tube end region, and each said tube being open at the opposite said end, said open ends all beings located at a common longitudinal tube opposite end region;

(c) block means supporting each of said tubes at said common end region, said block means having perimeter portions;

(d) an elastomeric sealing gasket plate having a plurality of transversely spaced, longitudinally extending apertures defined therein, and also having an inside face, an outside face and perimeter portions;

(e) said exterior surface portions of each said tube adjacent said open end thereof being slidably but sealingly positioned in a different one of said apertures;

(f) a manifold means sealingly associated with said perimeter portions and generally enclosing said outside face so that all said tube open ends communicate with a manifold chamber that is defined by the combination of said manifold means and said gasket plate, said manifold means further including hole means for conduit association so that a fluid can pass from said hole means through said manifold means and into said tubes; and (g) spanner means which circumferentially circumscribes said tube plurality and which has longitudinally opposite ends one of which is associated with said perimeter portions of said block means and the other of which is associated with said perimeter portions of a said gasket plate so that a chamber is defined through which said tube plurality extends, said spanner means including at least two passageway means which are positioned so that a fluid is circulatable through said chamber from one said passageway means about said exterior circumferential surface portions of said tubes to another of said passageways means.

26. The manifolded porous tube array of claim 25 wherein at least one of either (a) said plurality of porous tubes or (b) said manifold means is functionally associated with at least one of either temperature regulating means or pressure regulating means.

27. The manifolded porous tube array of claim 25 which further incorporates temperature regulating means, said temperature regulating means including a plurality of non-porous pipe means, each one of said non-porous pipe means being closed at one end and being associated at its opposite end with second fluid input and outlet delivery means, each one of said non-porous pipe means including internal wall means for circulating a fluid so input from said input means therethrough before said second fluid so circulated reaches said outlet delivery means, and each one of said non-porous pipe means being interiorly positioned in, and longitudinally extending in, a different one of said porous tubes so that the temperature of said fluid in said porous tubes can be regulated by the temperature of said second fluid in said pipe means.

28. The manifolded porous tube array of claim 27 wherein second fluid supply means is connected to each one of said non-porous pipe means for so circulating said second fluid through said non-porous pipe means, and said second fluid supply means includes pump means and pressure regulating means.

29. The manifolded porous tube array of claim 27 which further includes a second elastomeric sealing gasket plate which has a plurality of transversely spaced, longitudinally extending second apertures defined therein, and which has second perimeter portions; and wherein said manifold means is also sealingly associated with said second perimeter portions so that said second gasket plate is longitudinally spaced from said gasket plate, and said non-porous pipe means extends through said manifold chamber and an external surface portion of each one of said non-porous pipe means is slidably but sealingly positioned in a different one of said second apertures.

30. The manifolded tube array of claim 25 wherein said porous tubes are comprised of porous stainless steel.

* * * * *